United States Patent
Oteru et al.

(10) Patent No.: US 12,040,989 B2
(45) Date of Patent: Jul. 16, 2024

(54) DATA SEQUENCE AMENDMENT METHOD, PACKET MONITORING APPARATUS, DATA SEQUENCE AMENDMENT DEVICE, AND DATA SEQUENCE AMENDMENT PROGRAM

(71) Applicant: Nippon Telegraph and Telephone Corporation, Tokyo (JP)

(72) Inventors: Shoko Oteru, Tokyo (JP); Shuhei Yoshida, Tokyo (JP); Yuta Ukon, Tokyo (JP); Namiko Ikeda, Tokyo (JP); Koyo Nitta, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 153 days.

(21) Appl. No.: 17/783,540

(22) PCT Filed: Dec. 11, 2019

(86) PCT No.: PCT/JP2019/048557
§ 371 (c)(1),
(2) Date: Jun. 8, 2022

(87) PCT Pub. No.: WO2021/117171
PCT Pub. Date: Jun. 17, 2021

(65) Prior Publication Data
US 2023/0009530 A1 Jan. 12, 2023

(51) Int. Cl.
*H04L 12/707* (2013.01)
*G06F 15/16* (2006.01)
(Continued)

(52) U.S. Cl.
CPC ............ *H04L 47/34* (2013.01); *H04L 1/1628* (2013.01); *H04L 49/901* (2013.01)

(58) Field of Classification Search
CPC ..... H04L 47/34; H04L 43/0829; H04L 43/12; H04L 1/1628; H04L 65/80; H04L 47/00;
(Continued)

(56) References Cited

U.S. PATENT DOCUMENTS

| | | | | |
|---|---|---|---|---|
| 8,358,589 B2* | 1/2013 | Apostol | ................. | H04L 49/90 370/252 |
| 2006/0069793 A1* | 3/2006 | Li | ............................ | G01J 3/465 709/231 |
| 2009/0135724 A1* | 5/2009 | Zhang | ................. | H04L 41/5025 370/241 |
| 2009/0290592 A1* | 11/2009 | Konishi | ................... | H04L 49/90 370/412 |

(Continued)

FOREIGN PATENT DOCUMENTS

| | | |
|---|---|---|
| JP | 2006013612 A | 1/2006 |
| JP | 2009171157 A | 7/2009 |

(Continued)

*Primary Examiner* — Edan Orgad
*Assistant Examiner* — Vanneilian Lalchinthang
(74) *Attorney, Agent, or Firm* — Slater Matsil, LLP

(57) ABSTRACT

An embodiment is a data sequence correction method. The data sequence correction method including temporarily saving data with sequence information imparted thereto in a ring buffer, the ring buffer having a predetermined number of storage regions corresponding to the sequence information, and being provided with a monitoring section made up of one, or two or more consecutive sequence numbers, and an acceptance section in which a start or a second sequence number of the monitoring section is a start sequence number, and the sequence number ahead by a count of storage regions of the ring buffer including the start of the monitoring section is an end sequence number.

14 Claims, 67 Drawing Sheets

V: Version, P: Padding, X: eXtension, CC: CSRS Count, M: Marker

(51) Int. Cl.
    *H04L 1/1607*     (2023.01)
    *H04L 12/50*     (2006.01)
    *H04L 29/06*     (2006.01)
    *H04L 47/34*     (2022.01)
    *H04L 49/901*     (2022.01)

(58) Field of Classification Search
    CPC ....... H04L 69/161; H04L 69/16; H04L 69/22;
                    H04L 49/901; H04L 49/9094; H04L
                    49/252; H04L 49/30; H04W 84/005;
                H04W 28/04; H04N 1/48; G01J 3/46;
                              G01J 3/465; G01J 3/501
    USPC ......................................................... 370/235
    See application file for complete search history.

(56) References Cited

U.S. PATENT DOCUMENTS

| | | | |
|---|---|---|---|
| 2014/0237072 A1* | 8/2014 | Satoh | H04L 69/16 709/217 |
| 2016/0134501 A1* | 5/2016 | Timms | H04L 43/0829 370/252 |
| 2017/0012861 A1* | 1/2017 | Blumenthal | H04L 45/24 |
| 2017/0063498 A1* | 3/2017 | Venkatsuresh | H04L 69/16 |
| 2019/0373085 A1* | 12/2019 | Higo | H04L 12/46 |
| 2023/0009530 A1 | 1/2023 | Oteru et al. | |

FOREIGN PATENT DOCUMENTS

| | | | |
|---|---|---|---|
| JP | 5479793 B2 | 4/2014 | |
| JP | 5625992 B2 | 11/2014 | |
| JP | 2016139978 A | 8/2016 | |

\* cited by examiner

DATA SEQUENCE AMENDMENT METHOD, PACKET MONITORING APPARATUS, DATA SEQUENCE AMENDMENT DEVICE, AND DATA SEQUENCE AMENDMENT PROGRAM

CROSS-REFERENCE TO RELATED APPLICATIONS

This application is a national phase entry of PCT Application No. PCT/JP2019/048557, filed on Dec. 11, 2019, which application is hereby incorporated herein by reference.

TECHNICAL FIELD

The present invention relates to a data sequence correction method of counting a count of lost data in a data sequence correction method in which received data having sequence numbers is reordered in the sequence number order.

BACKGROUND

In communication methods in which audio and video are encoded, packetized, and transmitted at set cycles, packets arriving out of sequence are temporarily saved in a sequence correction buffer at the receiving side, and the packets are reordered to the correct sequence, on the basis of sequence information (normally sequence numbers) stored in the headers of the packets, following which the original audio and video is reproduced.

Now, if fluctuation (jittering) of delay applied on the transmission path is excessively great, reproduction of audio and video temporarily stops to wait for packets with great delay to arrive, or packets with extremely great delay are discarded, causing dropout in the audio or video. There is demand from telecommunication carriers for the ability to branch and extract network signals by a network tap or the like inserted on the communication path, and measure packet jittering, in order to identify locations where jittering is occurring.

In a delay measurement method described in PTL 1, a terminal that transmits packets attaches transmission time information to transmission packets and transmits the packets, and a packet monitoring device records the reception time of packets extracted by a network tap or the like, reads out transmission time information from the arriving packets and finds the delay of each packet from the difference between reception time and transmission time, thereby observing fluctuation in delay.

Conversely, in PTL 2, jittering of packets is observed without using transmission time information. In PTL 2, packets that are periodically generated and imparted with sequence numbers are taken as an object, the received packets are arrayed in sequence (sequence correction), and results of calculating packet arrival intervals is summarized, thereby observing fluctuation in packet intervals.

In the sequence correction method described in PTL 3, as illustrated in FIG. 65, a ring buffer is sectioned into a plurality of storage regions, two or more consecutive storage regions are set as a monitoring section, data sent thereto is stored in a predetermined storage region, whether or not data necessary for reassembly is stored in the monitoring section is monitored, and when all data necessary for reassembly is present in the monitoring section, the data is called up, and in a case in which the storage region where the data is stored is ahead of the monitoring section, the monitoring section is moved so that the tail end of the monitoring section is the storage region where this data is stored.

CITATION LIST

Patent Literature

[PTL 1] Japanese Patent No. 5479793
[PTL 2] Japanese Patent No. 5625992
[PTL 3] Japanese Patent Application Publication No. 2009-171157

SUMMARY

Technical Problem

In PTL 1, there is a need to match the standard of time information, units of time for example, between the terminal transmitting the packets and the packet monitoring device. Meanwhile, in PTL 2, reassembling the original large data by linking a plurality of pieces of received data is assumed, and accordingly, a ring buffer of a sufficiently large size having storage regions for all sequence numbers is used, and when all data necessary for reassembly is present in the monitoring section, the data is called up from the ring buffer.

Now, when there is a restriction on the number of storage regions of the ring buffer, and storage regions for all sequence numbers cannot be implemented, an arrangement can be conceived in which, for example, a data write storage region is decided on the basis of a remainder from dividing the sequence number by the count of storage regions of the ring buffer, and when all data near the start is present, the data is read out from the ring buffer, and the vacated storage region can be reused for following data with the same remainder. When data that should be recorded at the start of the ring buffer does not arrive, the start position of the ring buffer is moved ahead without awaiting arrival of the data when a predetermined condition is satisfied and determination that data loss has occurred is made.

Examples of the predetermined condition are a case of the saved packet count reaching a predetermined count, a case of sequence information of arrival time information of received packets not being in an acceptance section, and a case of a predetermined amount of time elapsing. The number of times that arrival interval could not be calculated due to data loss or marked delay (number of times of data loss) is also important information that serves as an indication of communication quality, and accordingly not only the arrival intervals but also the number of times of data loss needs to be summarized. In a case of moving the start position of the ring buffer ahead by one, each time of quitting awaiting for arrival of data, the number of times of data loss can be accurately summarized, and the total of summarization results of arrival intervals is the total number of sent packets.

However, when storing data arriving after the ring buffer has been cleared as the start in the ring buffer, in a case in which the new start has a later sequence number than the start when the buffer was cleared, the fact that data of sequence numbers therebetween has not arrived is not recorded as the number of times of data loss, and accordingly there is a problem that the number of times of data loss will be summarized as a smaller number. Conversely, in a case in which the new start has an earlier sequence number than the start when the ring buffer was cleared, there is a problem in that the data of sequence numbers therebetween will be summarized in duplicate in the summarization results of the arrival interval or number of times of data loss.

The embodiments of present invention has been made to solve such a problem, and it is an object thereof to provide a data sequence correction method capable of accurately reordering received data in sequence number order even in a case in which there is a restriction on the number of storage regions of a ring buffer, and also the count of lost data can be accurately summarized.

Means for Solving the Problem

In order to solve the problem described above, in a data sequence correction method, data with sequence information imparted thereto is temporarily saved in a ring buffer and sequence correction is performed, the ring buffer having a predetermined number of storage regions corresponding to the sequence information, and being provided with a monitoring section made up of one, or two or more consecutive sequence numbers, and an acceptance section in which a start or a second sequence number of the monitoring section is a start sequence number, and the sequence number ahead by a count of storage regions of the ring buffer including the start of the monitoring section is an end sequence number. The method includes: a step of, in a case of a sequence number of received data being within the acceptance section, writing the received data to a position of the storage region that corresponds to a value decided on the basis of a remainder from dividing the sequence number of the received data by the count of storage regions of the ring buffer; a step of reading out all data within the monitoring section in a case of data being written to all of the monitoring section; a step of updating the respective start sequence number and end sequence number of the monitoring section and the acceptance section ahead, within a range of a count of sequence numbers in the monitoring section; a step of, in a case in which a count of data stored in the ring buffer is o, writing the received data to a position of the storage region corresponding to a value decided on the basis of a remainder from dividing the sequence number of the received data by the count of storage regions of the ring buffer, taking the received data as a start of the monitoring section, and deciding a respective start sequence number and end sequence number of the monitoring section and the acceptance section in accordance with the start of the monitoring section; a step of determining that data loss exceeding a storage limit of the ring buffer has occurred in a case of satisfying a determination condition set in advance, even if one or more positions of the monitoring section is clear, updating the respective start sequence number and end sequence number of the monitoring section and the acceptance section ahead by one, and incrementing the number of times of data loss; and a step of, in a case in which the received data is not first-time reception data in a state in which the count of data stored in the ring buffer is o, following deciding the monitoring section and the acceptance section with the received data as the start of the monitoring section, correcting the number of times of data loss in accordance with an amount of movement of the monitoring section and the acceptance section before and after deciding the monitoring section and the acceptance section.

In order to solve the problem described above, a packet monitoring device according to embodiments of the present invention includes: an arrival time information imparting unit that imparts arrival time information to a received packet containing sequence information in a header; a monitoring object extracting unit that extracts monitoring-object packets on the basis of information in the header of the received packet; a packet sequence correction unit that corrects the sequence of the monitoring-object packets by the method according to any one of claims 1 to 6, on the basis of the sequence information within the headers of the monitoring-object packets, and outputs arrival time information of two packets of which the sequence information is consecutive, determines that packet loss has occurred when two consecutive packets of which the sequence information are not present even when a storage limit of the ring buffer is exceeded, and advances the start position of the ring buffer and counts up the number of times of occurrence of packet loss; a packet interval calculating unit that finds packet intervals from difference in arrival times of two packets of which the sequence information is consecutive; a statistical information storage unit that stores frequency distribution of the packet intervals and the number of times of occurrence of packet loss; and a visualization unit that performs display as a histogram, on the basis of frequency distribution of the packet intervals and the number of times of occurrence of packet loss, stored in the statistical information storage unit.

In order to solve the problem described above, in a data sequence correction device according to embodiments of the present invention, data with sequence information imparted thereto is temporarily saved in a ring buffer and sequence correction is performed, the ring buffer having a predetermined number of storage regions corresponding to the sequence information, and being provided with a monitoring section made up of one, or two or more consecutive sequence numbers, and an acceptance section in which a start or a second sequence number of the monitoring section is a start sequence number, and the sequence number ahead by a count of storage regions of the ring buffer including the start of the monitoring section is an end sequence number, the data sequence correction device comprising: an acceptable/non-acceptable judging unit that judges whether a value decided on the basis of a remainder from dividing the sequence number of the received data by the count of storage regions of the ring buffer is within the acceptance section; a ring buffer writing unit that, in a case of the sequence number of the received data is within the acceptance section, writes the received data to a position of the storage region corresponding to a value decided on the basis of a remainder from dividing the sequence number of the received data by the count of storage regions of the ring buffer; a ring buffer reading unit that, in a case in which data is written to all of the monitoring section, reads out all data within the monitoring section; and a monitoring-section/acceptance-section managing unit that updates the respective start sequence number and end sequence number of the monitoring section and the acceptance section ahead, within a range of a count of sequence numbers of the monitoring section. The monitoring-section/acceptance-section managing unit, in a case in which a count of data stored in the ring buffer is o, writes the received data to a position of the storage region corresponding to a value decided on the basis of a remainder from dividing the sequence number of the received data by the count of storage regions of the ring buffer, takes the received data as a start of the monitoring section, decides a respective start sequence number and end sequence number of the monitoring section and the acceptance section in accordance with the start of the monitoring section determines that data loss exceeding a storage limit of the ring buffer has occurred in a case of satisfying a determination condition set in advance, even if one or more positions of the monitoring section is clear, updates the respective start sequence number and end sequence number of the monitoring section and the acceptance section ahead by one, and increments the number of times of data loss, and in a case in which the received data is not first-time reception data in a state in which the count of data stored in the ring buffer is 0, corrects the number of times of data loss in accordance with an amount of movement of the monitoring section and the acceptance section before and after deciding the start sequence number.

In order to solve the problem described above, a data sequence correction program according to embodiments of the present invention is for executing a data sequence correction method in which data with sequence information imparted thereto is temporarily saved in a ring buffer and sequence correction is performed, the ring buffer having a predetermined number of storage regions corresponding to the sequence information, and being provided with a monitoring section made up of one, or two or more consecutive sequence numbers, and an acceptance section in which a start or a second sequence number of the monitoring section is a start sequence number, and the sequence number ahead by a count of storage regions of the ring buffer including the start of the monitoring section is an end sequence number. The program causes a computer to execute a step of, in a case of a sequence number of received data being within the acceptance section, writing the received data to a position of the storage region that corresponds to a value decided on the basis of a remainder from dividing the sequence number of the received data by the count of storage regions of the ring buffer, a step of reading out all data within the monitoring section in a case of data being written to all of the monitoring section, a step of updating the respective start sequence number and end sequence number of the monitoring section and the acceptance section ahead, within a range of a count of sequence numbers in the monitoring section, a step of, in a case in which a count of data stored in the ring buffer is 0, writing the received data to a position of the storage region corresponding to a value decided on the basis of a remainder from dividing the sequence number of the received data by the count of storage regions of the ring buffer, taking the received data as a start of the monitoring section, and deciding a respective start sequence number and end sequence number of the monitoring section and the acceptance section in accordance with the start of the monitoring section, a step of determining that data loss exceeding a storage limit of the ring buffer has occurred in a case of satisfying a determination condition set in advance, even if one or more positions of the monitoring section is clear, updating the respective start sequence number and end sequence number of the monitoring section and the acceptance section ahead by one, and incrementing the number of times of data loss, and a step of, in a case in which the received data is not first-time reception data in a state in which the count of data stored in the ring buffer is 0, correcting the number of times of data loss in accordance with an amount of movement of the monitoring section and the acceptance section before and after deciding the start sequence number.

Effects of the Invention

As described above, according to embodiments of the present invention, a data sequence correction method can be provided that is capable of accurately reordering received data in sequence number order even in a case in which there is a restriction on the number of storage regions of a ring buffer, and also the count of lost data can be accurately summarized.

DETAILED DESCRIPTION OF ILLUSTRATIVE EMBODIMENTS

Embodiments of the present invention will be described below in detail with reference to the Figures. The present invention is not limited to the embodiments described below.

First Embodiment

An example will be described in an embodiment of the present invention regarding a case in which the object of sequence correction is packets, in which audio data is encoded at equal intervals by an audio codec such as G.711 or the like and stored in RTP (Real-time Transport Protocol) packets and transmitted, in an IP phone call. Note that the object of application of the present invention is not limited to the configuration of packets described below.

Figure 1:
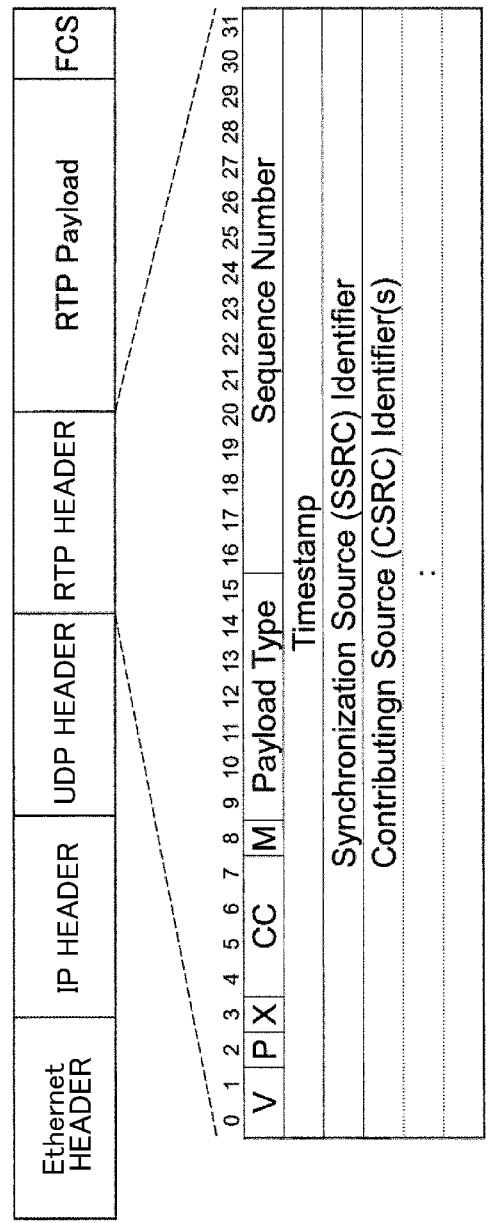
FIG. 1 is a configuration example of a packet format according to the present embodiment.

FIG. 1 is a configuration example of the format of an RTP packet that is the object of sequence correction in a first embodiment. An RTP header of the RTP packet stores a sequence number (Sequence Number, bitwidth 16 bits, and range of 0 to 65535) indicating the sequence in which the packet was generated. The sequence numbers of a plurality of RTP packets sent out in the same call begin from a random value when beginning the call and are incremented by 1 until finishing the call, configured to return to 0 following 65535. Accordingly, RTP packets immediately following being generated are temporally at equal intervals, and the sequence numbers are in serial order.

Figure 2:
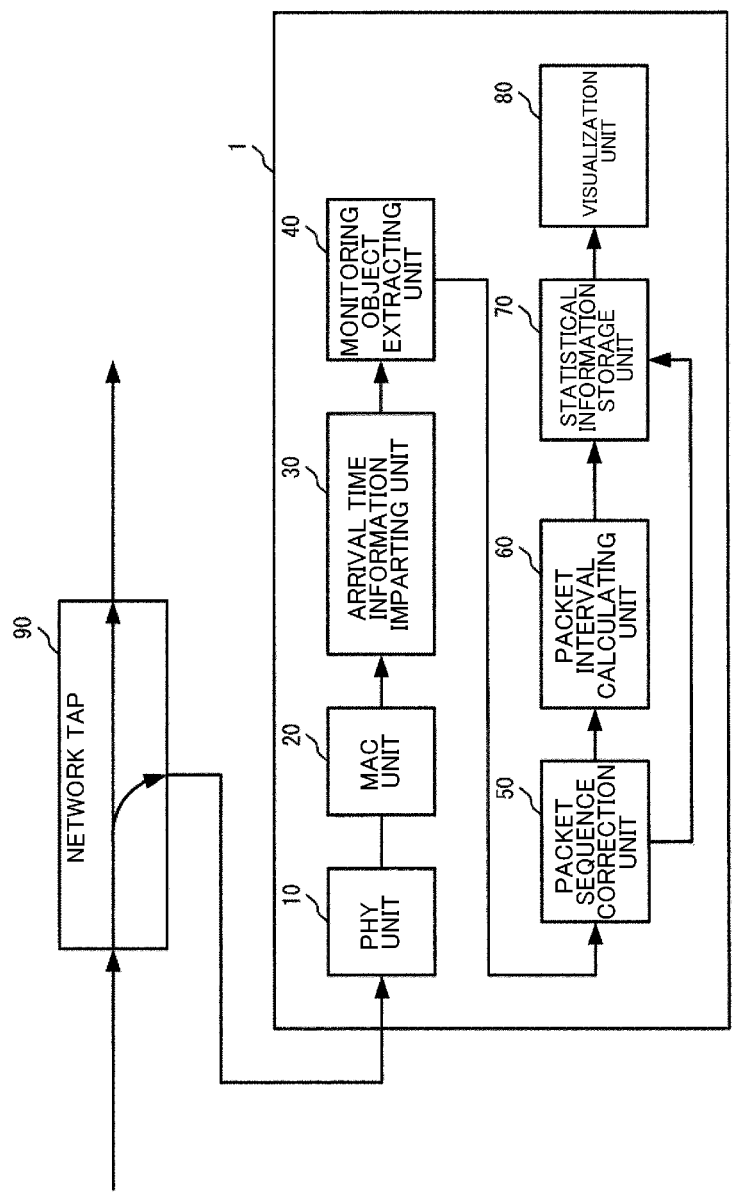
FIG. 2 is a diagram illustrating a configuration example of a packet monitoring device according to the present embodiment.

However, the delay of RTP packets following transmission on the transmission path are not the same for all packets. Accordingly, the packets do not arrive temporally at equal intervals, and further, there are cases in which the packets do not arrive in the order of the sequence numbers. Jittering among packets can be monitored by branching and extracting network signals by a network tap or the like installed on the communication path, finding the arrival intervals of serially-numbered RTP packets by a packet monitoring device, and displaying in a histogram of which the horizontal axis is packet arrival interval. FIG. 2 is a configuration example of a packet monitoring device according to the present embodiment.

Packet Monitoring Device

The packet monitoring device 1 according to the present embodiment is provided with a PHY unit 10 and a MAC unit 20 that perform physical layer (PHY) and datalink layer (MAC) processing with regard to received packets, an arrival time information imparting unit 30 that imparts arrival time information to received packets, a monitoring object extracting unit 40 that extracts monitoring-object packets in the same flow in which sequence information is contained in the headers, on the basis of information in the headers of the packets, a packet sequence correction unit 50 that corrects the sequence of the monitoring-object packets, on the basis of sequence information (sequence numbers in FIG. 1) within the headers of the monitoring-object packets, and outputs arrival time information of two packets of which the sequence information is consecutive, a packet interval calculating unit 60 that finds packet intervals from the difference in arrival times of two packets of which the sequence information is consecutive, a statistical information storage unit 70 that stores packet arrival intervals, and a visualization unit 80 that performs display as a histogram, on the basis of frequency distribution for each packet arrival interval stored in the statistical information storage unit 70.

Arrival Time Information Imparting Unit

The arrival time information imparting unit 30 imparts arrival time information to packets extracted by performing physical layer (PHY) and datalink layer (MAC) processing with regard to received packets. Examples of means for imparting time information include a method of inserting or overwriting in the header, or a method of transmitting to a downstream block in conjunction with the packet, and so forth.

Monitoring Object Extracting Unit

The monitoring object extracting unit 40 extracts packets that are to be the object of monitoring, on the basis of information within the headers of the packets. For example, the transmission source address and destination address in the headers of packets, and the destination port number within the UDP headers, are inspected, a packet that matches a value registered as a monitoring object is extracted as a monitoring-object packet, and transmitted to the packet sequence correction unit.

Packet Sequence Correction Unit

The packet sequence correction unit 50 corrects the sequence of monitoring-object packets on the basis of the sequence numbers extracted from the headers of the monitoring-object packets, and outputs arrival time information of two or more packets of which the sequence numbers are consecutive to the packet interval calculating unit 60. The increment/decrement count of the number of times of data loss is also output to the statistical information storage unit 70, to count the number of times of data loss detected in sequence correction and perform correction. The configuration of the packet sequence correction unit and the packet sequence correction method will be described in detail in the configuration and operation example of the packet sequence correction unit 50 described later.

Packet Interval Calculating Unit

Upon being input with arrival time information of two or more packets of which the sequence numbers are consecutive from the packet sequence correction unit 50, the packet interval calculating unit 60 finds the time interval of the packets from the difference in arrival times of the two consecutive packets. Subtracting the arrival time of the packet of which the sequence number is earlier from the arrival time of the packet of which the sequence number is later enables not only the time interval of the packets, but also whether or not the sequence of the packets has been reversed, to be determined.

Statistical Information Storage Unit

The statistical information storage unit 70 stores the frequency distribution of packet intervals found by the packet interval calculating unit 60. The increment/decrement count of the number of times of data loss found by the packet sequence correction unit 50 is also summarized and stored.

Visualization Unit

The visualization unit 80 displays the frequency distribution of packet intervals stored in the statistical information storage unit 70 as a histogram.

Configuration of Ring Buffer

Figure 3:
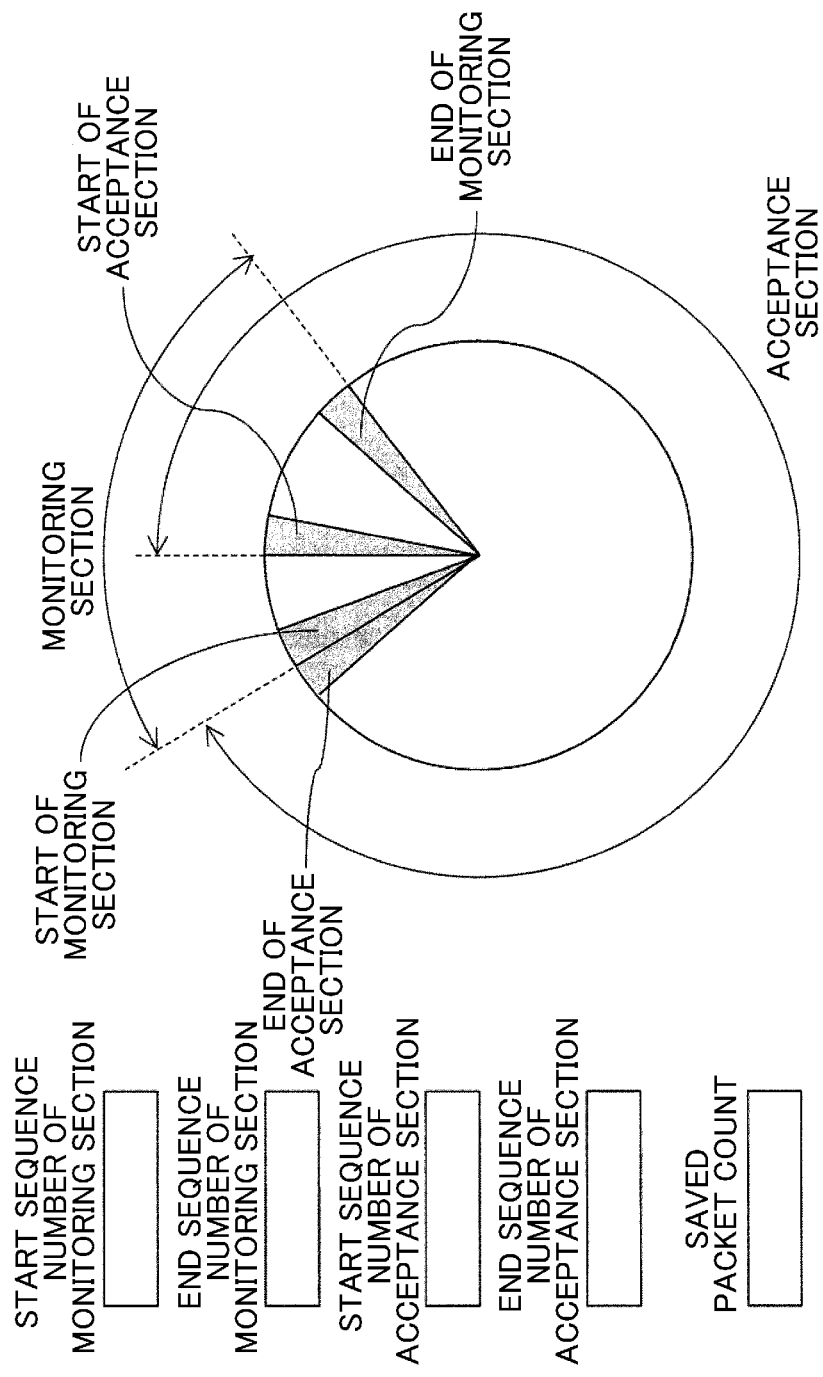
FIG. 3 is a diagram illustrating a configuration example of a ring buffer according to the present embodiment.
Figure 65:
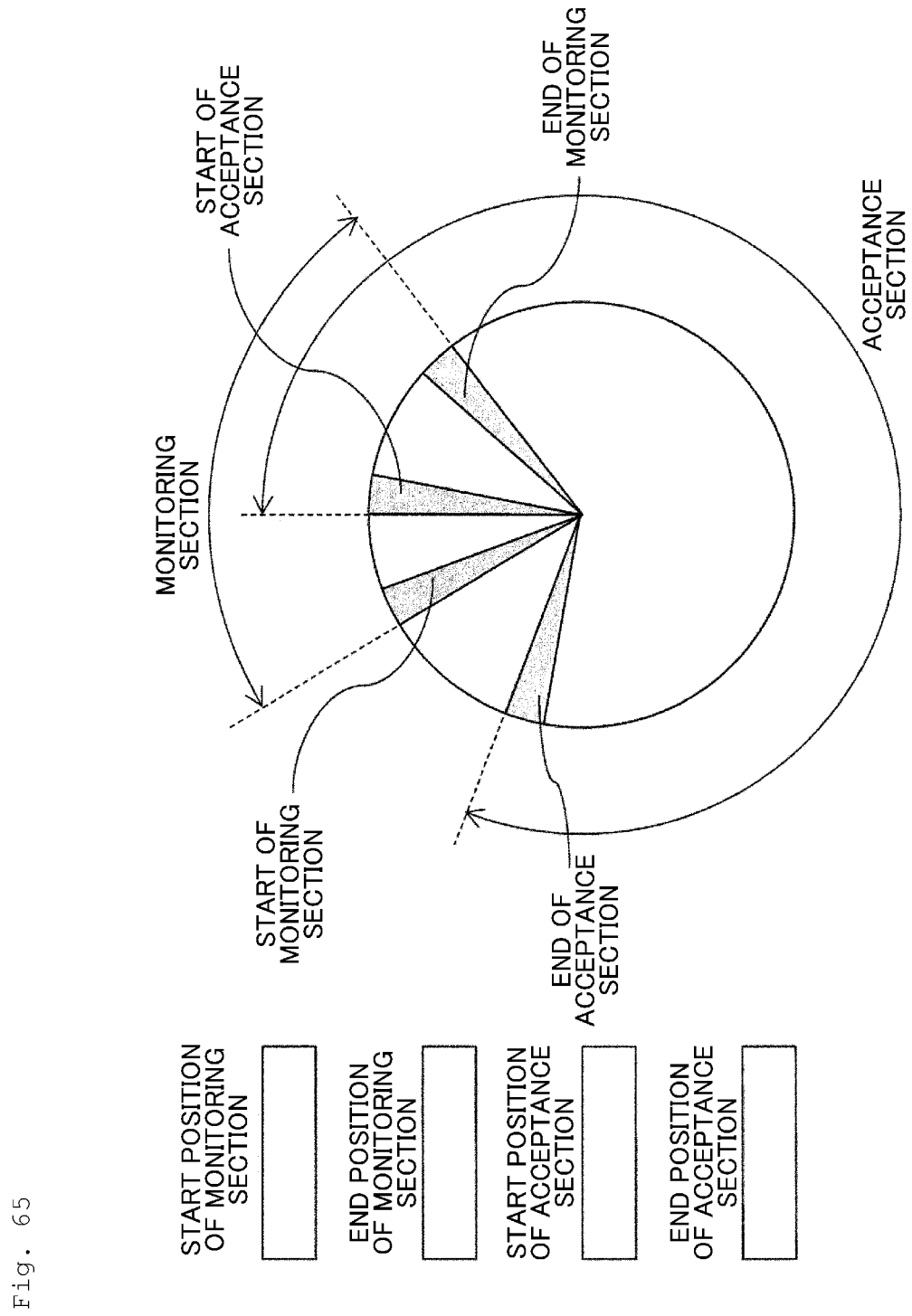
FIG. 65 is a configuration example of a conventional ring buffer.

FIG. 3 is a configuration example of a ring buffer according to the present embodiment. The ring buffer according to the present configuration example has a predetermined number of storage regions corresponding to the sequence information, and is provided with an acceptance section in which one, or two or more consecutive sequence numbers is a monitoring section, the start or the second sequence number of the monitoring section is the start sequence number, and the sequence number one before the start sequence number of the monitoring section is the end sequence number. A position corresponding to the sequence number circling the ring buffer one time from the start sequence number of the monitoring section is the end of the acceptance section. Unlike the conventional ring buffer in FIG. 65, the starts and ends of the monitoring section and the acceptance section are managed represented by sequence numbers in the embodiments of the present invention. Note that in a case where the widths and the intervals of the monitoring section and the acceptance section are the same, knowing one type of sequence number out of the four types of sequence numbers shown in FIG. 3 enables the other three types to be known as well, and accordingly it is sufficient to manage at least one type of sequence number.

In the ring buffer according to the present embodiment, whether a sequence number of received data is a sequence number within the acceptance section is judged, and in a case of being within the acceptance section, the received data is written to the storage region corresponding to the sequence number of the received data. Conversely, in a case in which the sequence number of the received data is outside of the acceptance section, the received data is discarded.

The above operations are repeatedly performed, and in a case in which all data is written in the monitoring section, all data within the monitoring section is read out, and also the respective start sequence number and end sequence number of the monitoring section and the acceptance section are incremented within a range of a count of sequence numbers in the monitoring section, and the monitoring section and the acceptance section are moved. For example, in a case in which the sequence number of the monitoring section is 2, the monitoring section and the acceptance section are moved ahead one storage region worth, or the monitoring section and the acceptance section are moved ahead two storage regions worth.

Configuration of Packet Sequence Correction Unit

Figure 4:
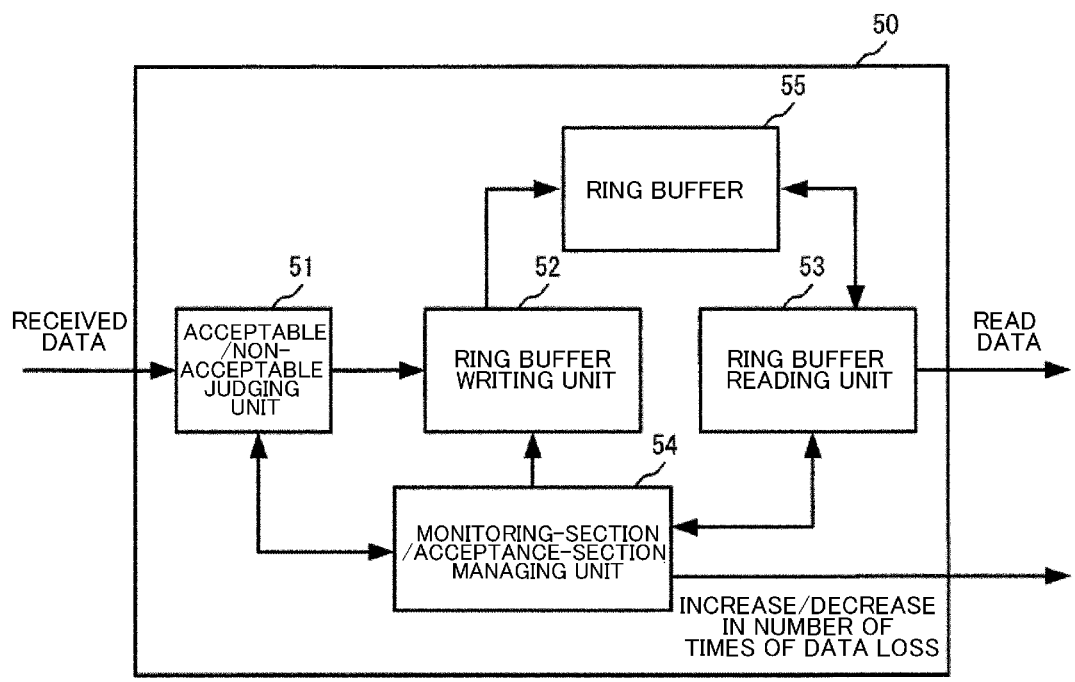
FIG. 4 is a diagram illustrating a configuration example of a data sequence correction device according to the present embodiment.

FIG. 4 is a configuration example of the packet sequence correction unit 50 according to the present embodiment. The packet sequence correction unit 50 is a functional unit that temporarily saves data with sequence information imparted thereto in the ring buffer, and performs sequence correction.

As illustrated in FIG. 4, the packet sequence correction unit 50 is configured of an acceptable/non-acceptable judging unit 51 that judges whether the sequence information of the received data is within the acceptance section, a ring buffer writing unit 52 that writes received data to a ring buffer 55 at the position of the storage region corresponding to the sequence information of received data in a case in which the sequence information of the received data is within the acceptance section, a ring buffer reading unit 53 that reads all data within the monitoring section from the ring buffer 55 in a case in which data is written to all of the monitoring section, and a monitoring-section/acceptance-section managing unit 54 that manages the monitoring section and the acceptance section, and performs moving thereof as necessary.

As one example of the packet monitoring device 1 according to the present embodiment, the PHY unit 10, the MAC unit 20, the arrival time information imparting unit 30, the monitoring object extracting unit 40, the packet sequence correction unit 50, the packet interval calculating unit 60, and the statistical information storage unit 70 can be realized as hardware on an NIC (Network Interface Card). The visualization unit 80 can be realized by a computer, visualization software installed in the computer, and a display connected to the computer.

Figure 5:
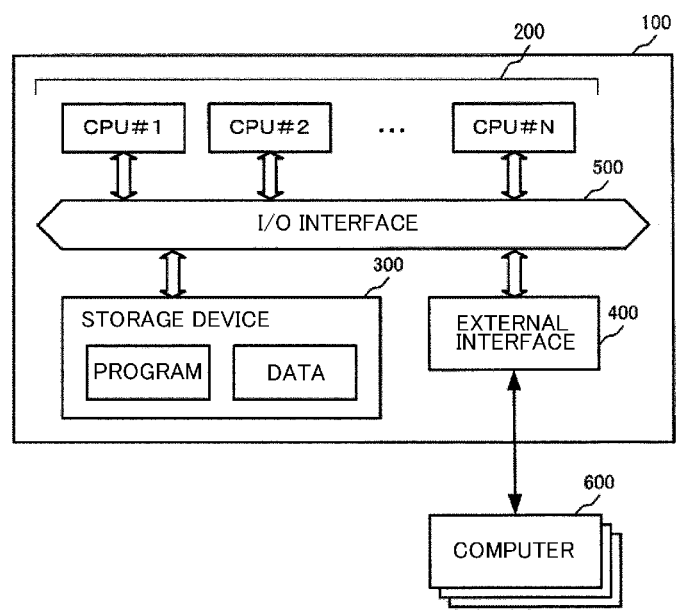
FIG. 5 is a configuration example of a computer for realizing the data sequence correction device and so forth according to the present embodiment.

As a separate example of the packet monitoring device 1 according to the present embodiment, the arrival time information imparting unit 30, the monitoring object extracting unit 40, the packet sequence correction unit 50, the packet interval calculating unit 60, the statistical information storage unit 70, and the visualization unit 80 can be realized by a computer provided with a CPU (Central Processing Unit), a storage device, and an external interface (hereinafter, external I/F), and by a program that controls these hardware resources. A configuration example of such a computer is illustrated in FIG. 5.

A computer 100 is provided with a CPU 200, a storage device 300, and an external I/F 400, each of which are connected to each other via an I/O interface 500. Programs, such as a data sequence correction program for realizing the operations of the packet monitoring device 1 according to the present embodiment and so forth, and data such as received data, arrival time information of received data, monitoring section, acceptance section, and so forth, is stored in the storage device 300. Another computer to mutually exchange signals with is connected to the external I/F 400. The CPU 200 executes processing described in the present embodiment following the data sequence correction program and so forth stored in the storage device 300. A configuration may also be made in which this processing program is recorded in a computer-readable storage medium.

Operation Example of Packet Sequence Correction Unit

Figure 6A:
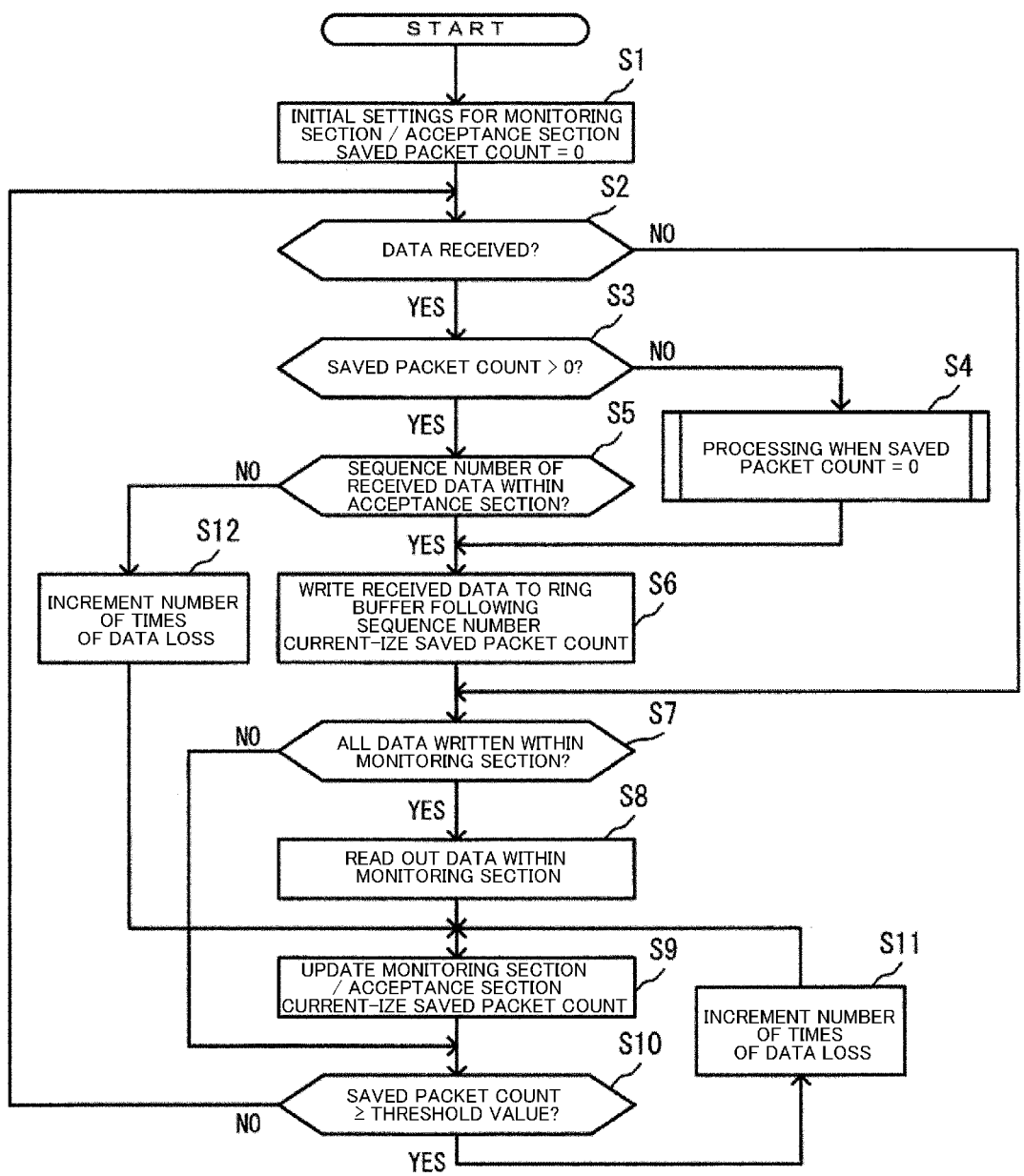
FIG. 6A is a diagram illustrating an example of an operation flowchart of a data sequence correction method according to a first embodiment.

FIG. 6A is an example of an operational flowchart of the data sequence correction method according to the present embodiment. In the data sequence correction method according to the present embodiment, the monitoring section and the acceptance section are initialized with the saved packet count=0 (S1). Included are a step of, upon receiving data (S2), in a case in which the saved packet count is greater than 0 (S3) and the sequence numbers of the received data is within the acceptance section (S1), writing the received data to the position of a storage region corresponding to a value decided on the basis of a remainder from dividing the sequence number of the received data by the count of storage regions of the ring buffer, and current-izing the saved packet count (S6), a step of, in a case of data being written to all of the monitoring section (S7), reading out all data within the monitoring section (S8), and a step of updating the respective start sequence number and end sequence number of the monitoring section and the acceptance section, and current-izing the saved packet (S9). In a case in which the saved packet count is smaller than a threshold value, the flow transitions to S2 and receives data, and the above operations are repeated. Note that updating the sequence number here means to move the sequence number ahead by 1.

In a case of the saved packet count reaching the threshold value, the flow transitions to S9 and updates the respective start sequence number and end sequence number of the monitoring section and the acceptance section, and current-izes the saved packet. In a case of not receiving data in S2, the flow transitions to S7, and repeats S2→S7→S8→S9→S10∝S2 until there is a break in consecutive data or new data is received.

Figure 6B:
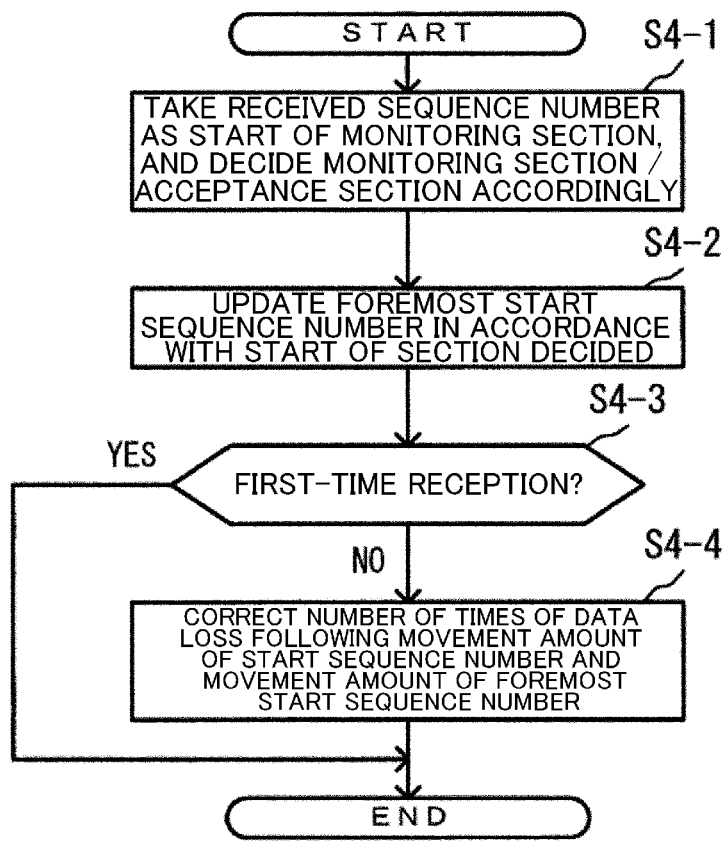
FIG. 6B is a diagram illustrating an example of an operation flowchart of processing when the saved packet count is 0, according to the first embodiment.

In a case in which the saved packet count is 0 in S3 the flow transitions to S4, and performs processing for when the saved packet count is 0, shown in FIG. 6B. The received sequence number is taken as the start of the monitoring section, and the end of the monitoring section, the start and the end of the acceptance section, and a later-described foremost start sequence number, are decided in accordance therewith (S4-1, S4-2), and in a case in which the received data is a first-time reception packet (S4-3), the flow transitions to S6. In a case in which the received data is not a first-time reception packet (S4-3), the result of subtracting an immediately-previous start sequence number from the decided start sequence number is added to the number of times of data loss, and the number of times of data loss is corrected (S4-4).

In a case of not being within the acceptance section in S5 the number of times of data loss is incremented (S12) and the flow transitions to S9, and in a case in which data is not written to all of the monitoring section in S7, the flow transitions to S10. In a case in which the saved packet count is no less than the threshold value in S10, the number of times of data loss is incremented (S11) and the flow transitions to S9, and S10 and S9 are repeated until the saved packet count is smaller than the threshold value.

Note that in the first embodiment, description will be made with regard to an example of a case in which the count of sequence numbers of the monitoring section is two, the respective start sequence number and end sequence number of the monitoring section and the acceptance section are updated ahead by one, and the monitoring section and the acceptance section are moved ahead by one.

Operations from Initial State

Figure 7:
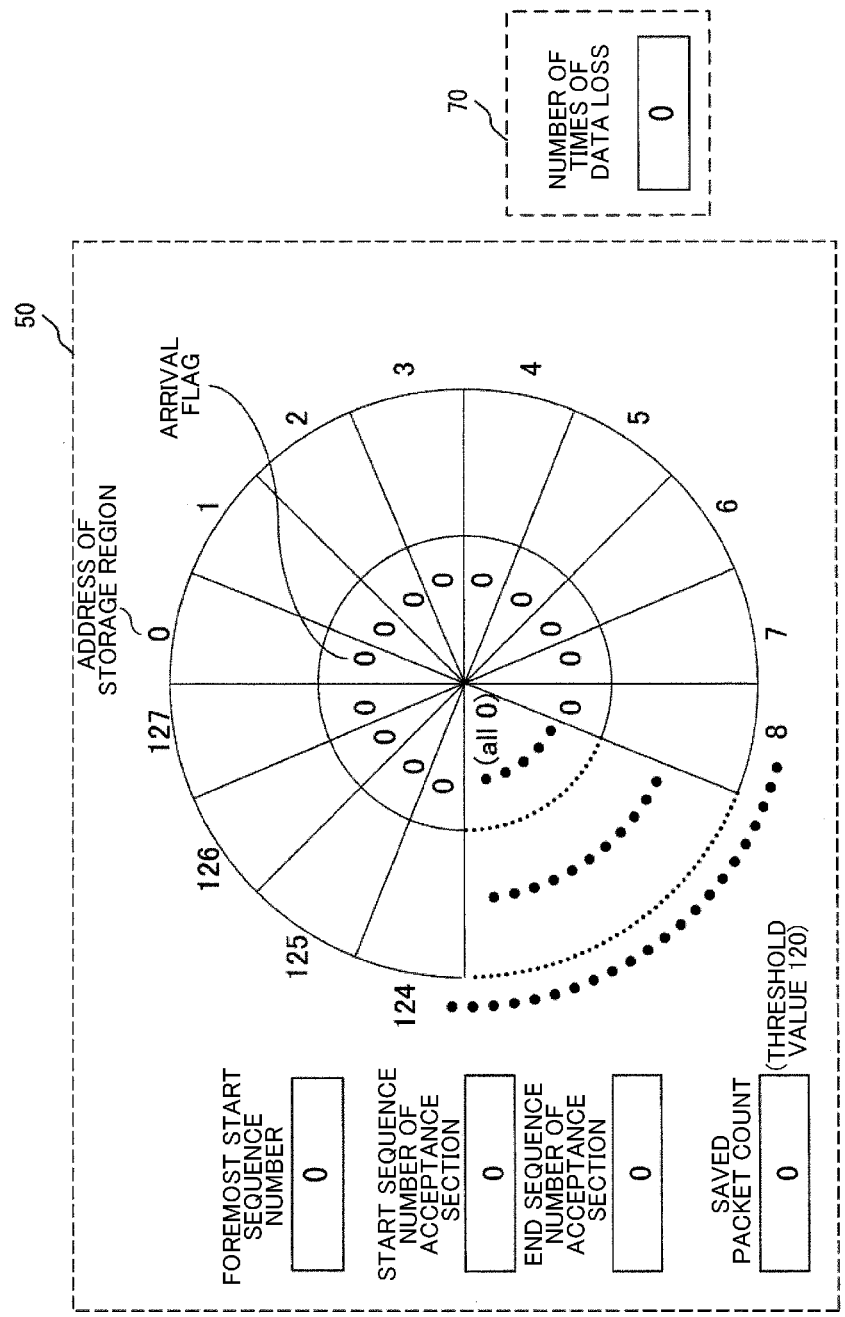
FIG. 7 is a diagram for describing an initial state of a ring ring buffer according to the first embodiment.

FIG. 7 is a diagram representing an initial state of the ring buffer according to the present embodiment. The number of storage regions of the ring buffer in FIG. 7 is 128, and is configured such that 128 packets worth of arrival time information and arrival flags of received packets can be stored. In FIG. 7, the storage region where the start packet is stored is the start of the monitoring section, and two sequence numbers continuing therefrom are the monitoring section. The second sequence number of the monitoring section is the start of the acceptance section, and the sequence number at a count 126 (128 minus the width of the monitoring section) ahead of the start sequence number of the monitoring section is the end of the acceptance section. In this case, the storage region corresponding to the sequence number one before the start sequence number of the monitoring section is the end of the acceptance section.

Packets that are the object of sequence correction are the RTP packet described in FIG. 1, and the sequence numbers 0 through 65535 within the RTP header correspond to the sequence numbers. There are 65535 sequence numbers but only 128 packets worth of storage regions in the ring buffer. Accordingly, the address of the storage region for storing the arrival time information and the arrival flag of each packet is decided by mod(sequence number, 128), and the threshold value for the saved packet count of the ring buffer is set to 120 packets, as one example. The storage region where a packet received in the initial state is stored becomes the start of the monitoring section, and the respective start sequence number and end sequence number of the monitoring section and the acceptance section are decided in accordance with the start of the monitoring section.

The packet sequence correction unit 50 holds the start sequence number and the end sequence number of the monitoring section and the acceptance section, the foremost start sequence number, and the saved packet count, in in a register. This information is updated whenever needed at the time of writing or reading arrival time information. The foremost start sequence number means the sequence number that is "foremost" when comparing the sequence numbers of all packets received after beginning packet monitoring. If a packet of sequence number 100 is received first, and sequence number 101 is received next, the "foremost" sequence number remains at 100, and if sequence number 99 is received next, the "foremost" changes to the sequence number99 that is before the sequence number 100.

In RTP packets, the sequence numbers start from a random value and are incremented by 1, and return to 0 after 65535, so when comparing sequence numbers 65535 and 0, sequence number 65535 comes first. However, the sequence numbers make one cycle at 65536 packets, and accordingly this needs to be handled when implementing. For example, after elapsing of a "certain long amount of time" from reception of the first packet, the probability of a packet of a sequence number even further before the "foremost start sequence number" arriving at that point in time is low. Accordingly, thereafter it is sufficient not to execute processing of "cancelling out amount of start sequence number of acceptance section having moved backward beyond foremost start sequence number" such as in the description of FIG. 31, described later. In the case of an IP phone, with packet transmission intervals of 20 ms, 20 ms×65536=21.85 minutes are required for the sequence numbers to make one cycle, and accordingly the "certain long amount of time" can be set to around ten minutes (approximately ½ of 21.85 minutes).

Also, when data of the monitoring section is not all present, the packet sequence correction unit 50 moves the start position of the ring buffer ahead by one without awaiting arrival of the data, when a predetermined condition is satisfied and determination that data loss has occurred is made, and notifies the statistical information storage unit 70 of incrementing of the number of times of data loss. The predetermined condition is a case of the saved packet count reaching a predetermined count, a case of sequence information of arrival time information of received packets not being in an acceptance section, and a case of a predetermined amount of time elapsing. The statistical information storage unit 70 summarizes and stores the number of times of data loss in accordance with the increase/decrease count of the number of times of data loss input from the packet sequence correction unit 50.

Write Operations

Figure 8:
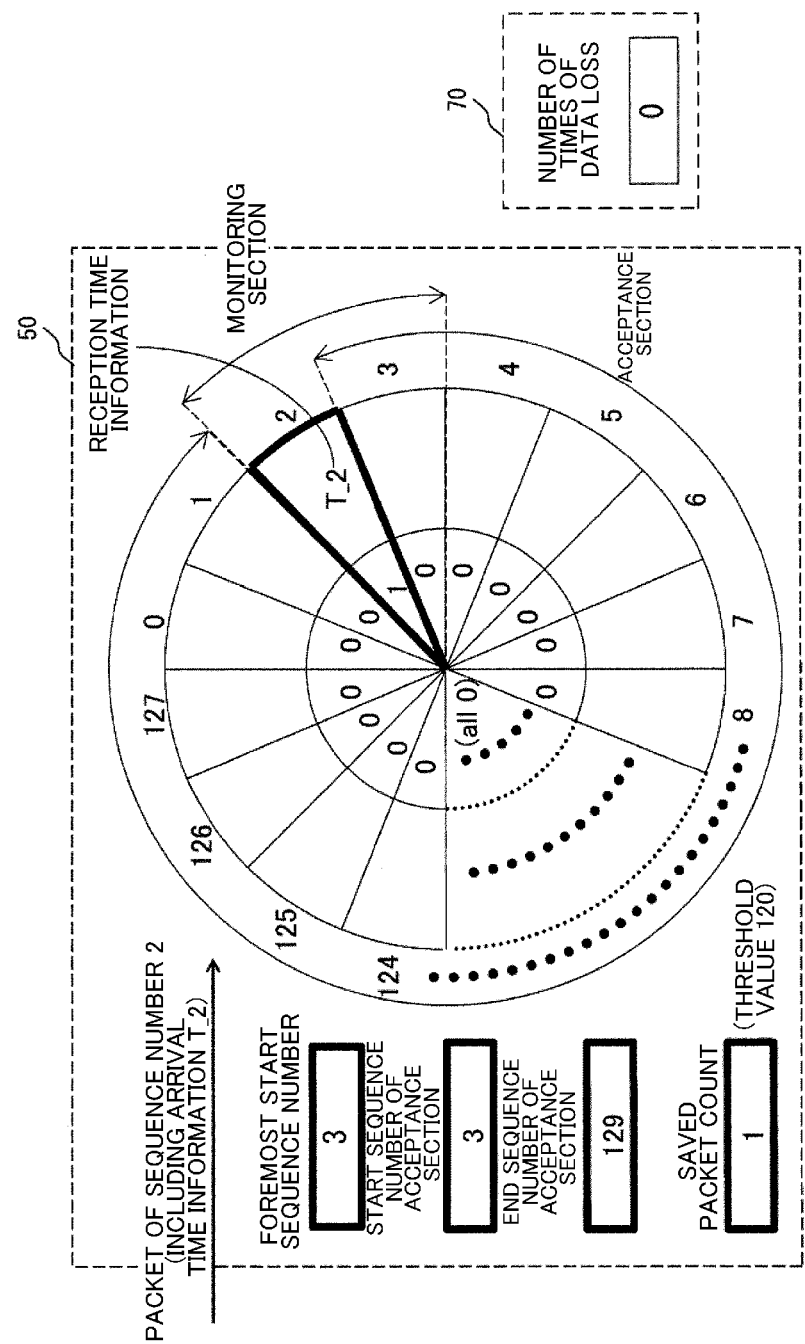
FIG. 8 is a diagram for describing operations of the ring ring buffer according to the first embodiment.

FIG. 8 is a state of the ring buffer after a packet of sequence number=2 arrives in the initial state in which the saved packet count=0 illustrated in FIG. 7, and the arrival time information T_2 thereof is written. T_2 is written to address 2 (=mod(2, 128)) of the storage region corresponding to sequence number 2, and accordingly sequence number "2" becomes the start of the monitoring section. Upon T_2 begin written to address 2, the arrival flag of address 2 of the storage region is set to 1, the start sequence number of the acceptance section is "3", which is one ahead of the start sequence number "2" of the monitoring section, and the end sequence number of the acceptance section is "129", which is a count 126 (128 minus 2) ahead the start sequence number 3. The count of storage regions of which the arrival flag is 1 is one, and accordingly the saved packet count is 1. This is the first reception packet, and accordingly the foremost start sequence number is "3", which is the same as the start sequence number of the acceptance section.

Figure 9:
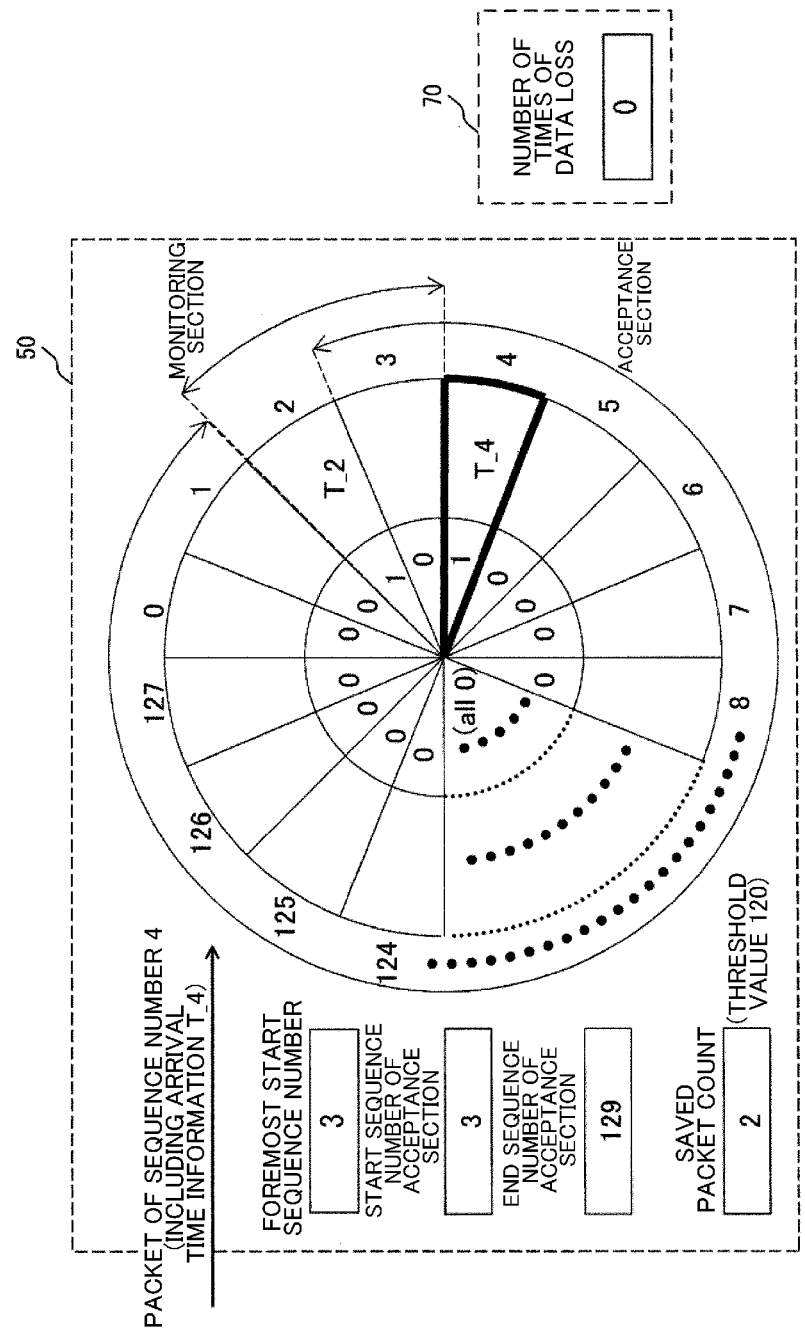
FIG. 9 is a diagram for describing operations of the ring ring buffer according to the first embodiment.

FIG. 9 is a state of the ring buffer after a packet of sequence number=4 arrives in the state in FIG. 8, and the arrival time information T_4 thereof is written. The sequence number 4 of the received packet is within the acceptance section, with regard to the end sequence number 129 from the start sequence number 3 of the acceptance section in FIG. 8, and accordingly T_4 is stored at address 4 (=mod(4, 128)) of the storage region corresponding to sequence number 4, the arrival flag of address 4 is set to 1, and the saved packet count is increased by 1 to 2. Data is not written to all of the monitoring section in the state in FIG. 9, and accordingly read processing from the monitoring section is not executed, and moving of the monitoring section and the acceptance section is not performed either.

Figure 10:
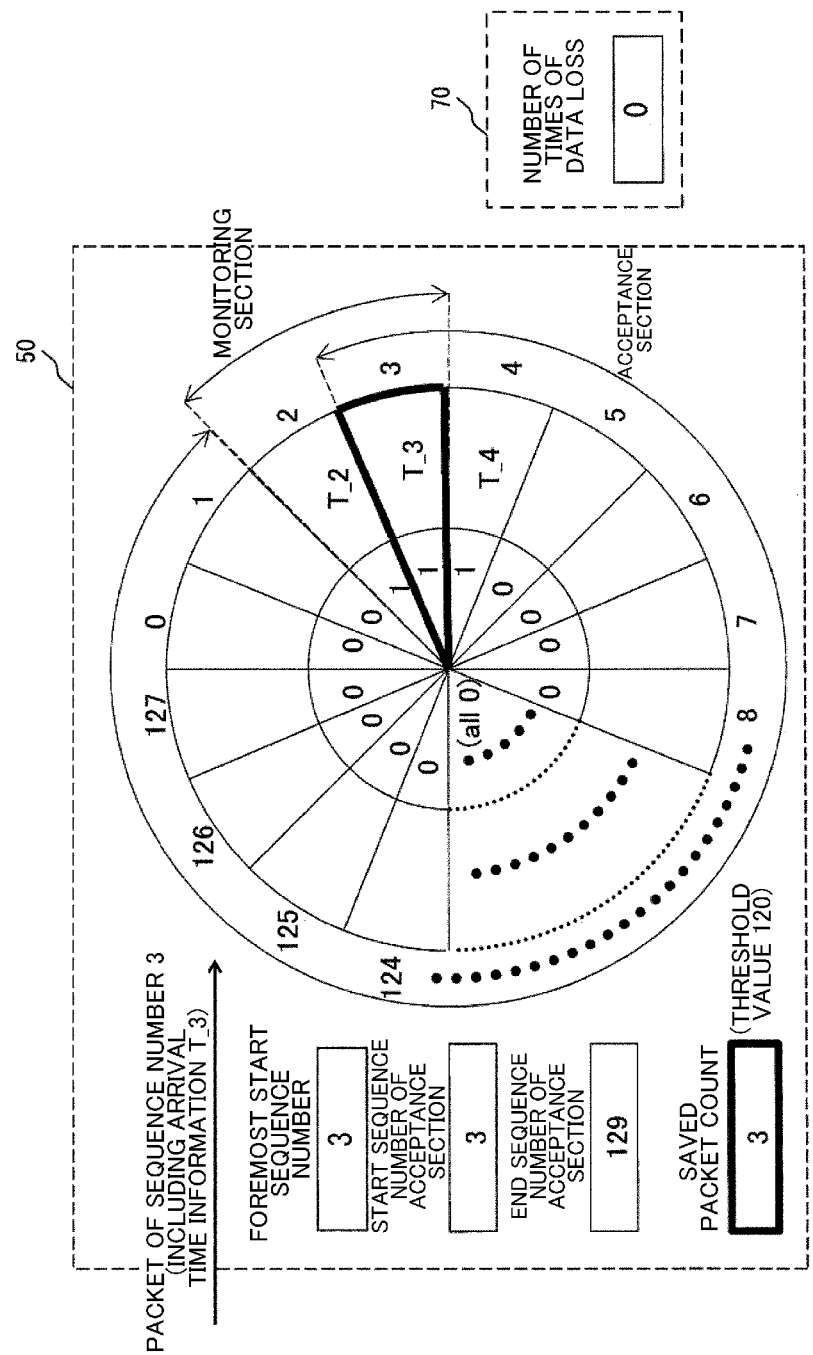
FIG. 10 is a diagram for describing operations of the ring ring buffer according to the first embodiment.

FIG. 10 is a state of the ring buffer after a packet of sequence number=3 within the acceptance section arrives in the state in FIG. 9, and a write operation is performed in the same way as in FIG. 9.

Read Operation

Figure 11:
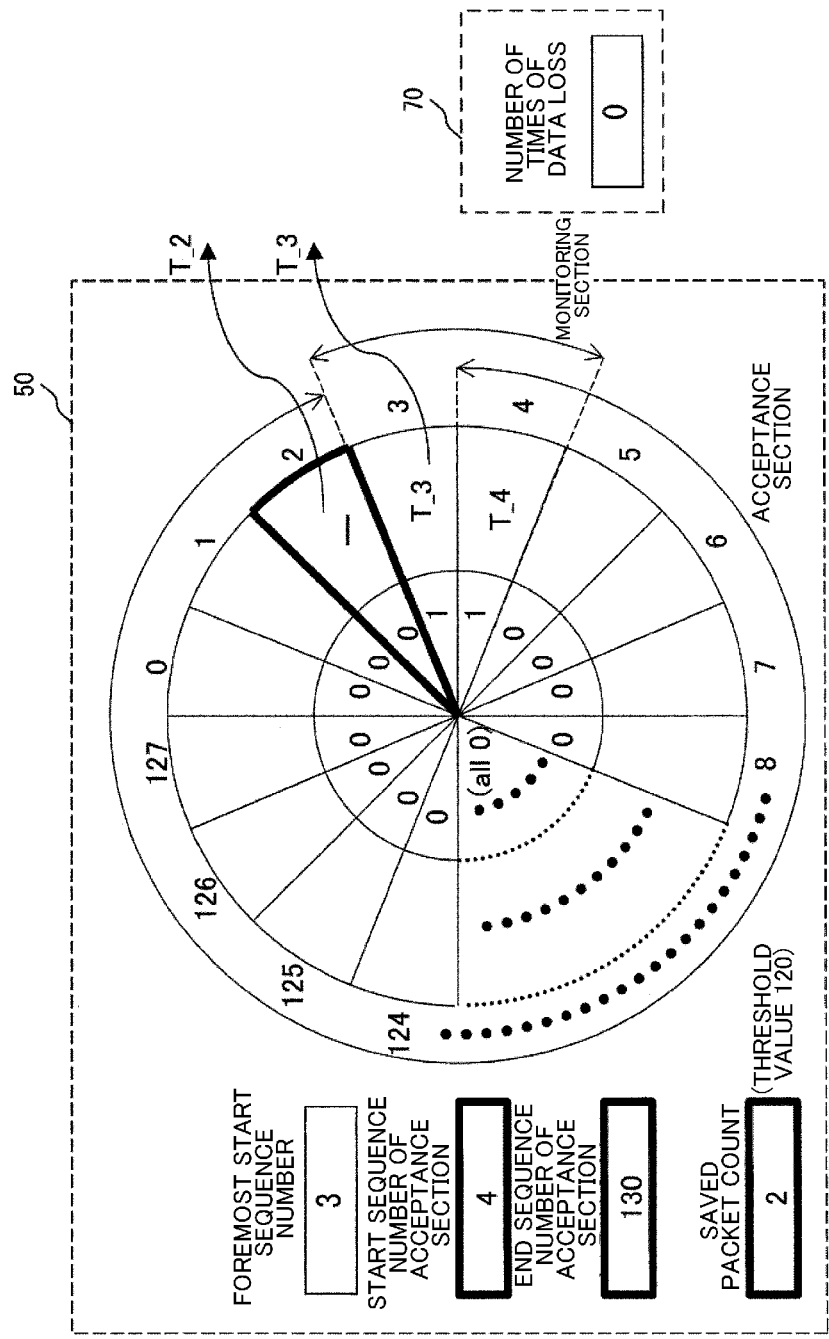
FIG. 11 is a diagram for describing operations of the ring ring buffer according to the first embodiment.

All data (arrival time information T_2, T_3) is present in the monitoring section in the state in FIG. 10, and accordingly processing of reading out all data in the monitoring section from the ring buffer is executed in FIG. 11. In accordance with read processing from the monitoring section being executed, the start sequence number and the end sequence number of the monitoring section and the acceptance section are each updated to one ahead, and the state is a state in which the monitoring section and the acceptance section are each moved ahead by 1. In this Figure, the data T_3 of sequence number 3 in the monitoring section is retained even after reading out the arrival time information T_2, T_3, in order to calculate the interval as to the packet of the next sequence number 4.

In FIG. 11, the start sequence number and the end sequence number of the monitoring section is updated from (2, 3) in FIG. 10 to (3, 4), which are numbers one ahead, the start sequence number and the end sequence number of the acceptance section are updated to (4, 130), which are numbers one ahead, and the monitoring section and the acceptance section are moved. The arrival flag of the storage region that has fallen outside of the monitoring section (address 2) is cleared, and the saved packet count is reduced by 1 to 2. The arrival time information T_2, T_3 read out from the ring buffer is transferred to the packet interval calculating unit, and the packet interval calculating unit calculates the packet interval (T_3 minus T_2) of the consecutive packets.

Figure 12:
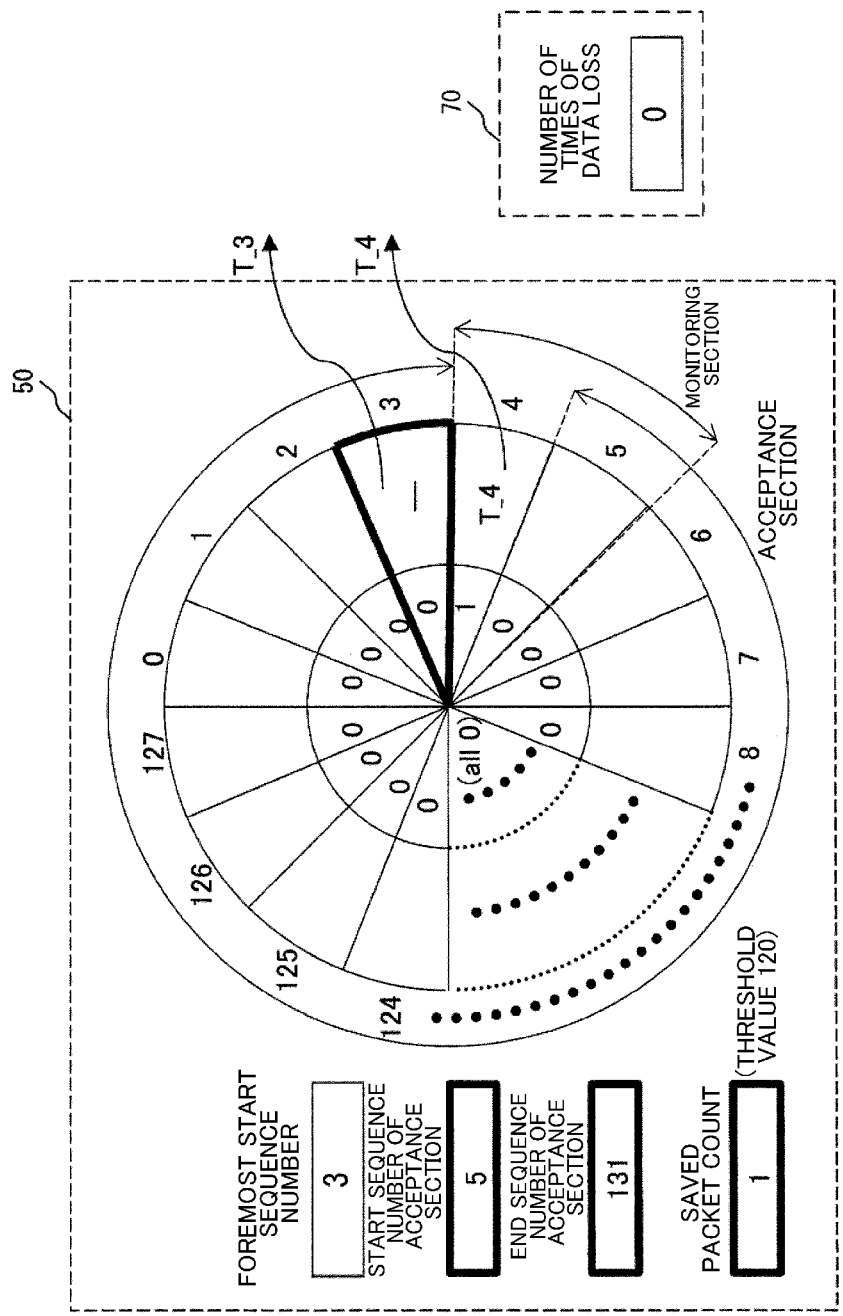
FIG. 12 is a diagram for describing operations of the ring ring buffer according to the first embodiment.

FIG. 12 is a state after a read operation is performed in the same way as in FIG. 11, due to all data (arrival time information T_3, T_4) being present in the monitoring section in the state in FIG. 11.

Operations when Saved Packet Count Reaches Threshold Value

Figure 13:
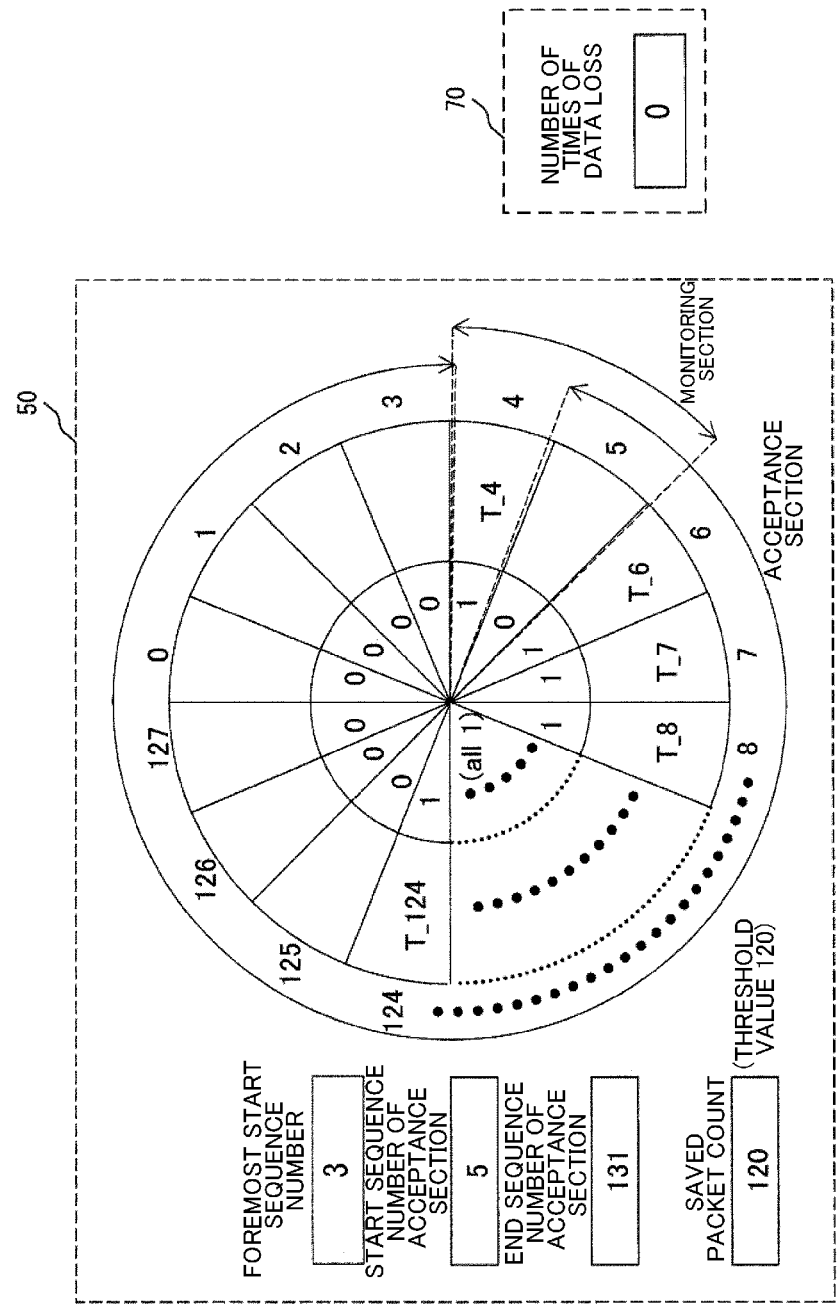
FIG. 13 is a diagram for describing operations of the ring ring buffer according to the first embodiment.

FIG. 13 is a state of the ring buffer after 119 packets with sequence numbers=6 through 124 arriving within the acceptance section following the state in FIG. 12 without the packet of sequence number=5 arriving, and the arrival time information T_6 through T_124 thereof has been written. The only data within the monitoring section is T_4, and data is not written to all of the monitoring section. Accordingly, no reading of data from the monitoring section is performed, moving of the monitoring section and the acceptance section is not performed either, and the start and the end sequence numbers of the monitoring section and the acceptance section are the same as in FIG. 12. Meanwhile, the saved packet count has increased by 119 to 120, and has reached the threshold value 120 of the saved packet count.

Figure 14:
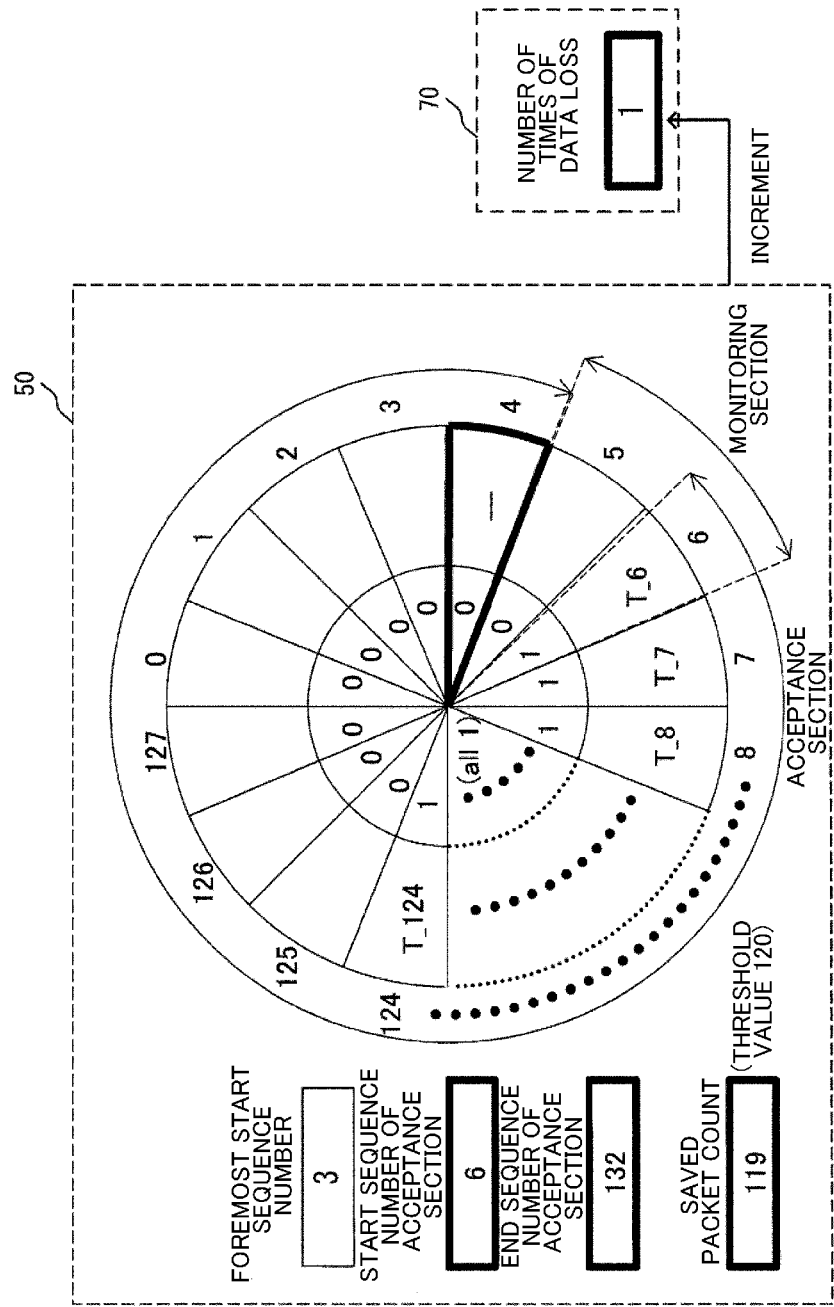
FIG. 14 is a diagram for describing operations of the ring ring buffer according to the first embodiment.

FIG. 14 is a state of the ring buffer in which the saved packet count has reached the threshold value 120 in FIG. 13 and data loss is determined to have occurred, and accordingly the monitoring section and the acceptance section are moved one each ahead. The start sequence number and the end sequence number of the monitoring section are updated to numbers (5, 6) one ahead of the (4, 5) in FIG. 13, the start sequence number and the end sequence number of the acceptance section are updated to numbers (6, 132) one ahead, and the state is a state in which the monitoring section and the acceptance section have moved. The arrival flag of a storage region that has fallen outside of the monitoring section (address 4) is in the set state in FIG. 13, and accordingly the arrival flag of address 4 is cleared, and the saved packet count is reduced by 1 to 119. The number of times of data loss is incremented, and the number of times of data loss becomes one.

Figure 15:
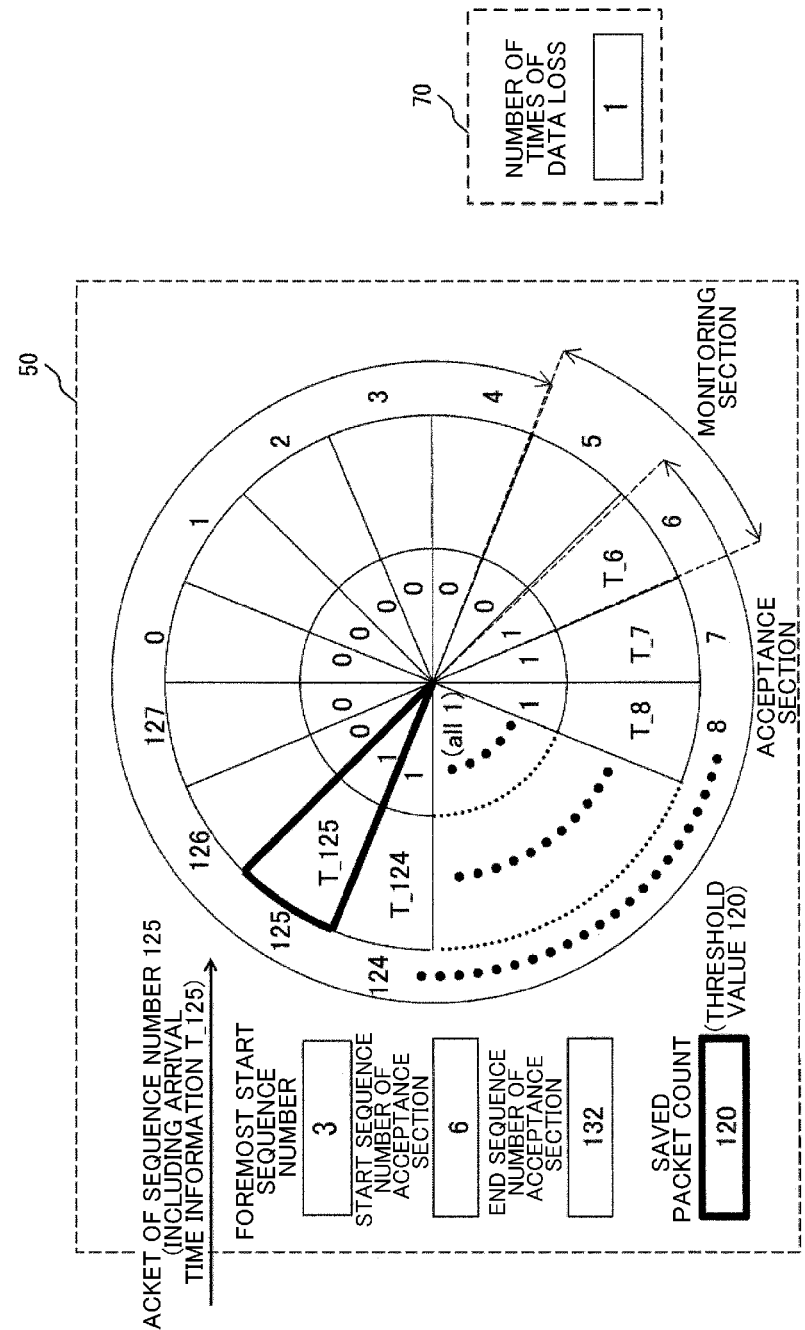
FIG. 15 is a diagram for describing operations of the ring ring buffer according to the first embodiment.

FIG. 15 is a state of the ring buffer after a packet of sequence number=125 in the acceptance section arrives in FIG. 14, and a write operation is performed in the same way as in FIG. 9. In the state in FIG. 15, data is not written to all of the monitoring section, and accordingly read processing from the monitoring section is not executed, and moving of the monitoring section and the acceptance section is not performed either. However, the saved packet count has reached the threshold value 120 in the same way as in FIG. 13, and accordingly moving of the monitoring section and the acceptance section is performed thereafter by the operations of when the saved packet count reaches the threshold value, in the same way as in FIG. 14.

Figure 16:
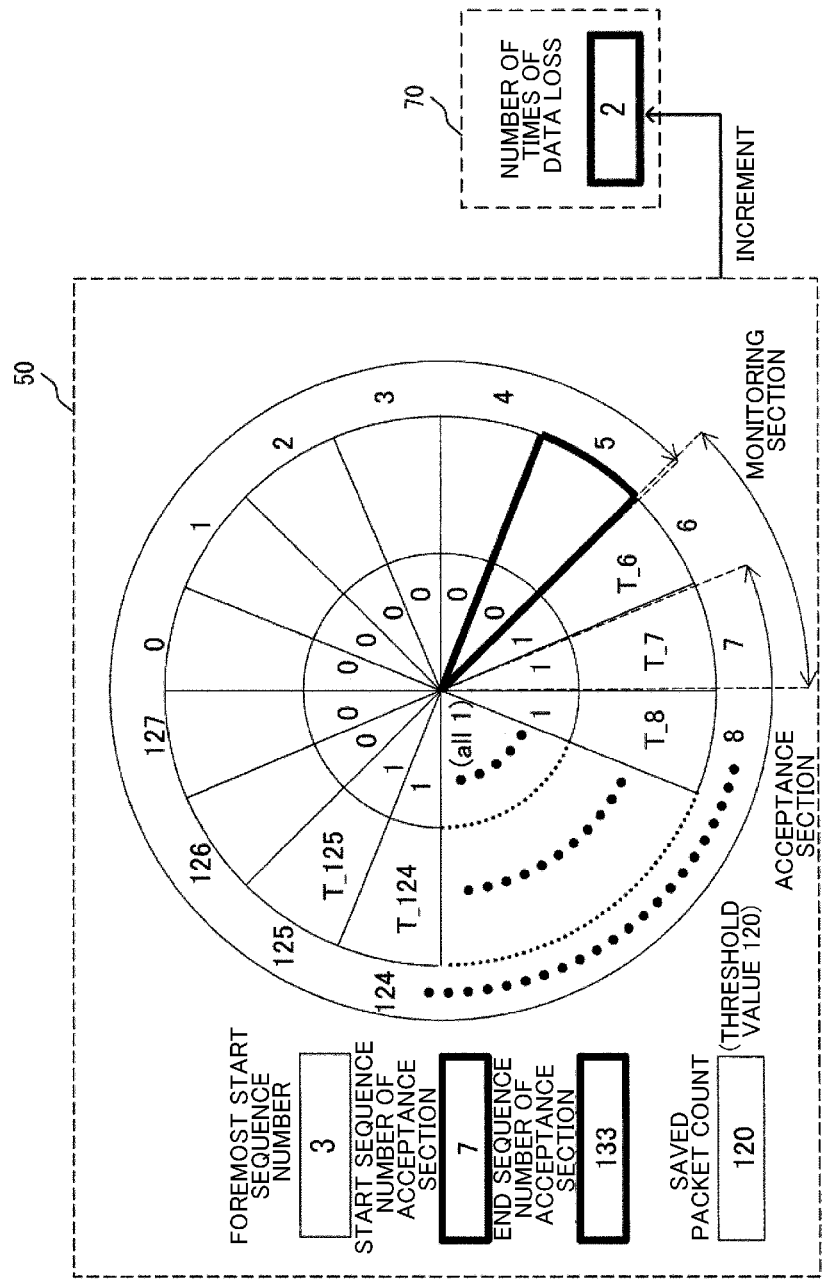
FIG. 16 is a diagram for describing operations of the ring ring buffer according to the first embodiment.

FIG. 16 is a state of the ring buffer in which the saved packet count has reached the threshold value 120 in FIG. 15 and data loss is determined to have occurred, and accordingly the monitoring section and the acceptance section are moved one each ahead, in the same way as in FIG. 14. Note however, that the arrival flag of the storage region that has fallen outside of the monitoring section (address 5) is cleared in the state in FIG. 15, and accordingly this arrival flag is maintained in the cleared state, and the saved packet count is not changed. The number of times of data loss is incremented, and the number of times of data loss becomes two.

In embodiments of the present invention, situations in which the monitoring section and the acceptance section are forcibly moved without calculating the arrival interval in a state in which consecutive data is not present are counted as data loss. Accordingly, even though the unarrived packet is the one of sequence number=5, two sets worth of consecutive data, i.e., sequence number=4 and sequence number=5, and sequence number=5 and sequence number=6, are not present, and thus the number of times of data loss is two times.

Figure 17:
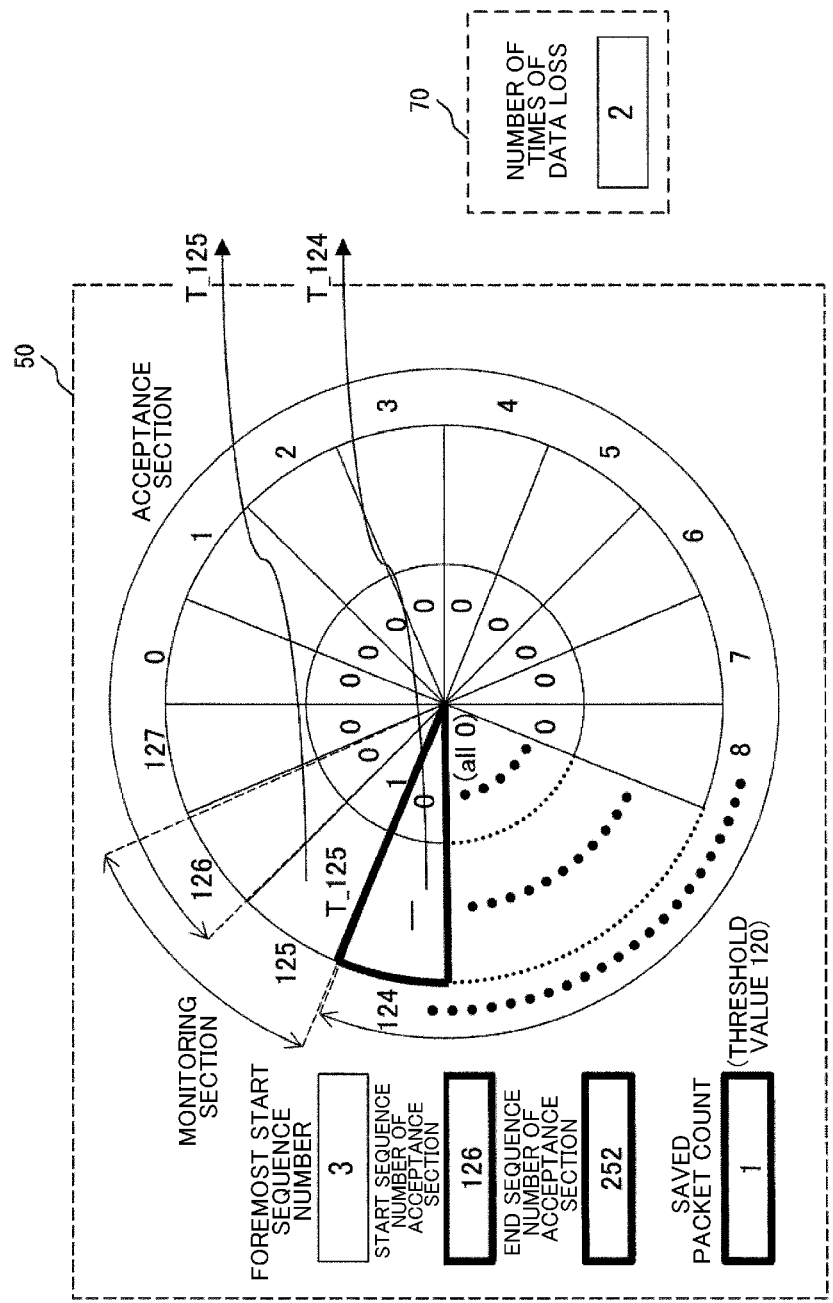
FIG. 17 is a diagram for describing operations of the ring ring buffer according to the first embodiment.

FIG. 17 is a state of the ring buffer after the arrival time information T_6 through T_125 being all present in the state in FIG. 16 and accordingly the read operation in the same way as in FIG. 11 in which data (T_i, T_i+1) within the monitoring section is read out from the ring buffer and the monitoring section and the acceptance section are moved ahead by 1 each is repeatedly performed until the data within the monitoring section is no longer all present (i=6, 7, . . . , 124). T_124 and T_125 of the addresses 124 and 125 are read out from the ring buffer at the last, the state is a state in which only T_125 of address 125 remains, the arrival flag of address 125 alone is 1, and the saved packet count=1. The start sequence number and the end sequence number of the monitoring section are (125, 126), and the start sequence number and the end sequence number of the acceptance section are (126, 252).

Operations when Receiving Packet Outside of Acceptance Section

Figure 18:
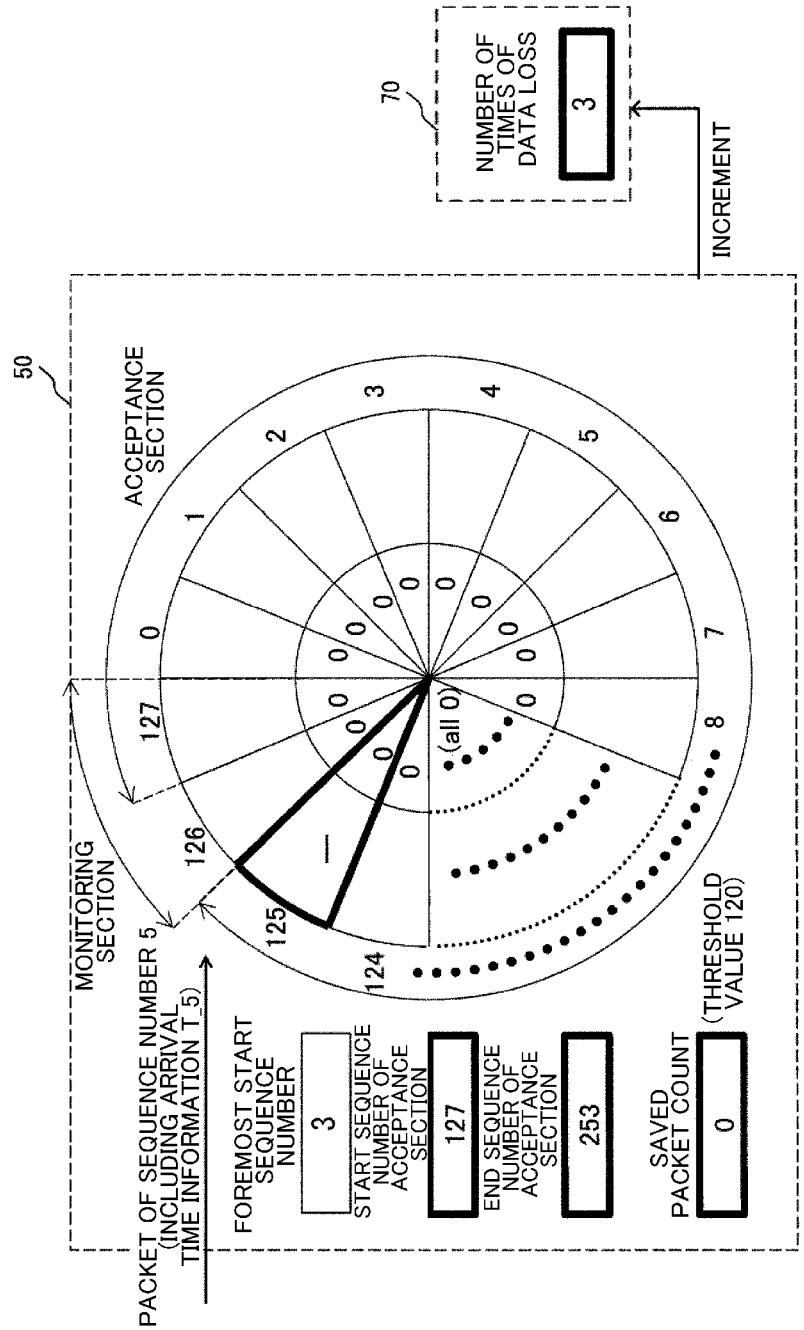
FIG. 18 is a diagram for describing operations of the ring ring buffer according to the first embodiment.

In FIG. 18, the start sequence number and the end sequence number of the acceptance section are (126, 252). This is a state of the ring buffer in which a packet of sequence number 5, outside of the acceptance section, arrives in the state in FIG. 17, and determination that data loss has occurred is made and the monitoring section and the acceptance section are moved ahead by one each without performing writing or reading. The state is a state in which the start sequence number and the end sequence number of the monitoring section (125, 126) are updated to one number ahead thereof (126, 127), the start sequence number and the end sequence number of the acceptance section are updated to one number ahead thereof (127, 253), and the monitoring section and the acceptance section are moved. The arrival flag of the storage region that has fallen outside of the monitoring section (address 125) is cleared, and the saved packet count is decremented by 1 to become 0. That is to say, this is the same as the initial state. The number of times of data loss is incremented, and the number of times of data loss becomes three.

In embodiments of the present invention, situations in which the monitoring section and the acceptance section are forcibly moved without calculating the arrival interval in a state in which consecutive data is not present are counted as data loss. Accordingly, in a state in which one consecutive data set of sequence number=125 and sequence number=126 is not present and the monitoring section and the acceptance section are forcibly moved without calculating the arrival interval, the number of times of data loss increases by one time to three times.

<Operations in Case of Receiving Packet that is not First-Time Reception when Saved Packet Count=0 and Monitoring Section and Acceptance Section Move Ahead>

Figure 19:
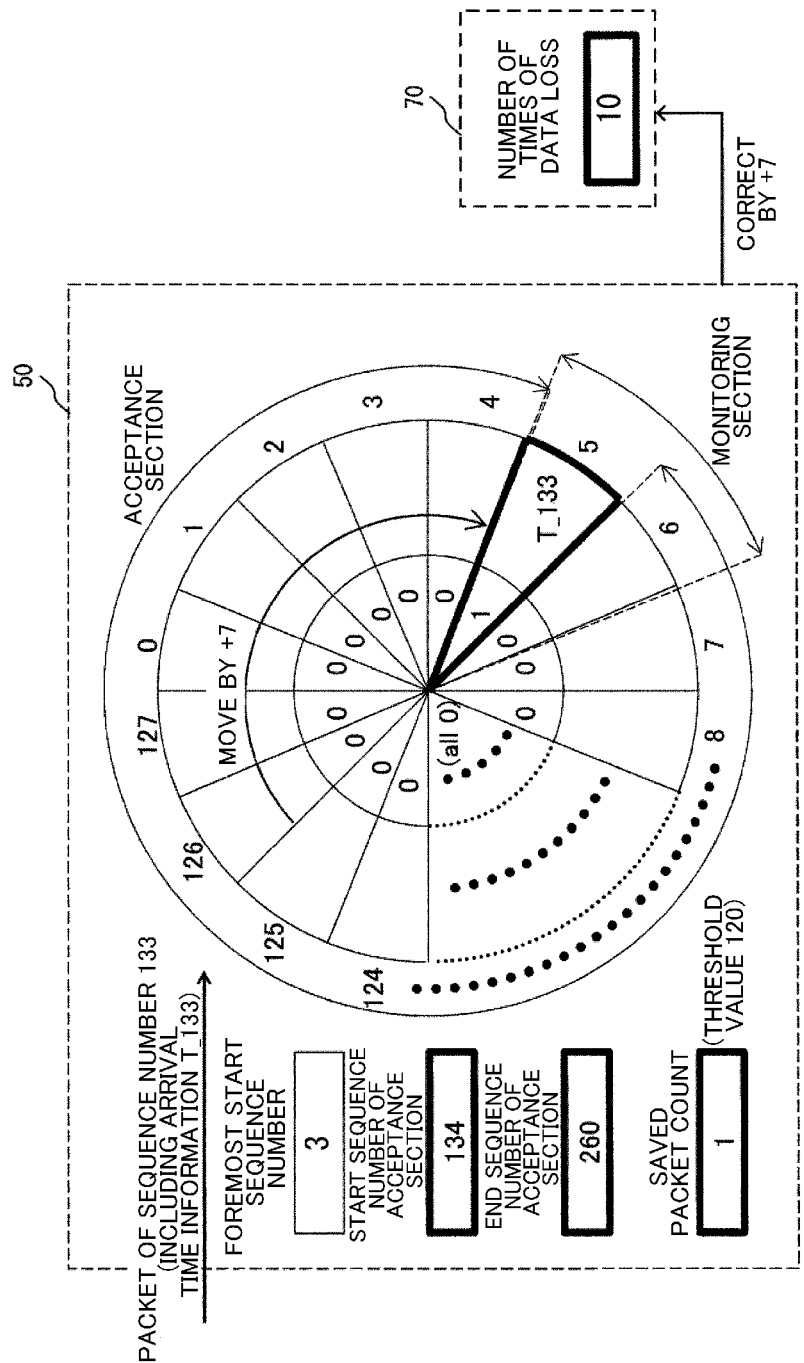
FIG. 19 is a diagram for describing operations of the ring ring buffer according to the first embodiment.

FIG. 19 is a state of the ring buffer after a packet of sequence number 133 arriving in the state of the saved packet count=0 illustrated in FIG. 18 and operations from the initial state are performed in the same way as in FIG. 8.

If not first-time reception data, this means that seven packets of sequence numbers 126 through 132 are unarrived, and data loss has occurred seven times, and accordingly there is a need to correct the number of times of data loss. The start sequence number of the acceptance section has moved "+7" from 127 to 134, and accordingly the number of times of data loss is corrected by "+7", and the number of times of data loss becomes ten.

In the state in FIG. 18 before packet reception, the current value of the foremost start sequence number is "3" and the decided start sequence number is "134", and accordingly "3" is an earlier number. Thus, the foremost start sequence number remains "3" in FIG. 19.

In FIG. 8 through FIG. 19, out of the total of 132 packets of sequence numbers 2 through 133 thought to have been output from the transmission source, 121 sets of consecutive packets have been read out from the ring buffer and the arrival intervals have been calculated and summarized. Meanwhile, in FIG. 19, the number of times of data loss is ten and the saved packet count is 1. The total thereof is 121+10+1=132, which matches the count of packets thought to have been output from the transmission source. Accordingly, it can be understood that the number of times of data loss is summarized properly by correction.

Figure 20:
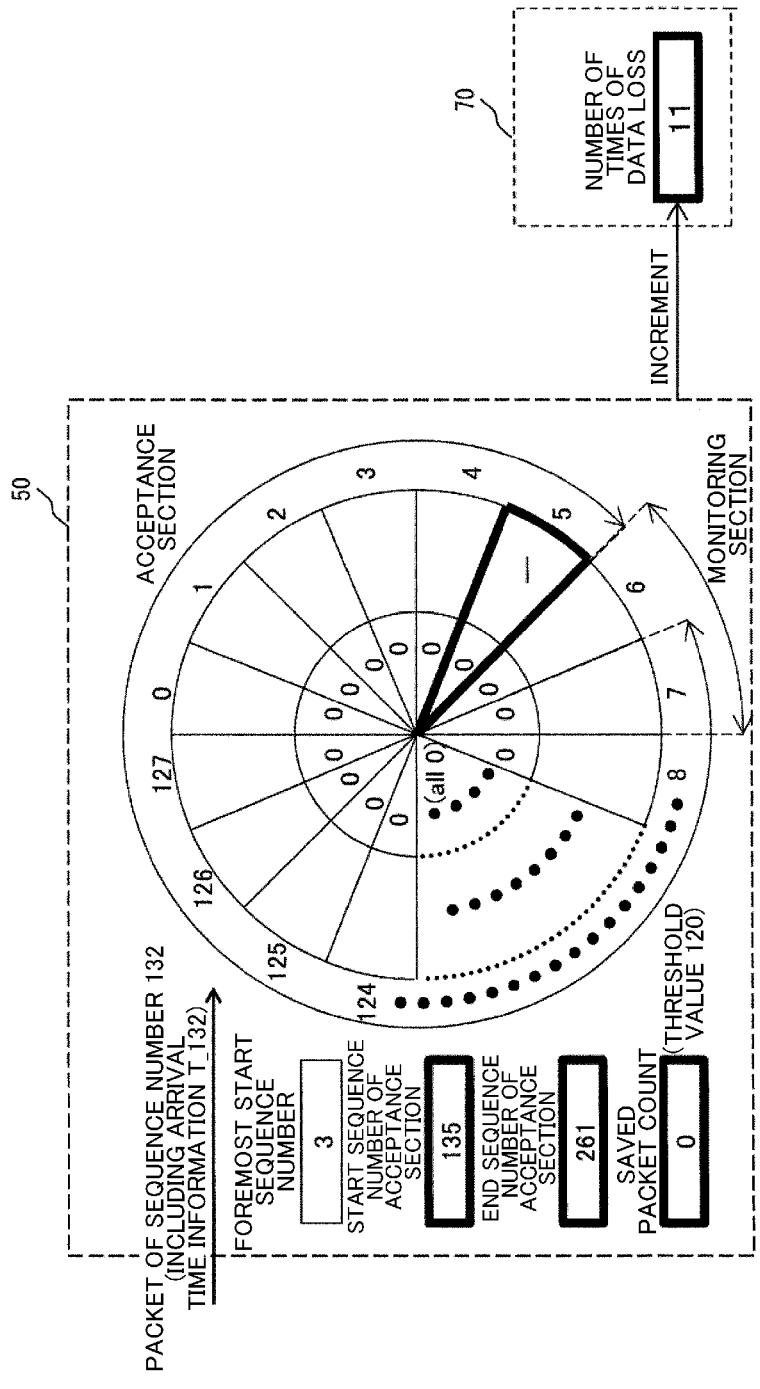
FIG. 20 is a diagram for describing operations of the ring ring buffer according to the first embodiment.

FIG. 20 is a state of the ring buffer after a packet of sequence number 132 outside of the acceptance section arrives in the state in FIG. 19, and the same operations of when receiving a packet outside of the acceptance section as in FIG. 18 are performed. The number of times of data loss is incremented, and the number of times of data loss becomes 11.

<Operations in Case of Receiving Packet that is not First-Time Reception when Saved Packet Count=0 and Monitoring Section and Acceptance Section Move Backward>

Figure 21:
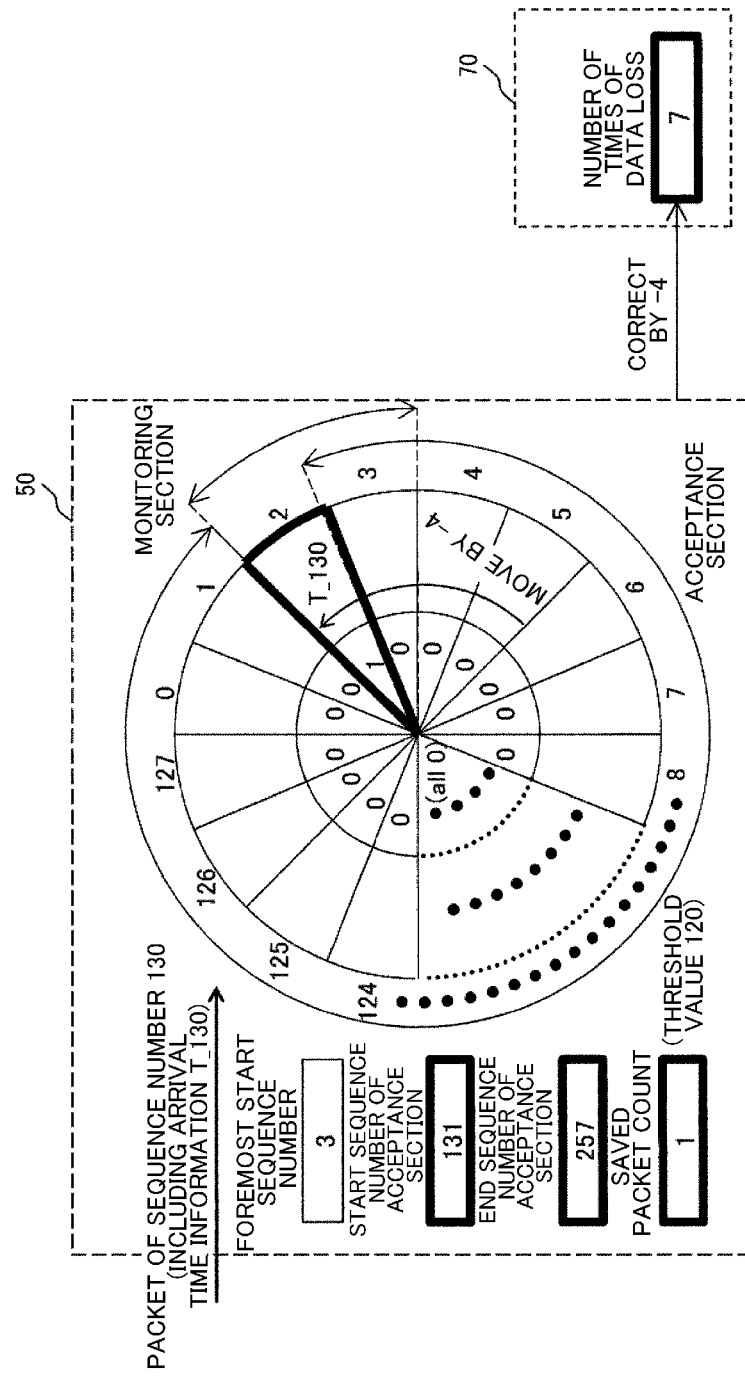
FIG. 21 is a diagram for describing operations of the ring ring buffer according to the first embodiment.

FIG. 21 is a state of the ring buffer after a packet of sequence number 130 arriving in the state of the saved packet count=0 illustrated in FIG. 20 and operations from the initial state are performed in the same way as in FIG. 8.

The four packets of sequence numbers 130 through 133 are summarized as data loss in FIG. 19, and accordingly summarizing data loss or arrival intervals in FIG. 21 or thereafter will result in summarizing the same packets in duplicate. There is a need to correct the number of times of data loss by the amount of the start sequence number moving backward, to avoid counting in duplicate. The start sequence number of the acceptance section has moved by "–a" from 135 to 131, and accordingly the number of times of data loss is corrected by "–a" and the number of times of data loss becomes seven.

The current value of the foremost start sequence number is "3" in the state in FIG. 20 before packet reception, and the decided start sequence number is "131", and accordingly "3" is an earlier number. Thus, the foremost start sequence number remains "3" in FIG. 21.

Figure 22:
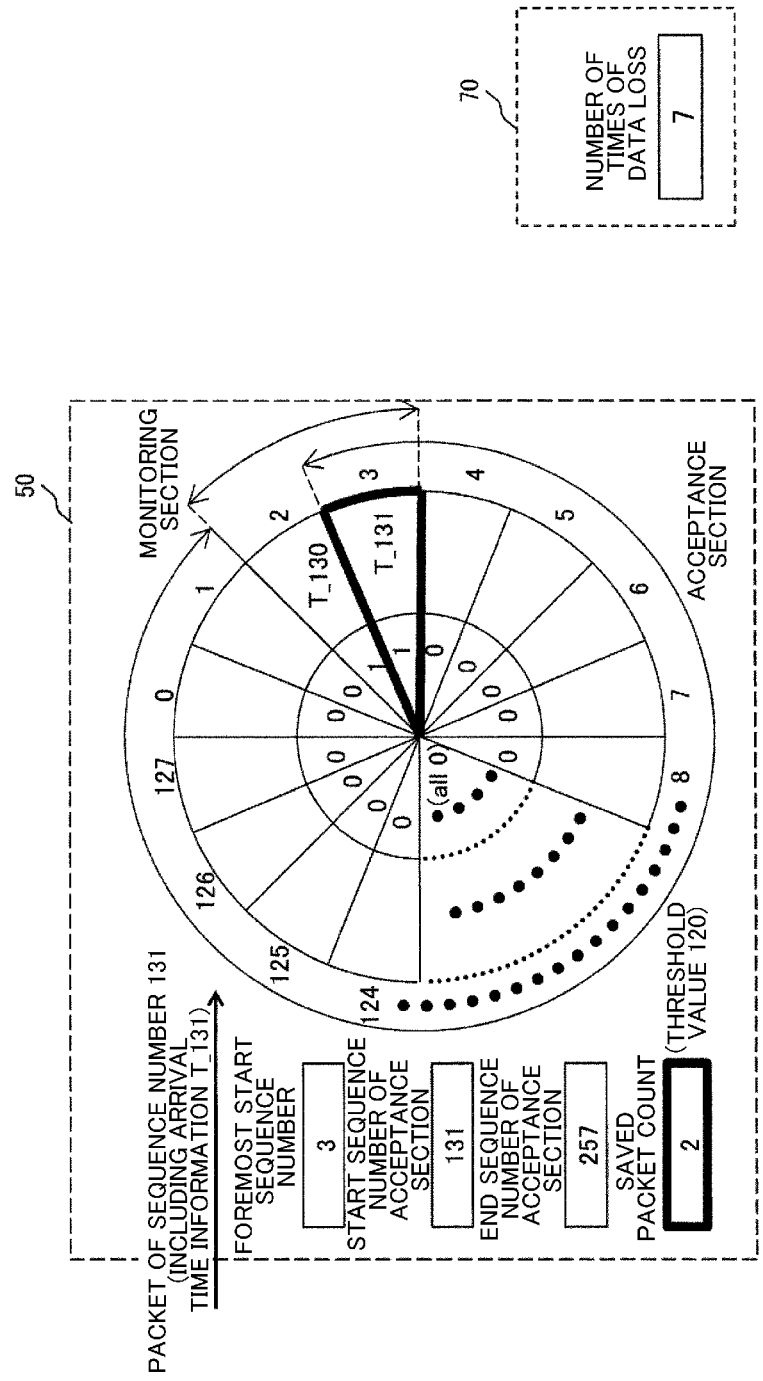
FIG. 22 is a diagram for describing operations of the ring ring buffer according to the first embodiment.

FIG. 22 is a state of the ring buffer after a packet of sequence number=131 arriving within the acceptance section in FIG. 21, and the arrival time information T_131 thereof is written. The start sequence number and the end sequence number of the monitoring section and the acceptance section do not change, and the saved packet count increases by 1 to 2, in the same way as in FIG. 9.

Figure 23:
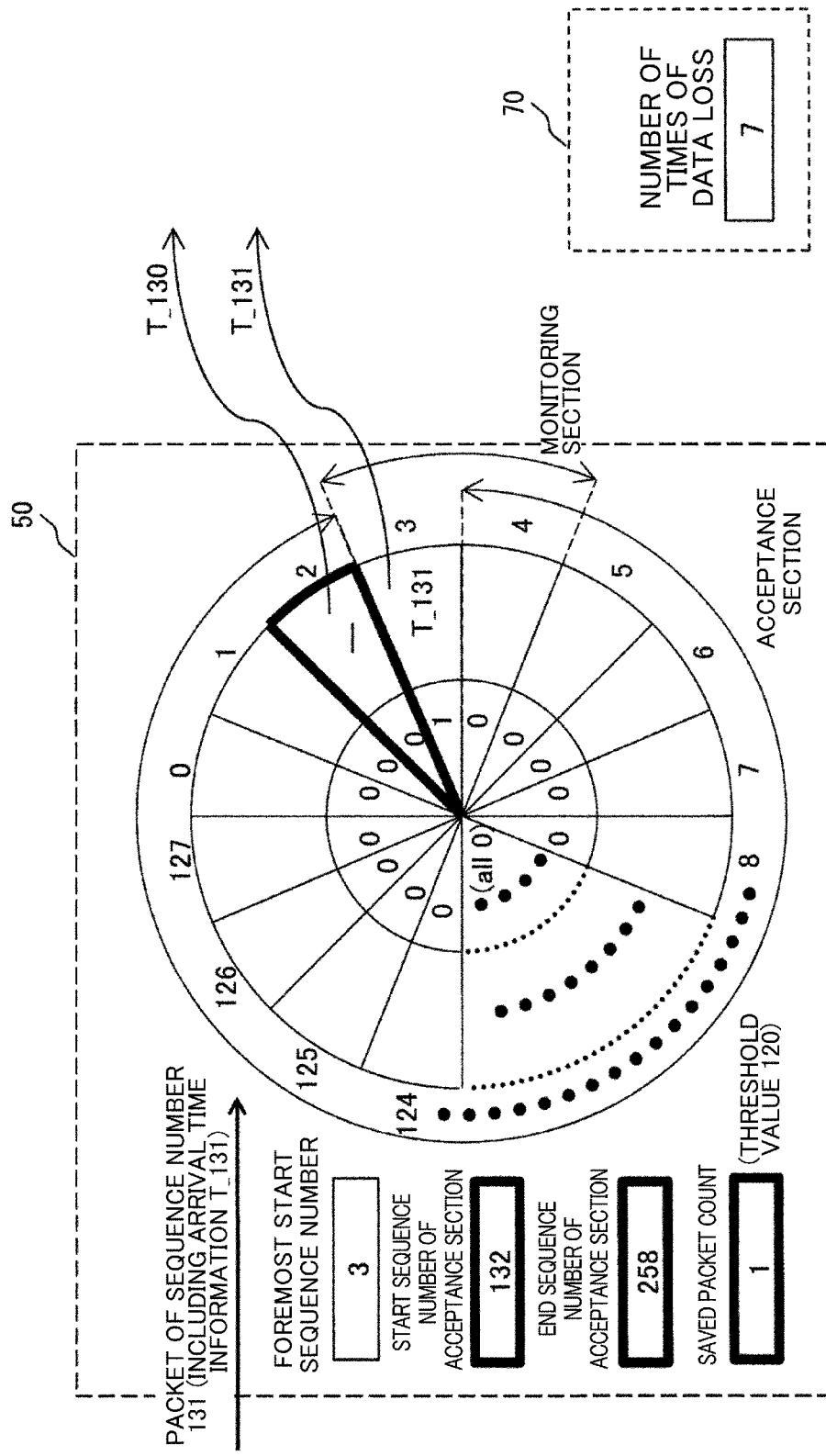
FIG. 23 is a diagram for describing operations of the ring ring buffer according to the first embodiment.

FIG. 23 is a state after performing the read operation in the same way as in FIG. 11 due to all data (arrival time information T_130, T_131) being present in the monitoring section in the state in FIG. 22.

Figure 24:
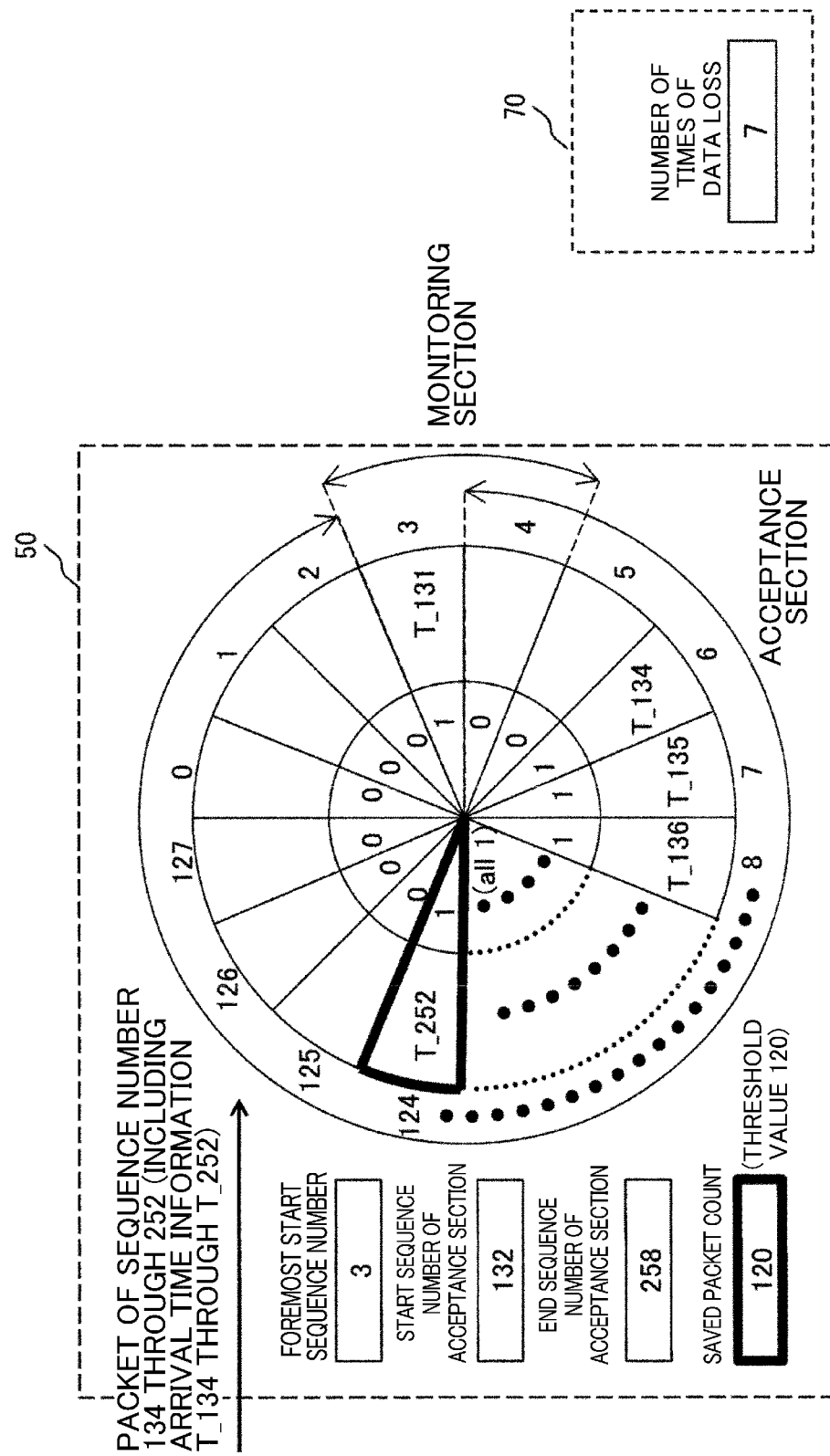
FIG. 24 is a diagram for describing operations of the ring ring buffer according to the first embodiment.

FIG. 24 is a state of the ring buffer after 118 packets of sequence numbers 134 through 252 arrive following the state in FIG. 23, and the arrival time information T_134 through T_252 thereof has been written. Not all data is present in the monitoring section, in the same way as in FIG. 13, and accordingly the start and the end sequence numbers of the monitoring section and the acceptance section do not change. The saved packet count has increased by 119 to 120, and has reached the threshold value 120 of the saved packet count.

Figure 25:
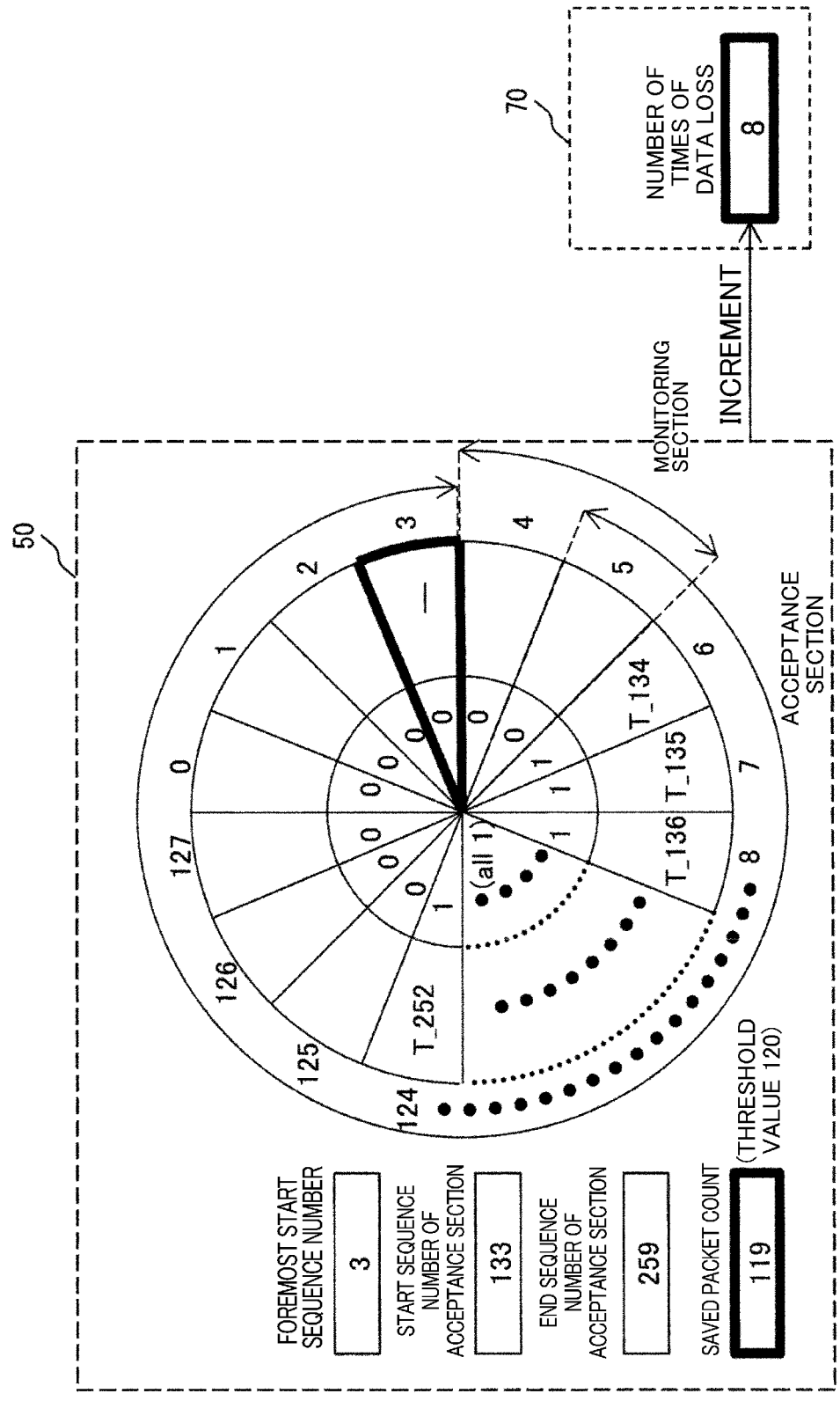
FIG. 25 is a diagram for describing operations of the ring ring buffer according to the first embodiment.

FIG. 25 is a state of the ring buffer in which the saved packet count has reached the threshold value 120 in FIG. 24 and data loss is determined to have occurred, and accordingly the monitoring section and the acceptance section are moved one each ahead, in the same way as in FIG. 14. The arrival flag of T_131 is cleared, and the saved packet count is reduced by 1 to 119. The number of times of data loss is incremented, and the number of times of data loss becomes eight.

Figure 26:
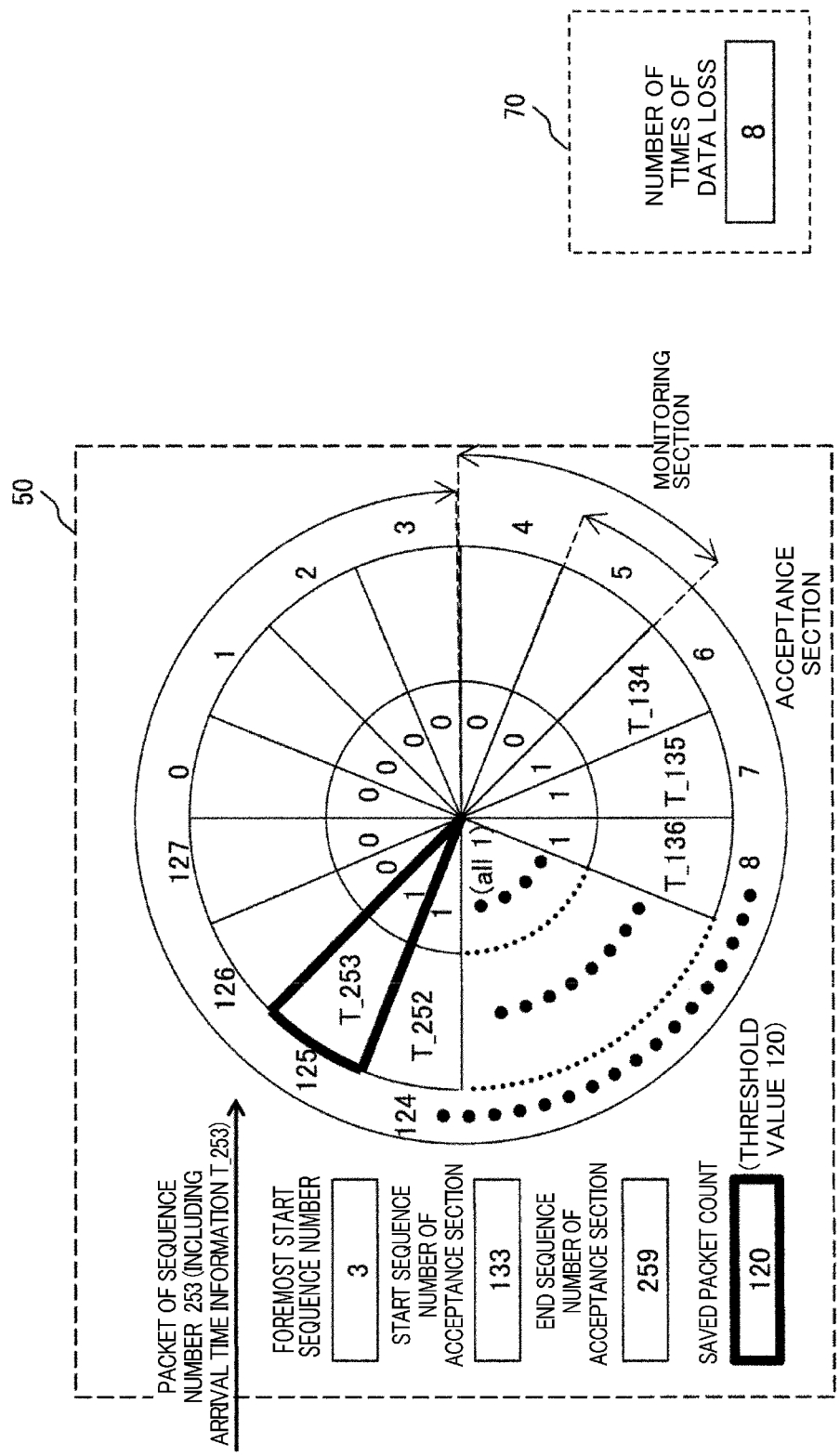
FIG. 26 is a diagram for describing operations of the ring ring buffer according to the first embodiment.

FIG. 26 is a state of the ring buffer after a packet of sequence number=253 arrives following the state in FIG. 25, and the arrival time information T_253 thereof is written. In the same way as in FIG. 24, the start and the end sequence numbers of the monitoring section and the acceptance section do not change. The saved packet count has increased by 1 to 120, and has reached the threshold value 120 of the saved packet count.

Figure 27:
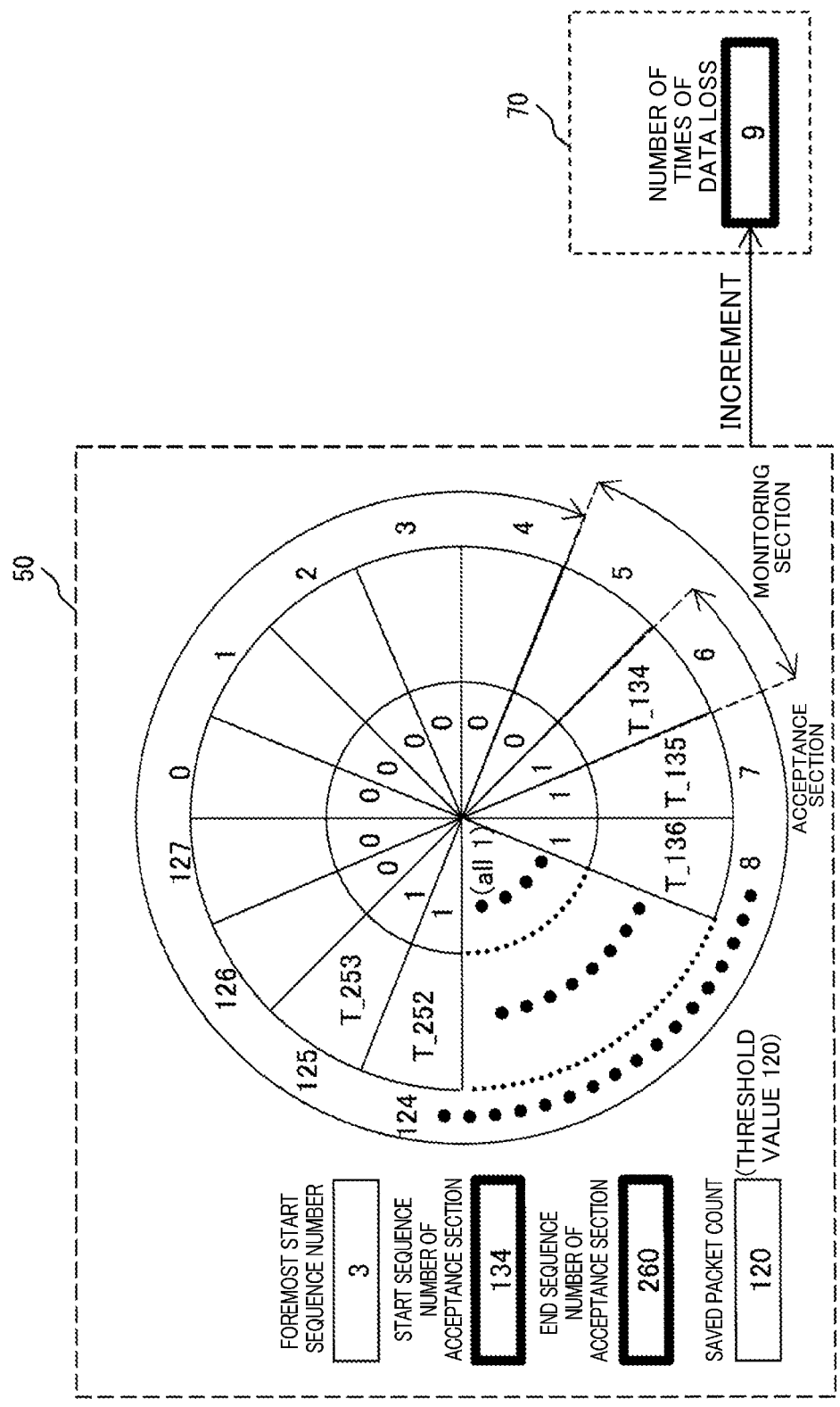
FIG. 27 is a diagram for describing operations of the ring ring buffer according to the first embodiment.

FIG. 27 is a state of the ring buffer in which the saved packet count has reached the threshold value 120 in FIG. 26 and data loss is determined to have occurred, and accordingly the monitoring section and the acceptance section are moved one each ahead in the same way as in FIG. 14. The arrival flag in the storage region that has fallen outside of the monitoring section (address 4) is maintained in the cleared state from the state in FIG. 26, and the saved packet count remains unchanged at 120. The number of times of data loss is incremented, and the number of times of data loss becomes nine.

Figure 28:
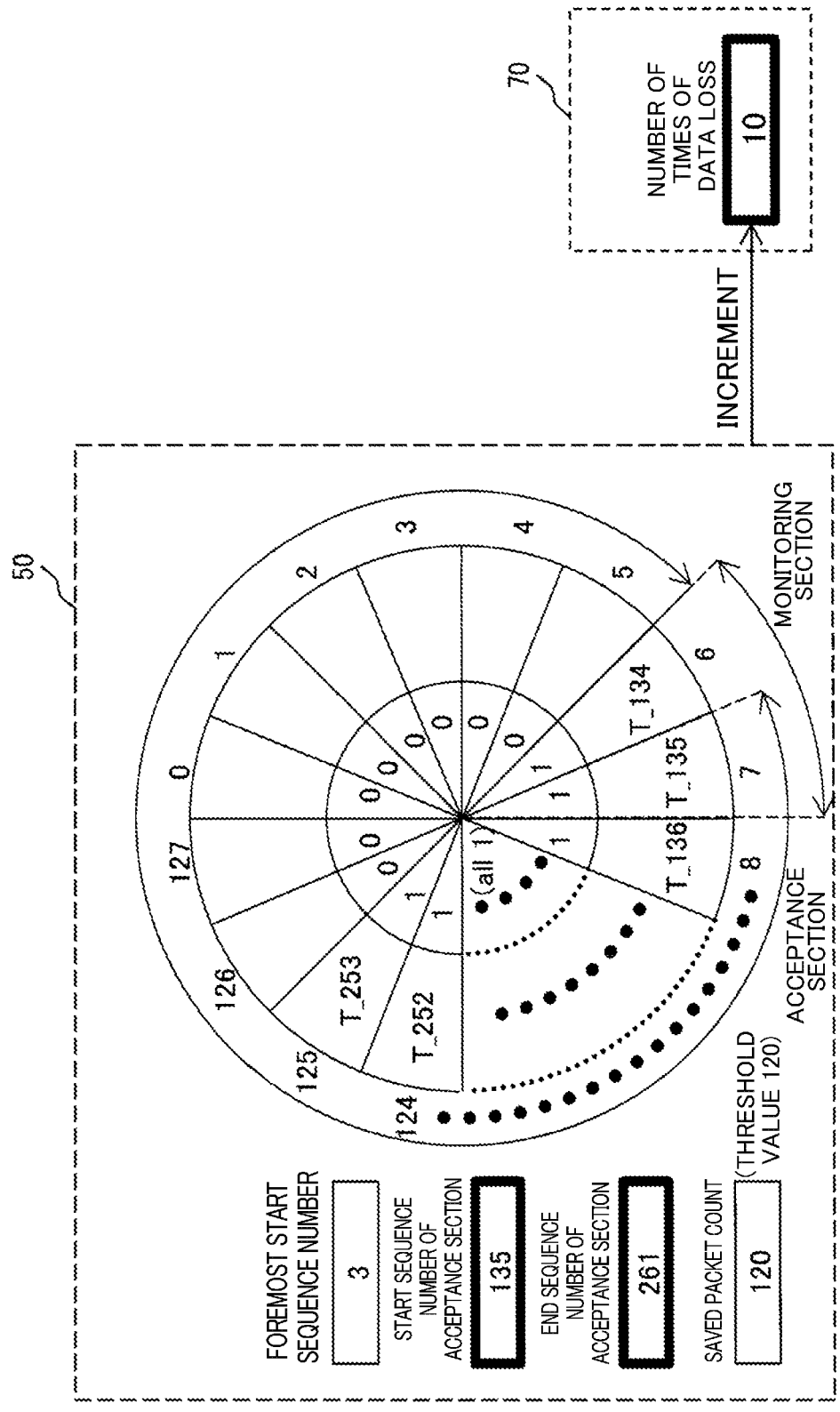
FIG. 28 is a diagram for describing operations of the ring ring buffer according to the first embodiment.

FIG. 28 is a state of the ring buffer in which the saved packet count has reached the threshold value 120 in FIG. 27 and data loss is determined to have occurred, and accordingly the monitoring section and the acceptance section are moved one each ahead in the same way as in FIG. 14. The arrival flag in the storage region that has fallen outside of the monitoring section (address 5)is maintained in the cleared state from the state in FIG. 27, and the saved packet count remains unchanged at 120. The number of times of data loss is incremented, and the number of times of data loss becomes ten.

Figure 29:
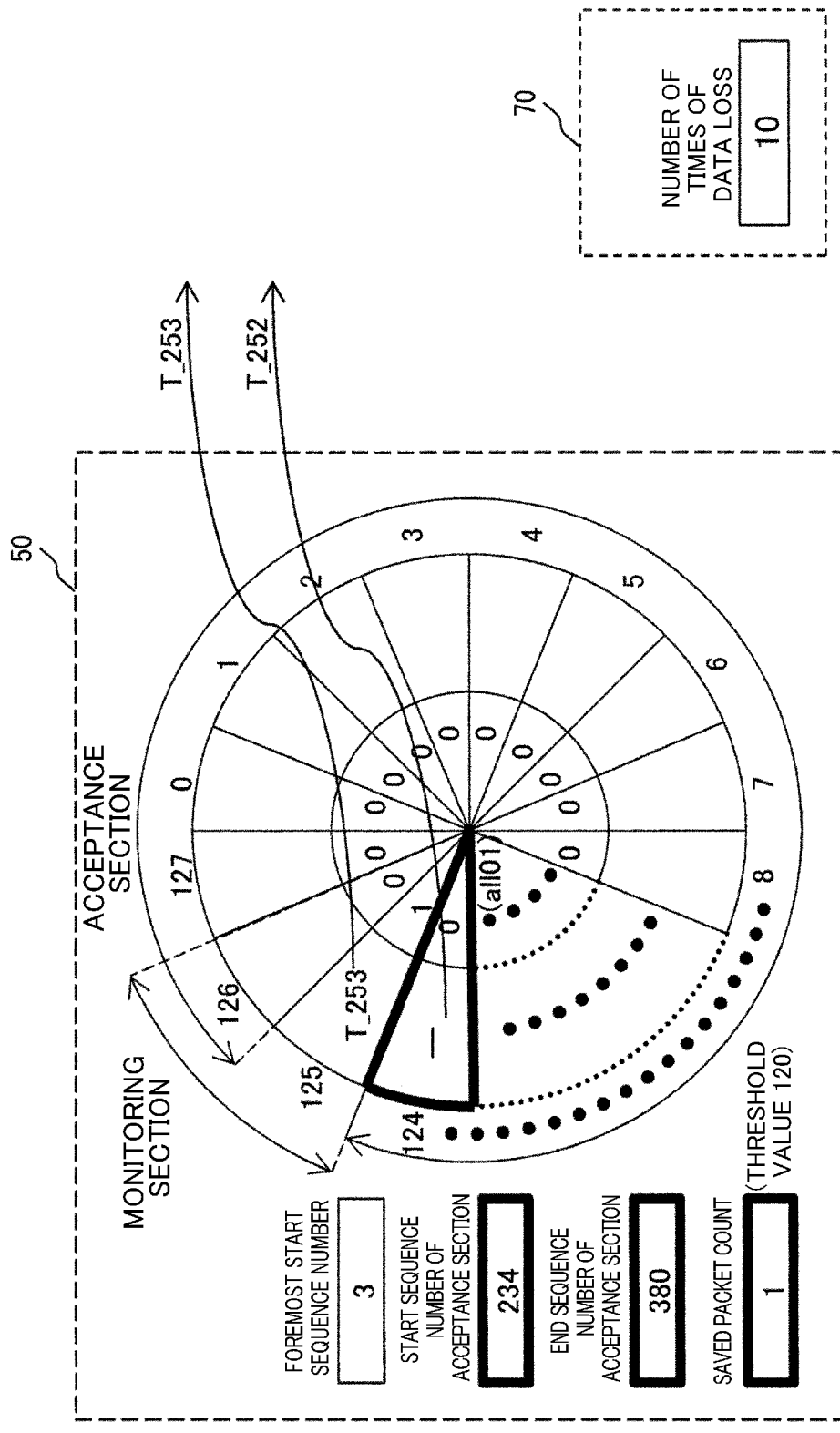
FIG. 29 is a diagram for describing operations of the ring ring buffer according to the first embodiment.

FIG. 29 is a state of the ring buffer after repeatedly reading in the same way as in FIG. 17 due to arrival time information T_135 through T_253 being present in the state in FIG. 28.

In FIG. 8 through FIG. 29, out of the total of 252 packets of sequence numbers 2 through 253 thought to have been output from the transmission source, 241 sets of consecutive packets have been read out from the ring buffer and the arrival intervals have been calculated and summarized. Meanwhile, in FIG. 29, the number of times of data loss is ten and the saved packet count is 1. The total thereof is 241+10+1=251, which matches the count of packets thought to have been output from the transmission source. Accordingly, it can be understood that the number of times of data loss is summarized properly by correction.

Figure 30:
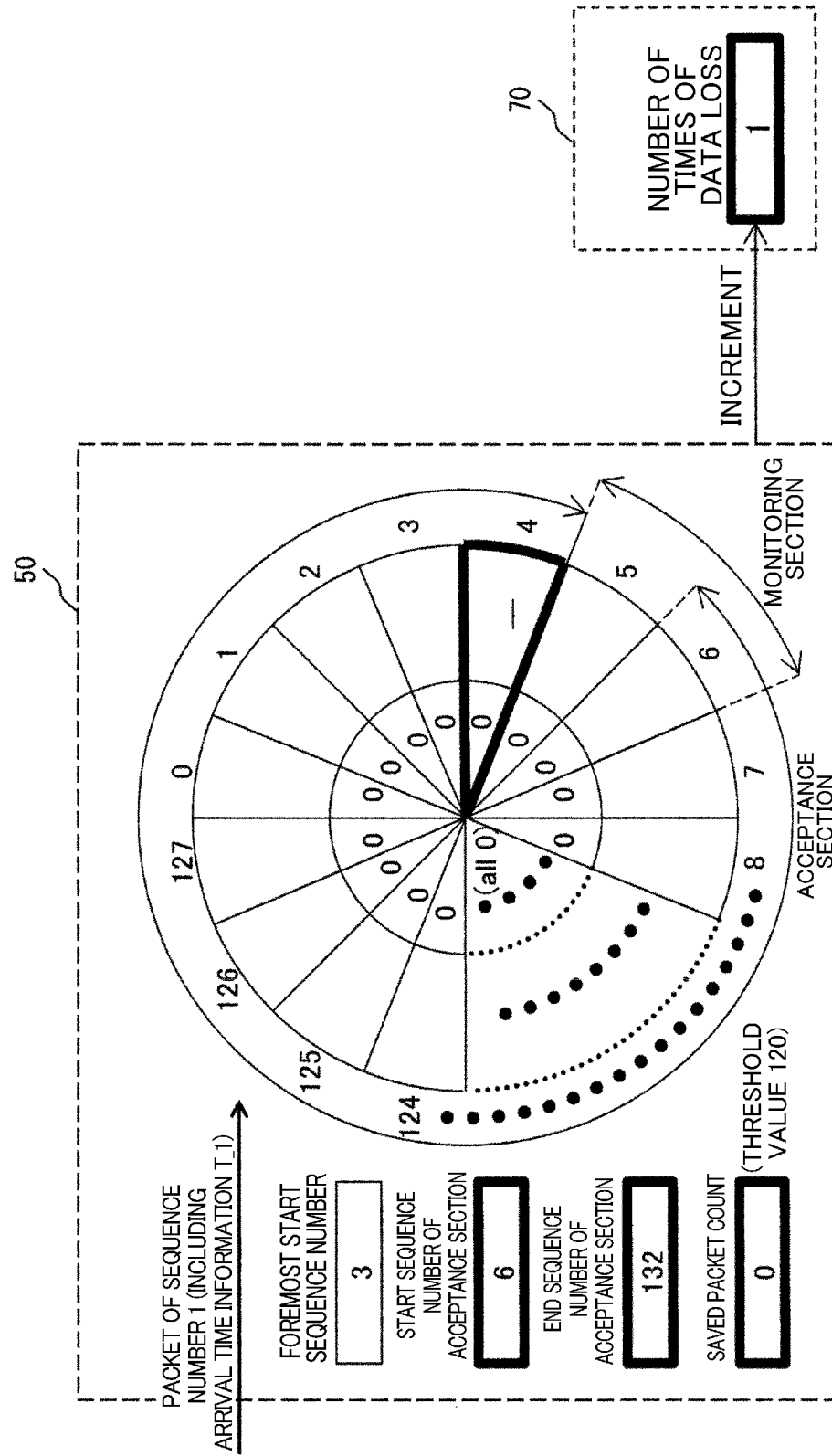
FIG. 30 is a diagram for describing operations of the ring ring buffer according to the first embodiment.

FIG. 30 is a state of the ring buffer after a packet of sequence number 1 outside of the acceptance section arrives in the state in FIG. 12, and the same operations of when receiving a packet outside of the acceptance section as in FIG. 18 are performed. The number of times of data loss is incremented, and the number of times of data loss becomes one.

Figure 31:
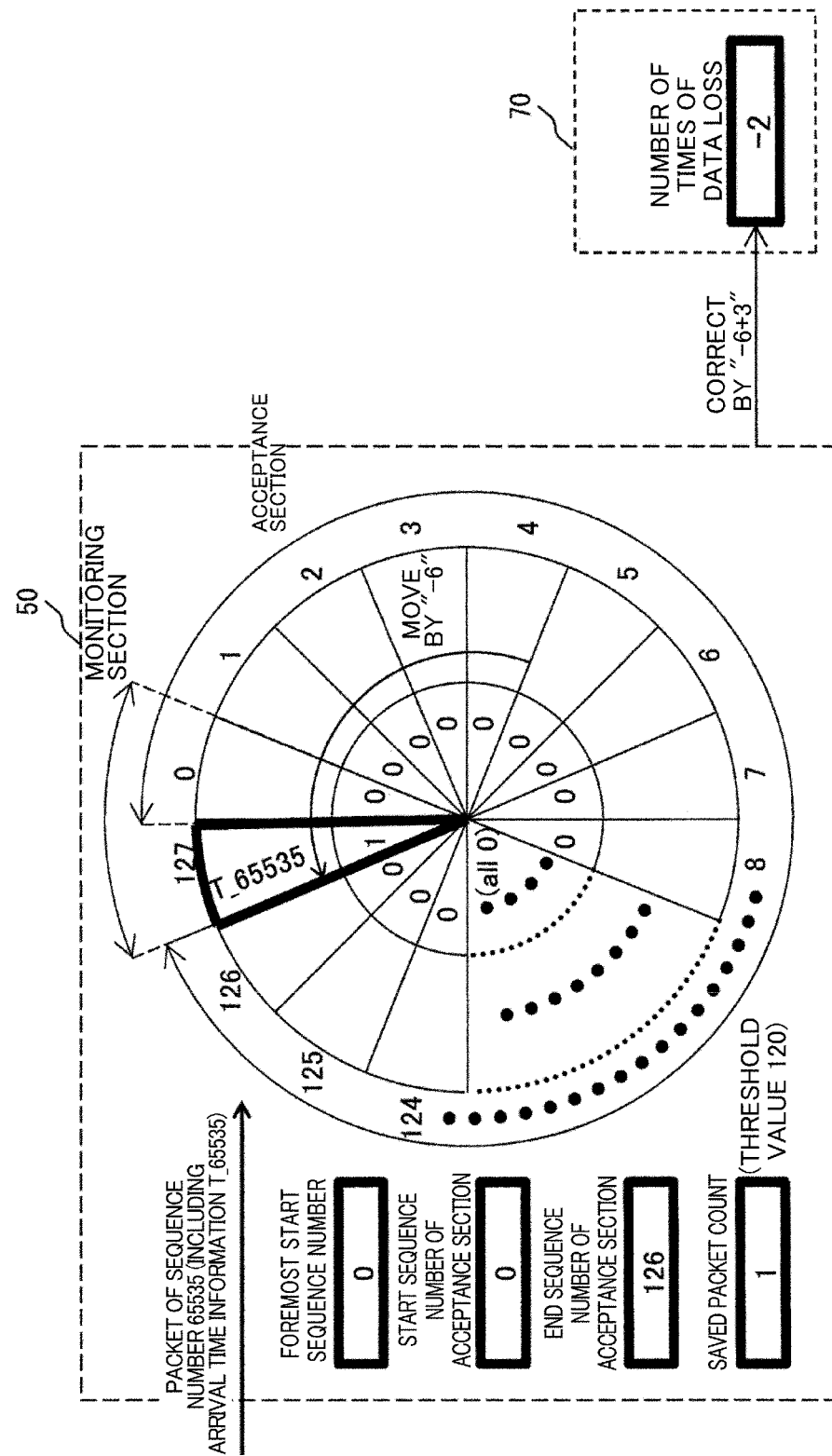
FIG. 31 is a diagram for describing operations of the ring ring buffer according to the first embodiment.

FIG. 31 is a state of the ring buffer after a packet of sequence number 65535 arrives in the state of saved packet count=0 illustrated in FIG. 30, and operations have been performed from the initial state, in the same way as in FIG. 8. The start sequence number of the acceptance section becomes "0", which is three before the foremost start sequence number "3" in FIG. 30 .

The current value of the foremost start sequence number in the state in FIG. 30 before packet reception is "3", and the decided start sequence number is "0", with "0" being a number coming before. Accordingly, the foremost start sequence number in FIG. 31 is "0".

The three packets of sequence numbers 2 through 4 have arrived in the past, and data loss or arrival interval has been summarized in FIG. 11, FIG. 12, and FIG. 14, and accordingly summarizing data loss of these three packets in FIG. 31 or thereafter will result in summarizing the same packets in duplicate. There is a need to correct the number of times of data loss in the section of sequence numbers 2 through 4 in the same way as in FIG. 21, to avoid counting in duplicate. Meanwhile, the data loss or arrival interval of the three packets of the sequence numbers 65535, 0, and 1 should be summarized for the first time in FIG. 31 or thereafter, and accordingly correction of the number of times of data loss is unnecessary for the amount regarding which the start sequence number of the acceptance section has moved three backward from the foremost start sequence number.

Accordingly, although the start sequence number of the acceptance section moves "−6" from 6 to 0, the portion regarding which the start sequence number of the acceptance section has moved "three" backward from the foremost start sequence number is cancelled out, the number of times of data loss is corrected by "−6+3", and the number of times of data loss becomes −2. The number of times of data loss temporarily becomes a negative value, but the three packets of sequence numbers 2 through 4 that have arrived in the past will be summarized as data loss in FIG. 31 or thereafter without fail, and accordingly the total number of times of data loss will be a correct value in the end. Note that the foremost start sequence number is updated from "3" to "0", since the start sequence number of the acceptance section has become FIG. 32 is a state of the ring buffer after the packet that is sequence number=0 within the acceptance section arrives in the state in FIG. 31, and the write operation is performed in the same way as in FIG. 9.

Figure 32:
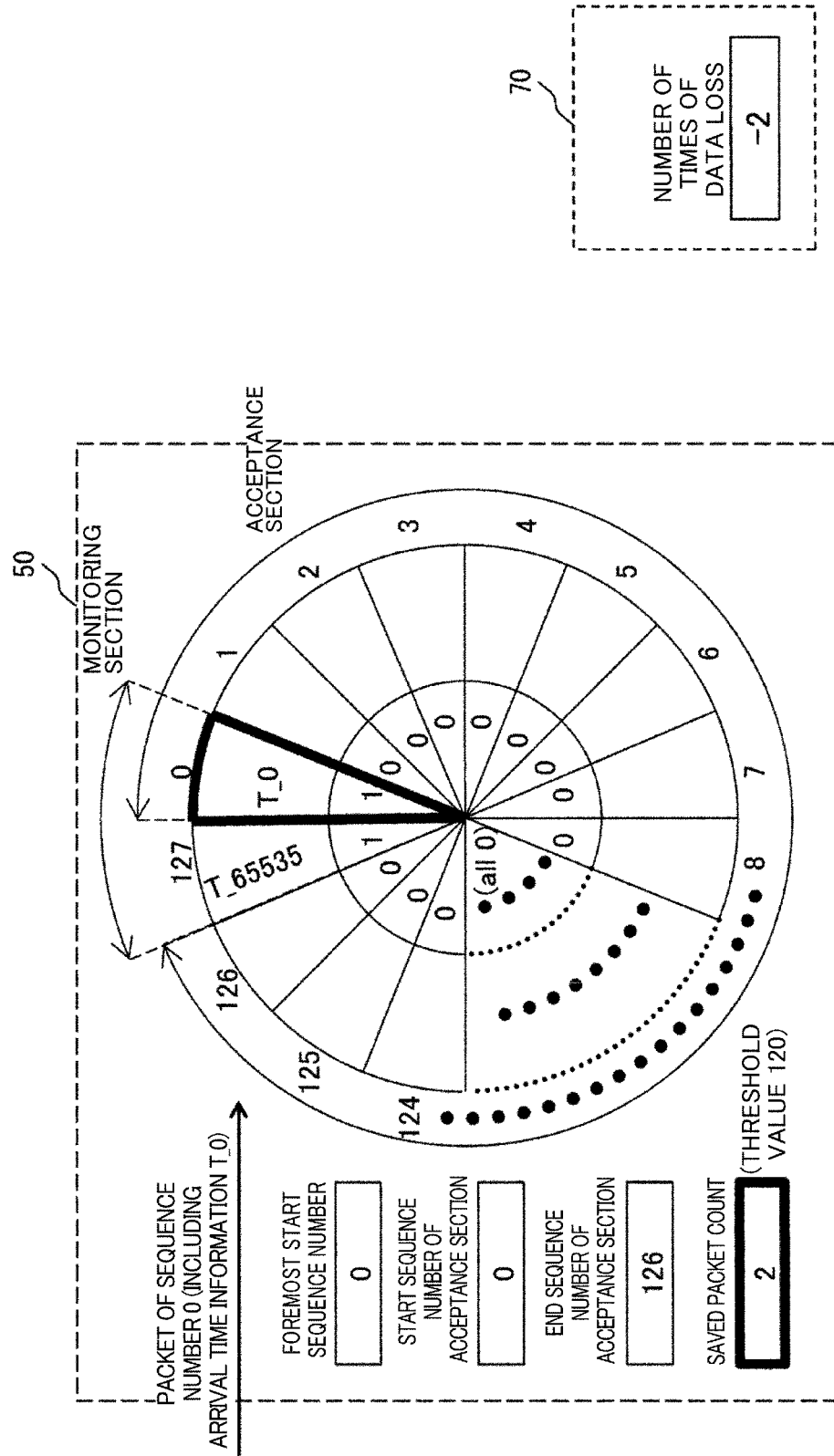
FIG. 32 is a diagram for describing operations of the ring ring buffer according to the first embodiment.
Figure 33:
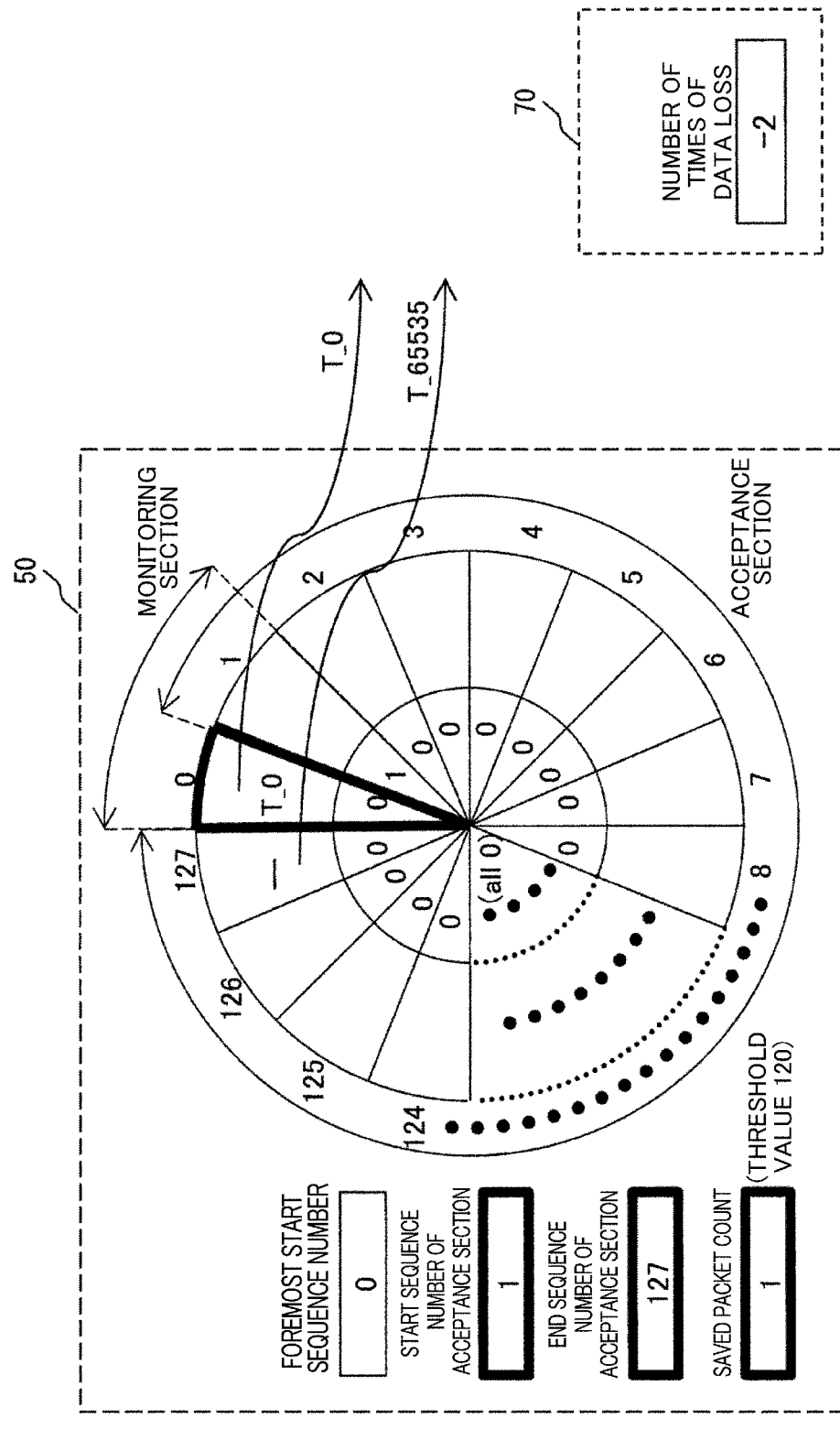
FIG. 33 is a diagram for describing operations of the ring ring buffer according to the first embodiment.

FIG. 33 is a state after performing the read operation in the same way as in FIG. 11 due to all data (arrival time information T_65535 through T_0) being present in the monitoring section in the state in FIG. 32.

Figure 34:
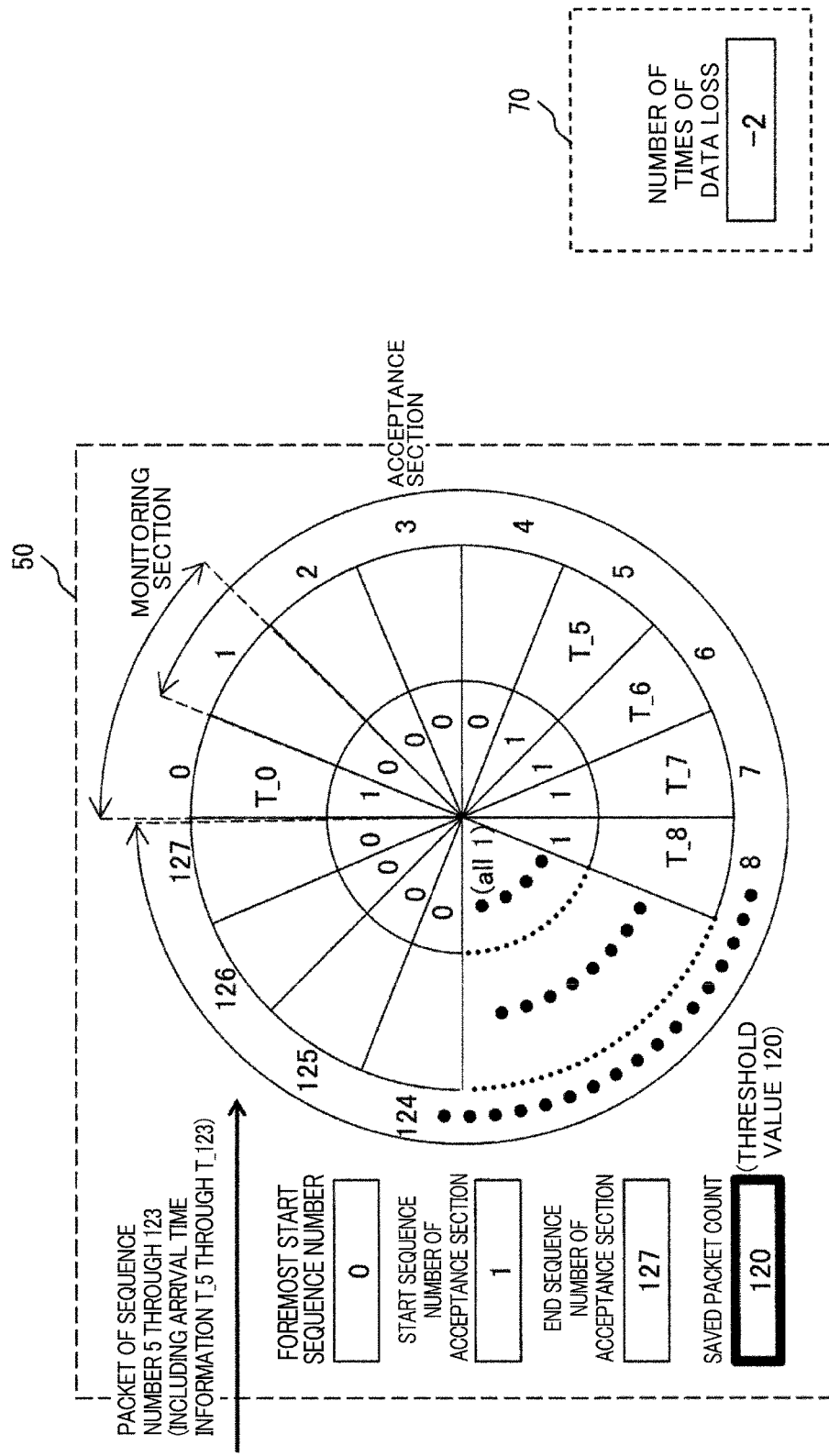
FIG. 34 is a diagram for describing operations of the ring ring buffer according to the first embodiment.

FIG. 34 is a state of the ring buffer after 119 packets of sequence numbers=5 through 123 arrive within the acceptance section following the state in FIG. 33 without the packets of sequence numbers=1 through 4 arriving, and the arrival time information T_5 through T_123 thereof has been written, in the same way as in FIG. 13. The saved packet count has increased by 119 to 120, and has reached the threshold value 120 of the saved packet count. Note that the three packets of sequence numbers 2 through 4 have arrived in the past, and accordingly will not arrive hereafter.

Figure 35:
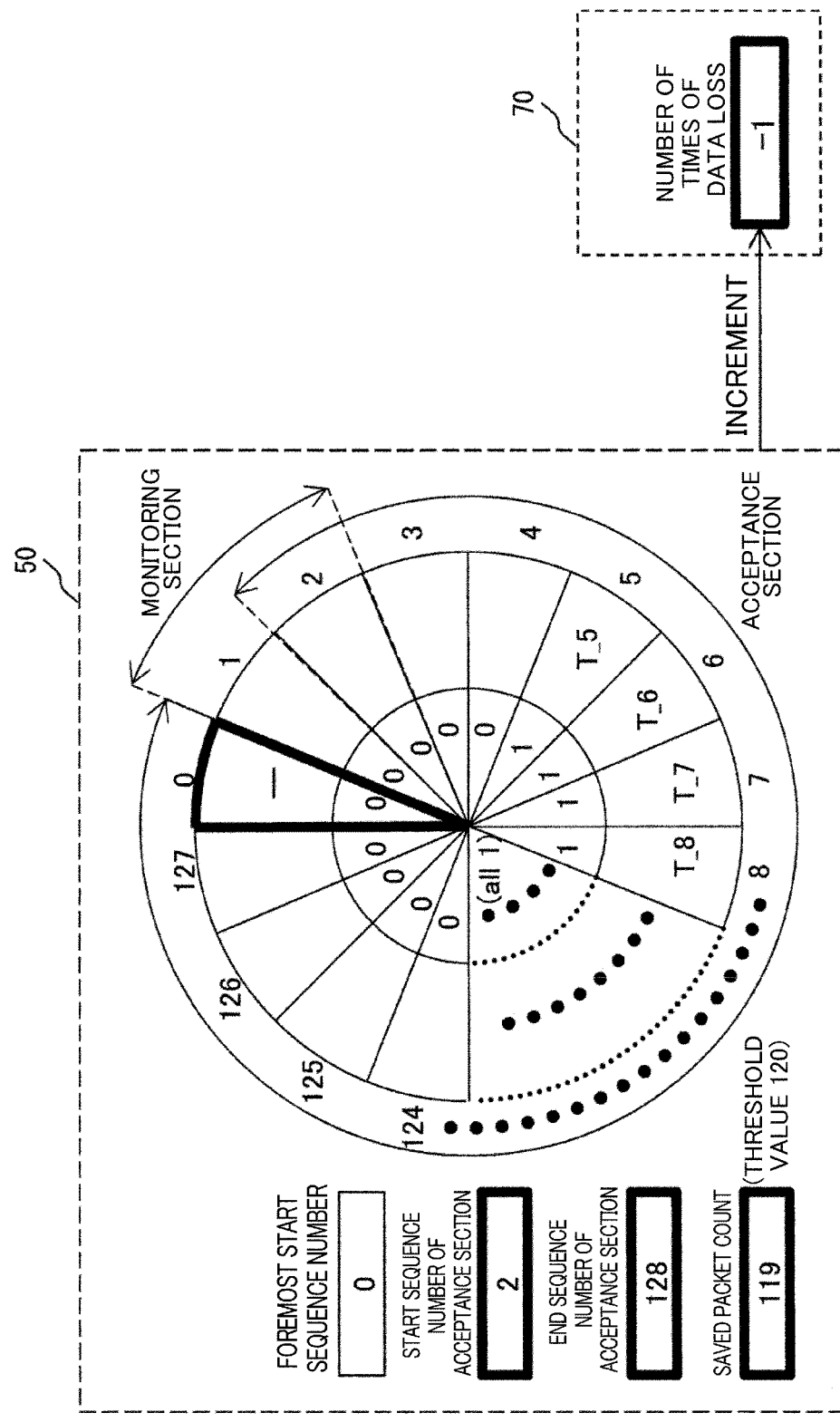
FIG. 35 is a diagram for describing operations of the ring ring buffer according to the first embodiment.

FIG. 35 is a state of the ring buffer in which the saved packet count has reached the threshold value 120 in FIG. 34 and data loss is determined to have occurred, and accordingly the monitoring section and the acceptance section are moved one each ahead, in the same way as in FIG. 14. The arrival flag of the storage region that has fallen outside of the monitoring section (address 0) is in the set state in FIG. 34, and accordingly the arrival flag of address 0 is cleared, and the saved packet count is reduced by 1 to 119.

Figure 36:
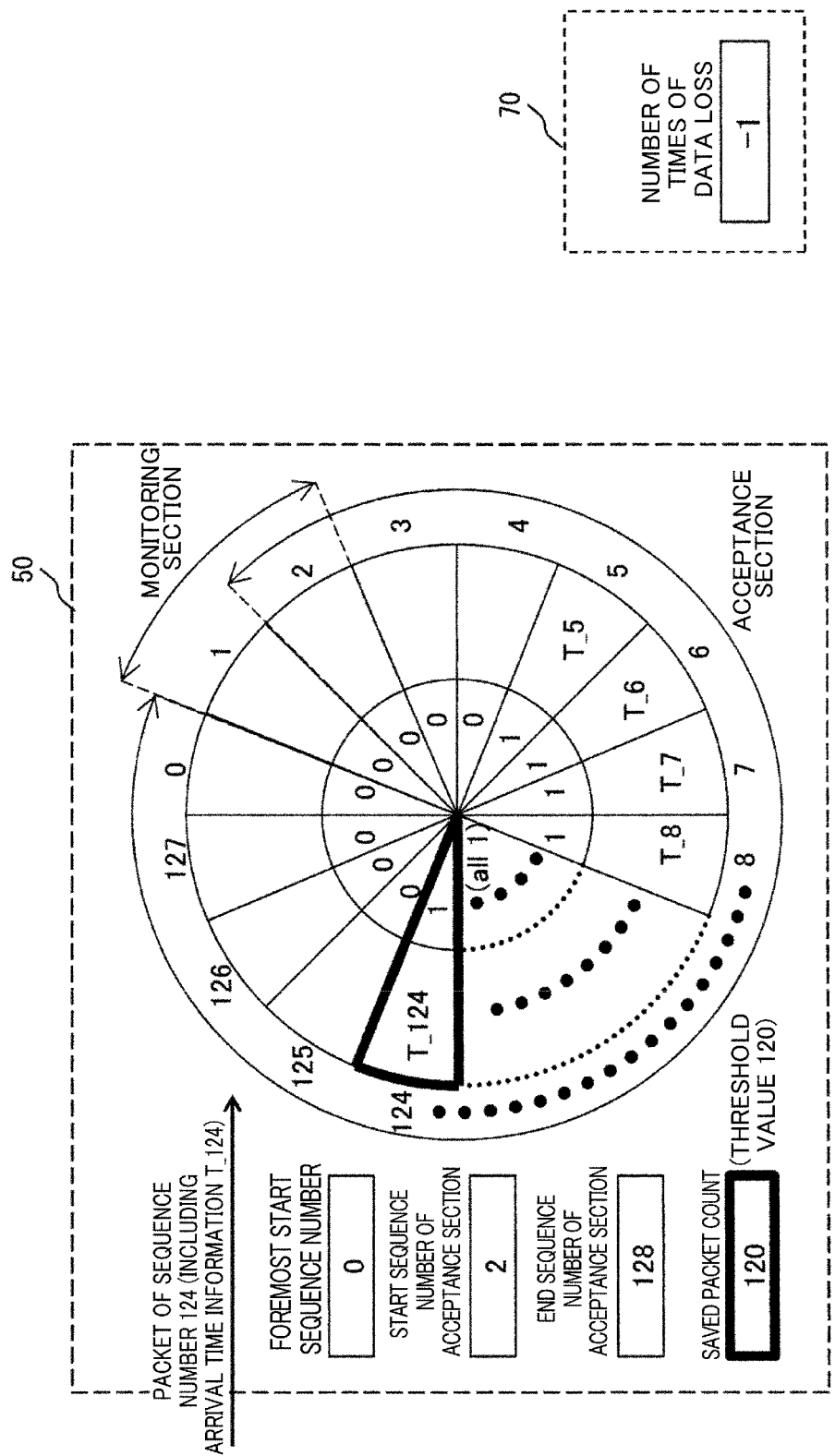
FIG. 36 is a diagram for describing operations of the ring ring buffer according to the first embodiment.

FIG. 36 is a state of the ring buffer after the packet that is sequence number=124 within the acceptance section arrives in the state in FIG. 35, and the write operation is performed in the same way as in FIG. 9. The saved packet count has increased by 119 to 120, and has reached the threshold value 120 of the saved packet count.

Figure 37:
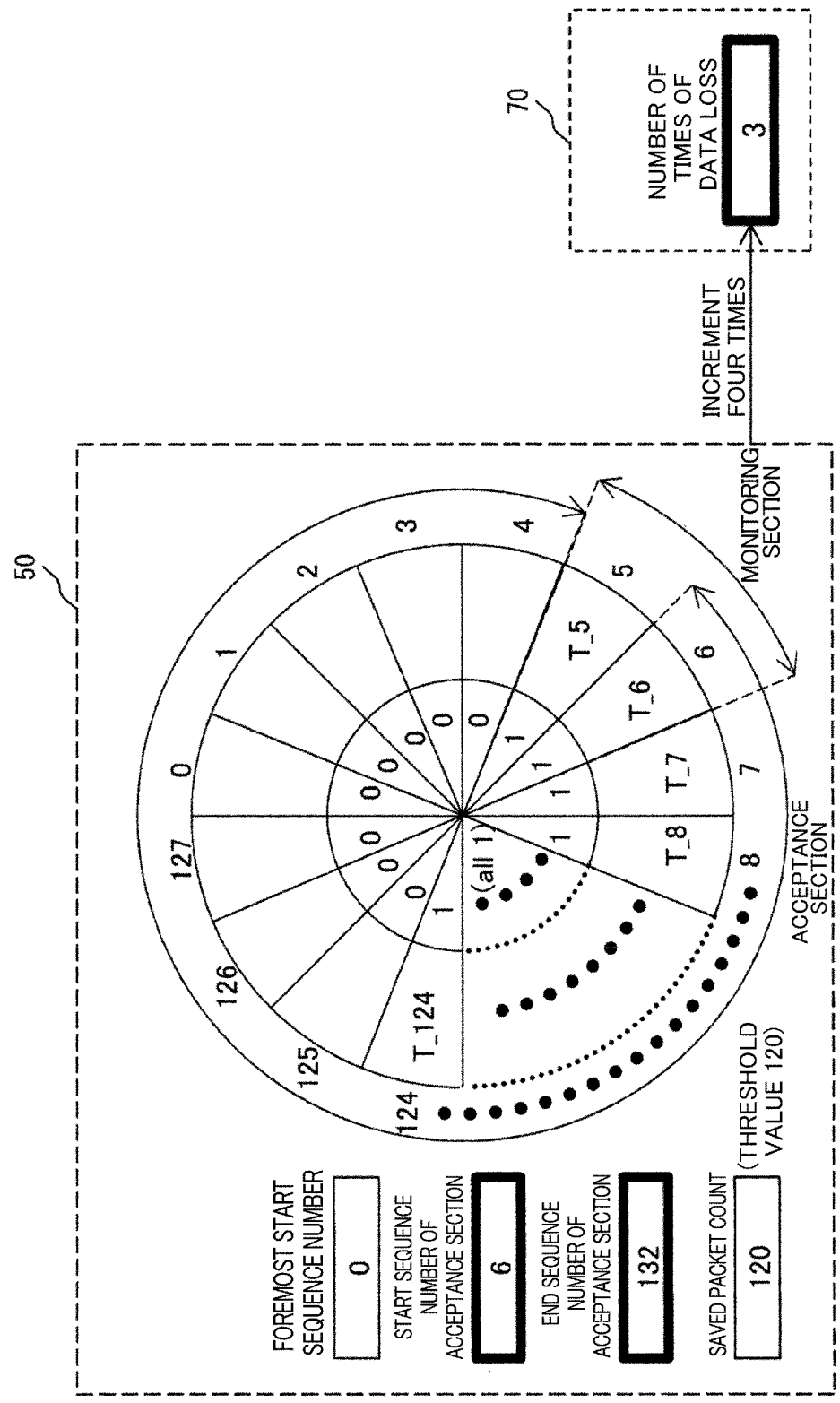
FIG. 37 is a diagram for describing operations of the ring ring buffer according to the first embodiment.

FIG. 37 is a state of the ring buffer after the saved packet count has reached the threshold value 120 in FIG. 36 and data loss is determined to have occurred, and accordingly the operation of moving the monitoring section and the acceptance section each one ahead in the same way as in FIG. 14 has been performed four times. Note that the arrival flag of the storage region that has fallen outside of the monitoring section (address 1) is in the cleared state in FIG. 36, and accordingly this arrival flag is maintained in the cleared state, and the saved packet count remains unchanged. The number of times of data loss is incremented four times, and the number of times of data loss becomes three.

Figure 38:
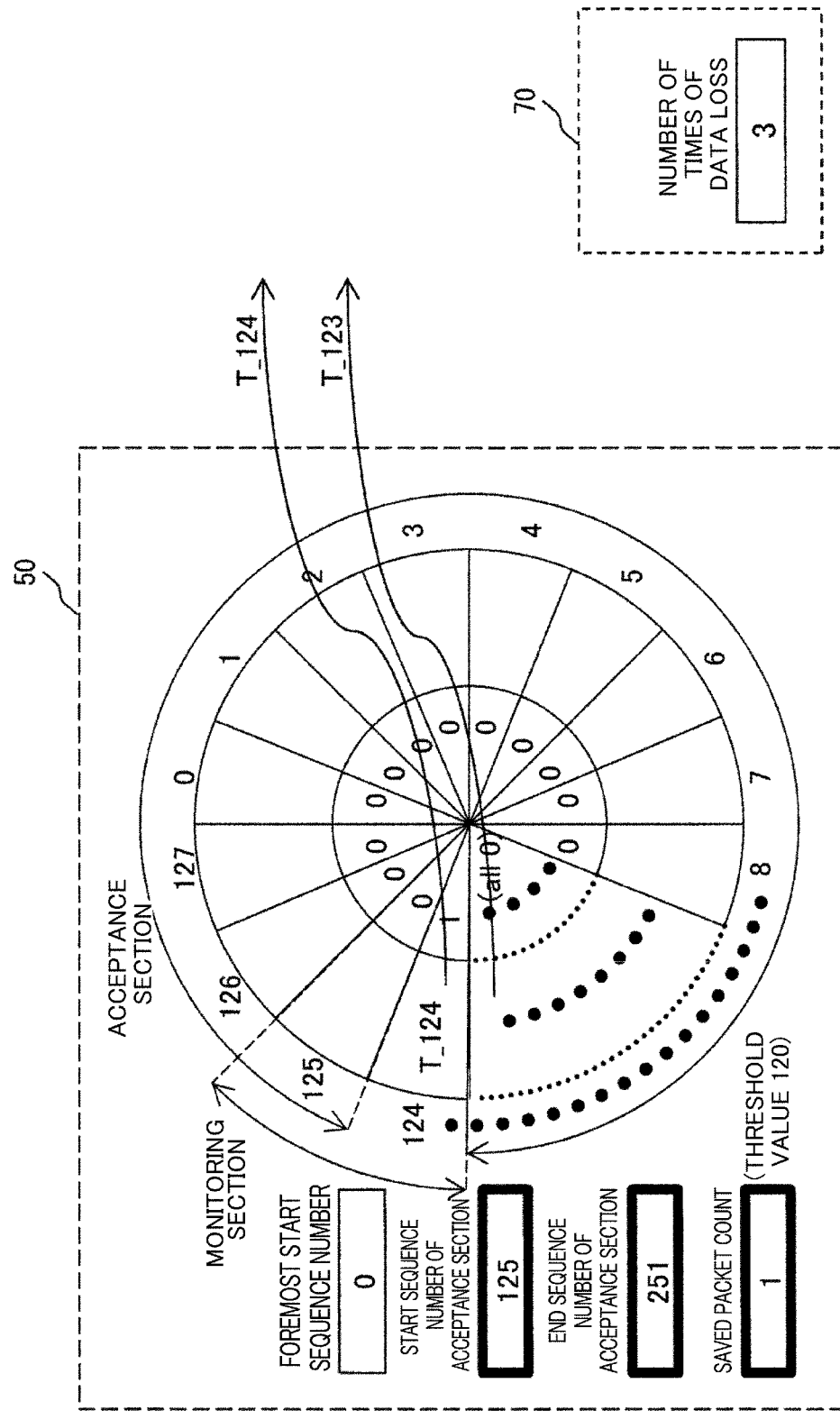
FIG. 38 is a diagram for describing operations of the ring ring buffer according to the first embodiment.

FIG. 38 is a state of the ring buffer after repeatedly reading in the same way as in FIG. 17 due to arrival time information T_135 through T_253 being all present in the state in FIG. 37.

In FIG. 8 through FIG. 12, and FIG. 30 through FIG. 38, out of the total of 126 packets of sequence numbers 65535 and 0 through 124 thought to have been output from the transmission source, 122 sets of consecutive packets have been read out from the ring buffer and the arrival intervals have been calculated and summarized. Meanwhile, in FIG. 38, the number of times of data loss is three and the saved packet count is 1. The total thereof is 122+3+1=126, which matches the count of packets thought to have been output from the transmission source. Accordingly, it can be understood that the number of times of data loss is summarized properly by correction.

Operations when Certain Amount of Time has Elapsed from Arrival Time of Data at Start or Nearest to Start When the data written to the ring buffer includes packet arrival time information, in addition to the above operations, the arrival time information of the start data of the monitoring section may be compared with the current time, and in a case in which a certain amount of time has overrun from the arrival time to the current time, the monitoring section and the acceptance section may be moved one ahead.

In a case where start data of the monitoring section is not written, arrival time information of data that is the second data or subsequent data in the monitoring section that is the nearest to the start may be used. Even in a case in which data within the monitoring section is lost, forcibly moving the monitoring section and the acceptance section enables data to be read from the ring buffer as long as data within the subsequent monitoring section is present.

Method of Determining Whether or not First-Time Reception Data

Whether or not data received when the saved packet count=0 is first-time reception data may be determined by, for example, clearing all arrival flags of the ring buffer to 0 after a certain amount of time elapses after the last data reception, and also updating the start sequence number and the end sequence number of the monitoring section and the acceptance section, and the saved packet count, all to 0, and determining the data received when all of the start sequence numbers, the end sequence numbers, and the saved packet count are 0, to be first-time reception data.

In another example, an arrangement may be made in which, in a case of receiving a transmission start notification or a transmission end notification of consecutive data, all arrival flags in the ring buffer are cleared to 0, the start sequence number and the end sequence number of the monitoring section and the acceptance section, and the saved packet count, are all updated to 0, and the data received when all of the start sequence numbers, the end sequence numbers, and the saved packet count are 0 is determined to be first-time reception data. Now, a transmission start notification of consecutive data is an SIP (Session Initiation Protocol) message transmitted when a session is established in an IP phone call (=a call going through), and when the session is established, RTP packets storing audio data and sequence numbers are transmitted at equal intervals. In the same way, a transmission end notification is an SIP message transmitted when the session ends (=the call is cut off).

Effects of First Embodiment

According to the first embodiment, a configuration is made in which, when data is present in all of a monitoring section of a width of two sequence numbers, all data in the monitoring section is read out, and the monitoring section and the acceptance section are moved one each ahead. Accordingly, processing of extracting consecutive packets from packets arriving out of sequence and calculating packet intervals can be performed in real-time. By deciding the write storage region of data on the basis of a remainder from dividing the sequence number by the count of storage regions of the ring buffer, order correction is enabled even when there is a restriction on the number of storage regions of the ring buffer, and storage regions for all sequence numbers cannot be implemented.

Unlike conventional arrangements, the first embodiment is configured so as to manage the start and the end of the of the monitoring section and the acceptance section by sequence numbers instead of by the positions (addresses) of storage regions. According to this configuration, a malfunction in which data is arrayed in an incorrect order can be prevented, even in a case where data arrives in which the remainder from dividing the sequence number by the count of storage regions of the ring buffer is the same as data already saved in the ring buffer but the sequence number is different. Sequence control can be performed as long as within a range of a breadth of sequence numbers regarding which the ring buffer can store data, i.e., a range from the start of the monitoring section to the end of the acceptance section.

Also, when the count of data stored from the start of the monitoring section to the end of the acceptance section reaches a certain count, and in a case that received data is outside of the acceptance section, the monitoring section and the acceptance section are moved one each ahead, or when a certain amount of time has elapsed from the arrival time of data at the start or nearest to the start, determination that data loss has occurred is made, and the monitoring section and the acceptance section are moved to one ahead from the data at the start or nearest to the start. Thus, even in a case in which data within the monitoring section is lost, the monitoring section and the acceptance section are forcibly moved, and data can be read out from the ring buffer as long as all data within the subsequent monitoring section is present.

Further, packet loss and the frequency of marked delay can be comprehended by summarizing the number of times of data loss. Further, count omissions and counting in duplicate can be avoided by correcting the number of times of data loss by the amount of movement of the start sequence number, when storing data, arriving after the ring buffer is cleared, in the ring buffer as the start.

Second Embodiment

In the first embodiment, when storing data arriving after the ring buffer is cleared as the start in the ring buffer, the number of times of data loss is corrected by adding together the amount of moving of the start sequence number to the number of times of data loss. For example, in FIG. 31, the number of times of data loss is corrected by "−3", thereby avoiding the data of the three packets of sequence numbers 2 through 4 from being summarized in duplicate. However, correction of three packets worth is performed together in advance, and accordingly there is a problem in that there is deviation from the actual number of times of data loss until the three packets of sequence numbers 2 through 4 that have arrived in the past are summarized as data loss in FIG. 31 or thereafter without fail. At this time, the number of times of data loss may temporarily become a negative value.

Accordingly, in the second embodiment, in a case of moving the start sequence number of the acceptance section backward, instead of performing correction together, correction is performed by subtracting from the number of times of data loss one at a time, each time the start sequence number temporarily moved backward is updated ahead one at a time due to reading data or data loss. Specifically, when reading out data present in the monitoring section from the ring buffer and moving the monitoring section and the acceptance section ahead by one, the number of times of data loss is corrected by decrementing. The reason is that determination that data loss occurring has been made in the past for the same sequence number as that of data read out for arrival interval calculation after sequence correction, and accordingly the number of times of data loss corresponding thereto, which is one time, is subtracted.

Also, when making determination that data loss has occurred and moving the monitoring section and the acceptance section ahead by one each, no incrementation of the number of times of data loss is performed for correction. The reason is that data loss is not counted in duplicate in a case of having determined data loss in the past, and accordingly in a case of having read the data in the past, counting has already been performed as frequency distribution of packet intervals.

Operation Example of Packet Sequence Correction Unit

Figure 39A:
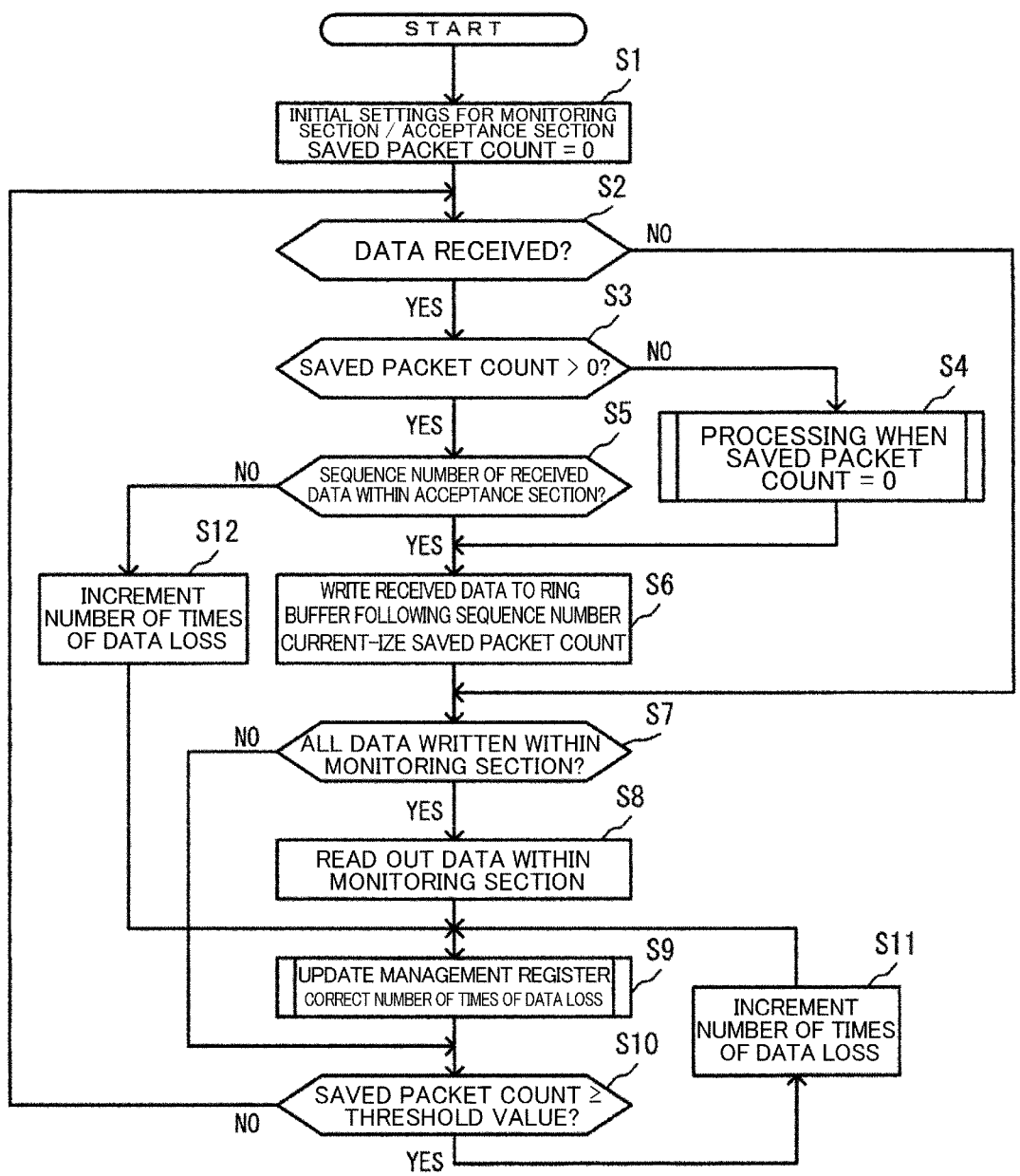
FIG. 39A is a diagram illustrating an example of an operation flowchart of a data sequence correction method according to a second embodiment.
Figure 39B:
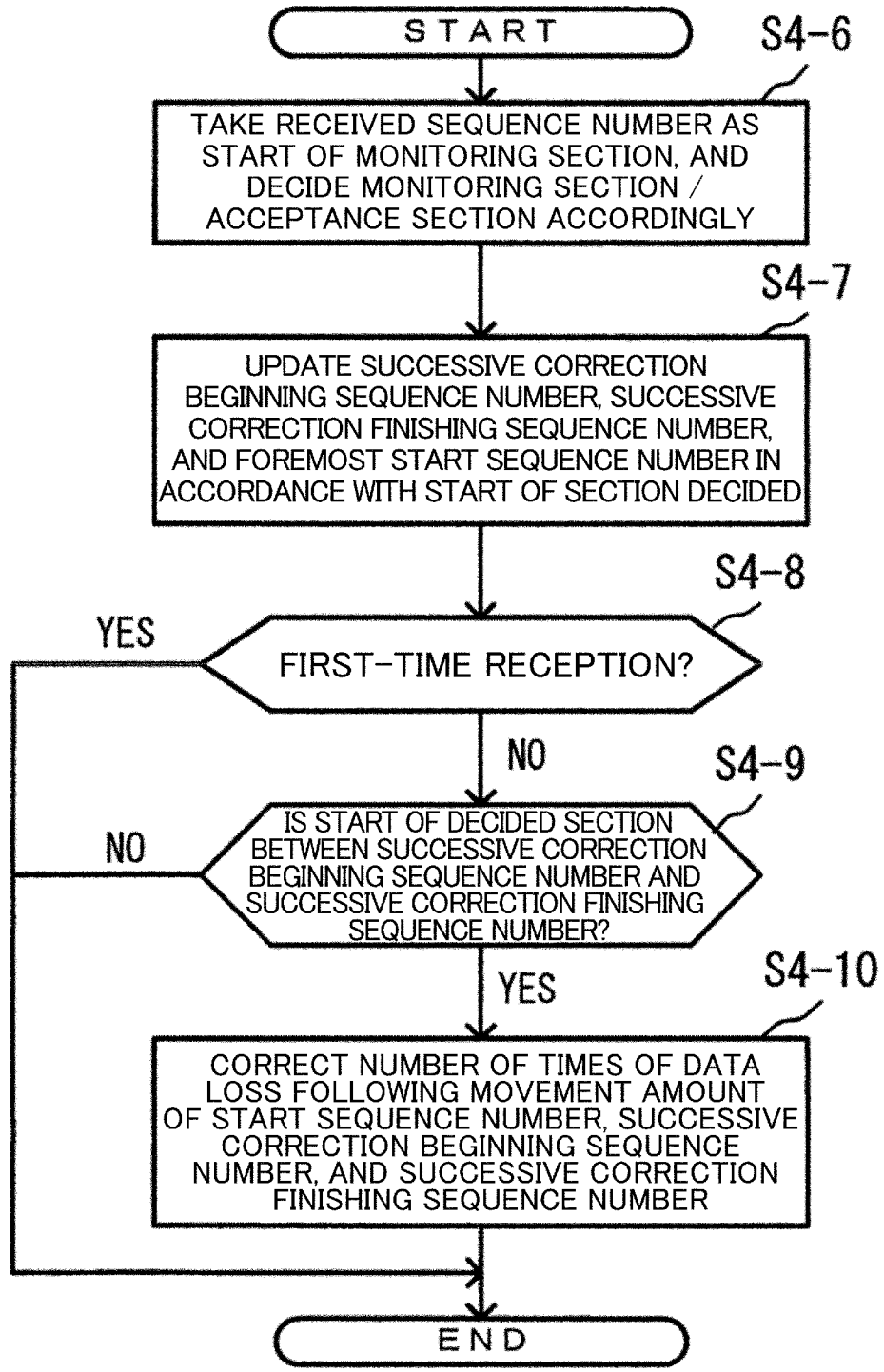
FIG. 39B is a diagram illustrating an example of an operation flowchart of processing when the saved packet count is 0, according to the second embodiment.
Figure 40:
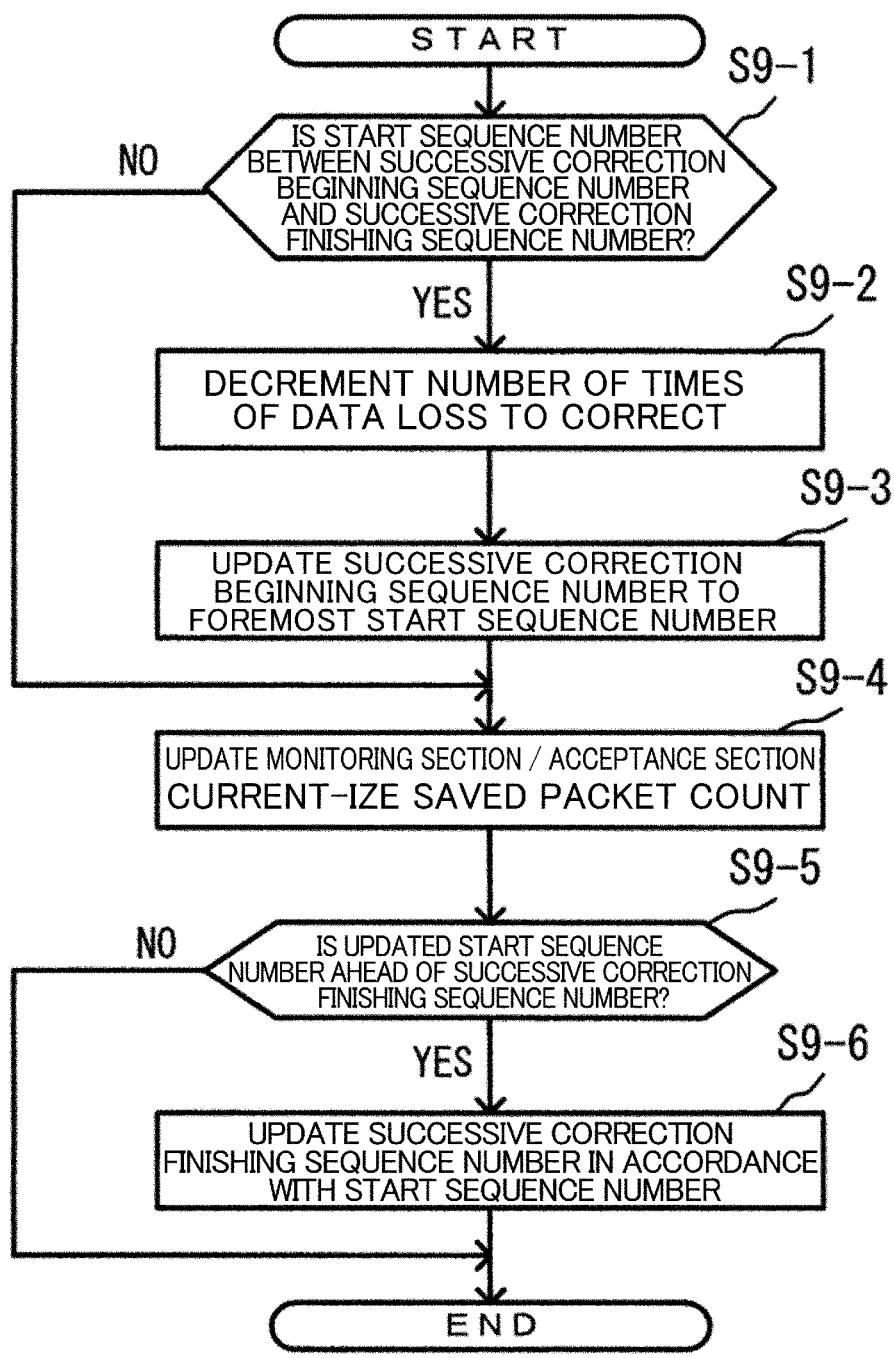
FIG. 40 is a diagram illustrating an example of an operation flowchart of correction processing of the number of times of data loss, according to the second embodiment.

FIG. 39A is an example of an operation flowchart of a data sequence correction method according to the present embodiment. FIG. 39B is a diagram illustrating an example of an operation flowchart of processing when the saved packet count is 0, according to the second embodiment. FIG. 40 is a diagram illustrating an example of an operation flowchart of correction processing of the number of times of data loss, according to the second embodiment. Points of difference as to FIG. 6A and FIG. 6B is that a register is provided that holds a successive correction beginning sequence number and a successive correction finishing sequence number, and that correction of the number of times of data loss is performed only when the start sequence number of the acceptance section is in the successive correction beginning sequence number through the successive correction finishing sequence number (S4-9, S4-10, S9-1, S9-2).

Operations from Initial State

Figure 41:
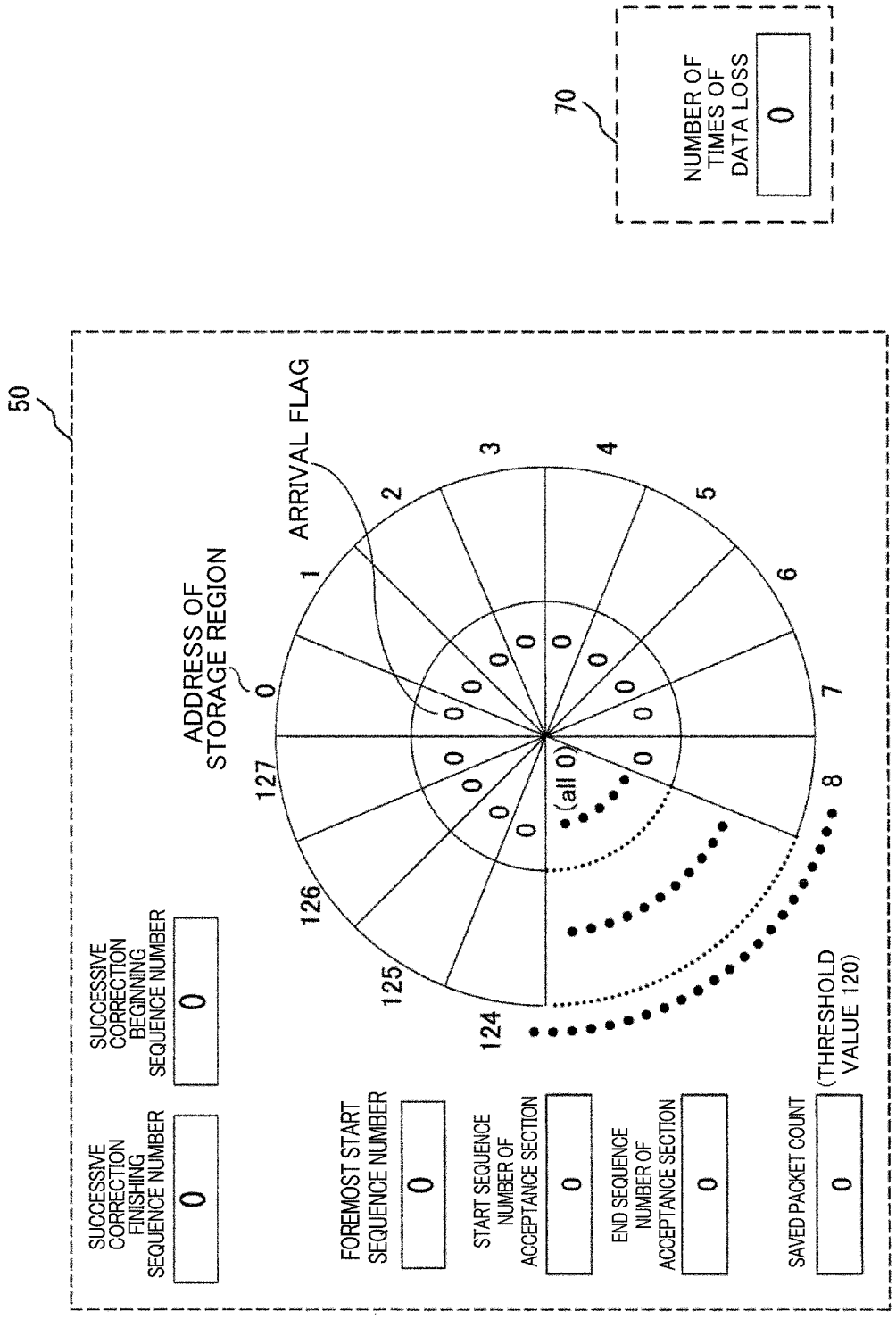
FIG. 41 is a diagram for describing an initial state of a ring ring buffer according to the second embodiment.

FIG. 41 is a diagram representing an initial state of the ring buffer according to the present embodiment. The difference from FIG. 7 is that the point that a register that holds the successive correction beginning sequence number and the successive correction finishing sequence number, or the like, has been added. When the start sequence number of the acceptance section is move further ahead of the successive correction beginning sequence number, the successive correction beginning sequence number is updated to the foremost start sequence number. The successive correction finishing sequence number is the sequence number that is the farthest ahead, out of the start sequence numbers updated so far in the acceptance section. Correction of the number of times of data loss is performed only when the start sequence number of the acceptance section is in the successive correction beginning sequence number through the successive correction finishing sequence number.

Figure 42:
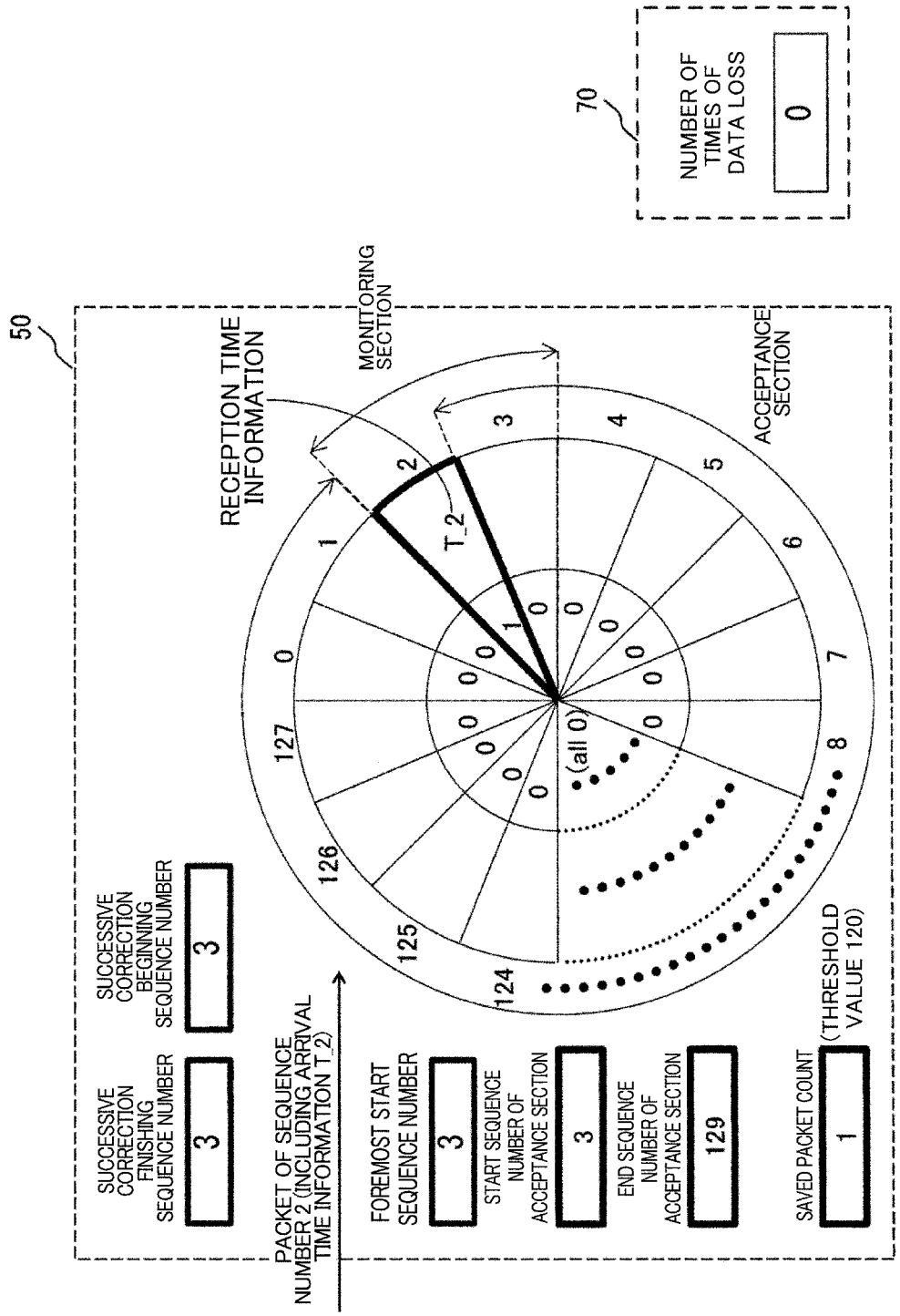
FIG. 42 is a diagram for describing operations of the ring ring buffer according to the second embodiment.

FIG. 42 is a state of the ring buffer after a packet of sequence number=2 arrives in the initial state in which the saved packet count=0 illustrated in FIG. 41, and the arrival time information T_2 thereof is written. The point of updating the successive correction beginning sequence number and the successive correction finishing sequence number to the start sequence number "3" of the acceptance section in a case of first-time reception data differs from FIG. 8.

Figure 43:
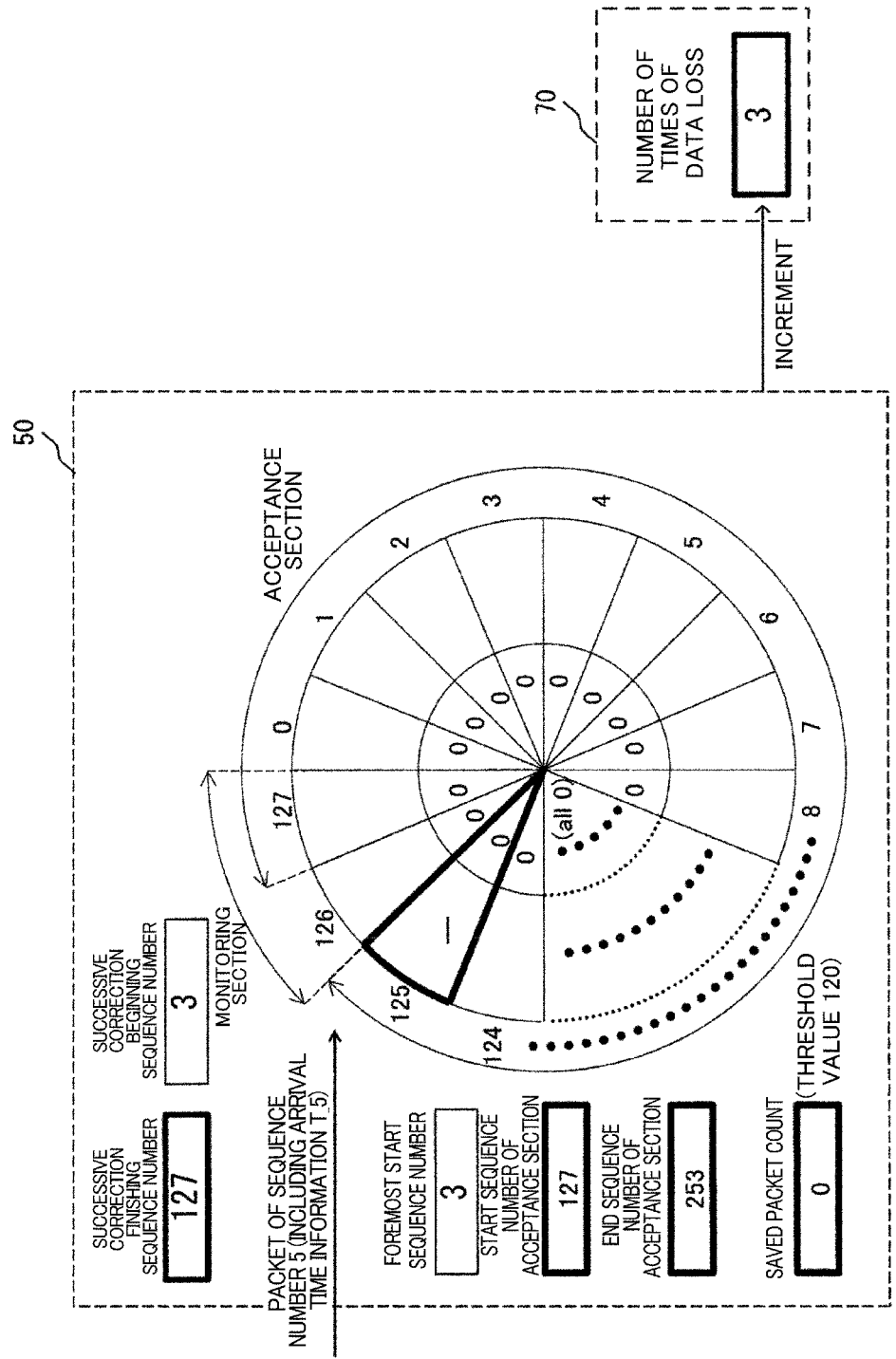
FIG. 43 is a diagram for describing operations of the ring ring buffer according to the second embodiment.

FIG. 43 is a state of the ring buffer after packets arriving in the same way as in FIG. 9 through FIG. 18, following the state in FIG. 42. The packet of sequence number 50 utside of the acceptance section arrives at the end, and accordingly determination is made that data loss has occurred and the monitoring section and the acceptance section are each moved one ahead, and the saved packet count is 0. The point that the successive correction finishing sequence number becomes "127" as a result of also updating the successive correction finishing sequence number ahead in conjunction with updating the start sequence number of the acceptance section ahead differs from FIG. 18.

Figure 44:
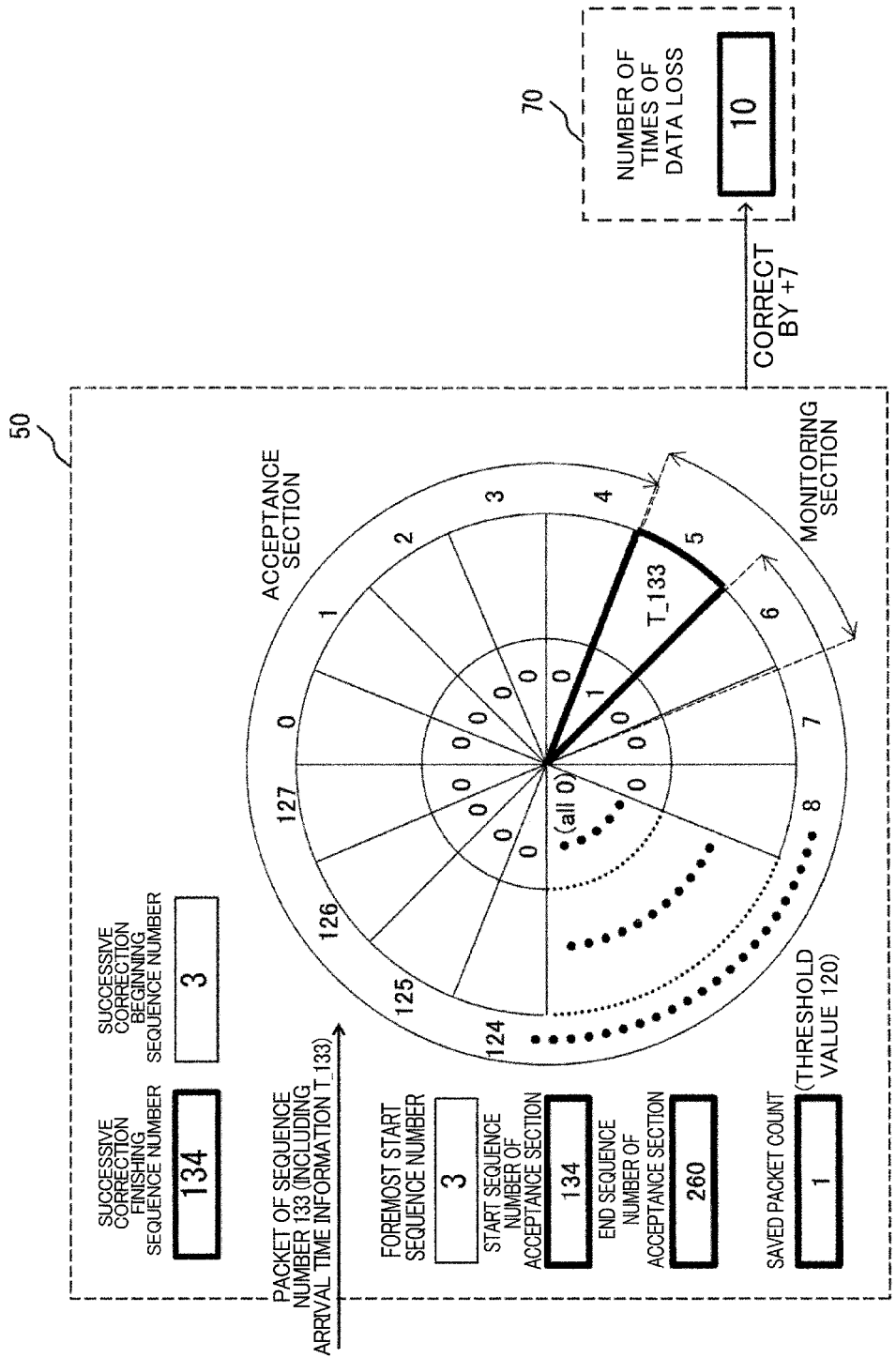
FIG. 44 is a diagram for describing operations of the ring ring buffer according to the second embodiment.

FIG. 44 is a state of the ring buffer after the packet of sequence number 133 has arrived in the state of saved packet count=0 illustrated in FIG. 43, and operations from the initial state having been performed. The start sequence number of the acceptance section has moved seven ahead from "127" to "134", and accordingly the number of times of data loss is corrected together by "+7", and the number of times of data loss becomes "10", in the same way as in FIG. 19. The current value of the foremost start sequence number in the state in FIG. 43 before packet reception is "3", and the decided start sequence number is "134", with "3" being a number coming before. Accordingly, the foremost start sequence number in FIG. 44 remains "3". The point of updating the successive correction finishing sequence number to the start sequence number of the acceptance section to "134" differs from FIG. 19.

Figure 45:
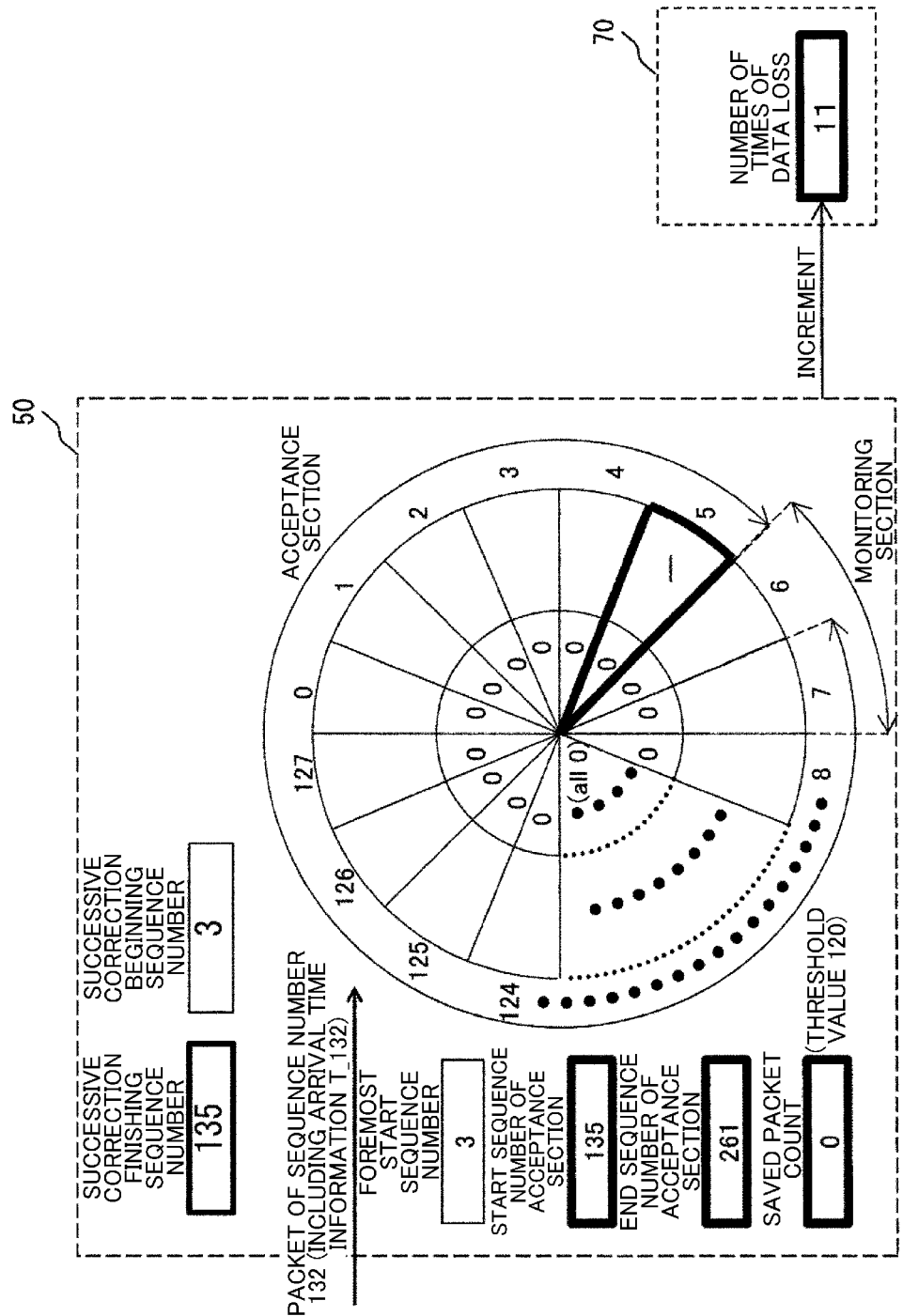
FIG. 45 is a diagram for describing operations of the ring ring buffer according to the second embodiment.

FIG. 45 is a state of the ring buffer after the packet of sequence number 132 outside of the acceptance section has arrived in the state in FIG. 44, and operations when receiving a packet outside of the acceptance section are performed in the same way. The point of updating the successive correction finishing sequence number to the start sequence number "135" of the acceptance section differs from FIG. 20.

Figure 46:
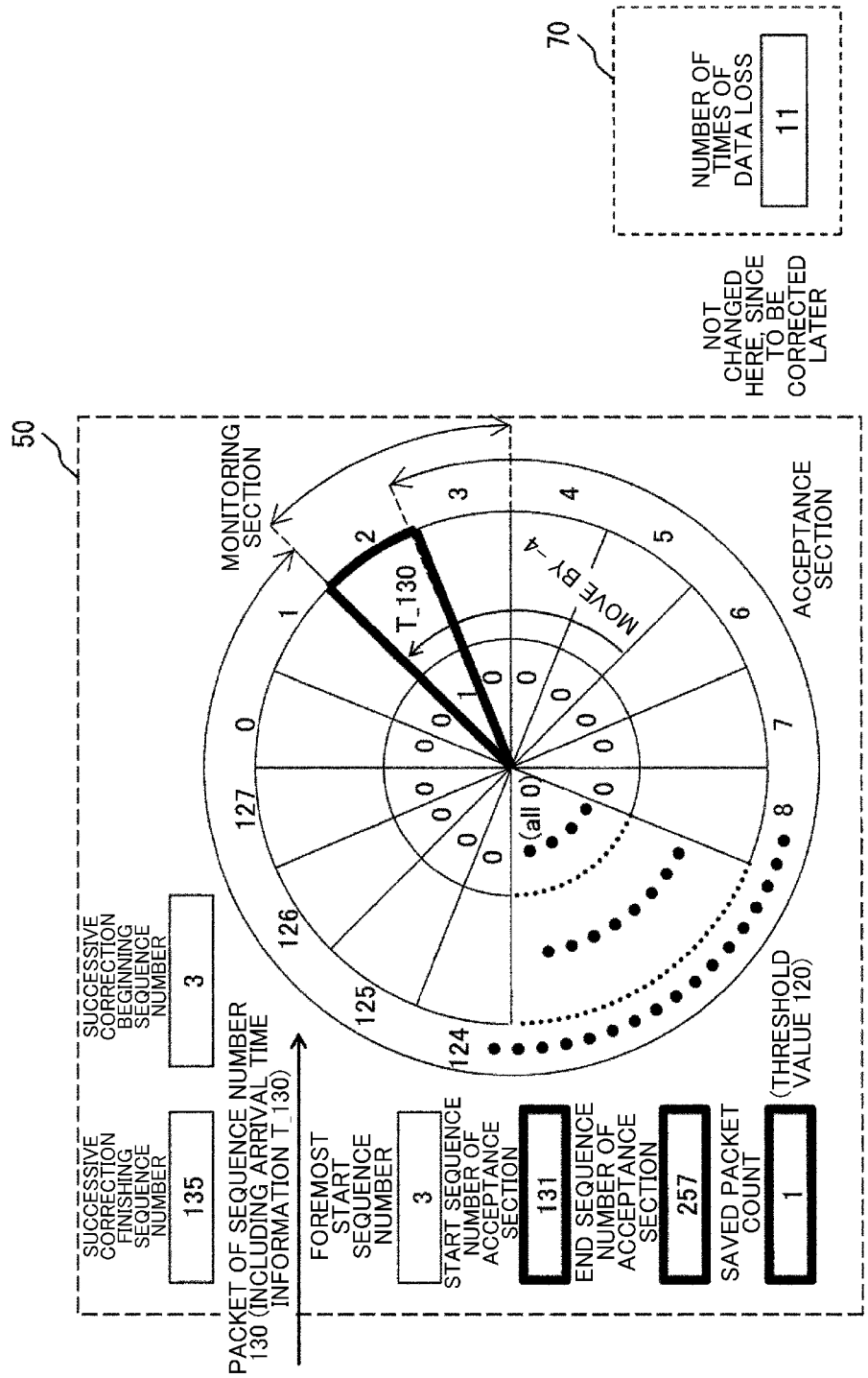
FIG. 46 is a diagram for describing operations of the ring ring buffer according to the second embodiment.

FIG. 46 is a state of the ring buffer after the packet of sequence number 130 has arrived in the state of saved packet count=0 illustrated in FIG. 45, and operations from the initial state having been performed. The start sequence number of the acceptance section has moved backward from "135" to "131", and accordingly, the number of times of data loss is not corrected together, unlike in FIG. 21. Thereafter, correction is performed by subtracting from the number of times of data loss one at a time, each time the start sequence number is moved ahead one each until reaching the successive correction finishing sequence number.

The current value of the foremost start sequence number in the state in FIG. 45 before packet reception is "3", and the decided start sequence number is "131", with "3" being a number coming before. Accordingly, the foremost start sequence number in FIG. 46 remains "3".

Figure 47:
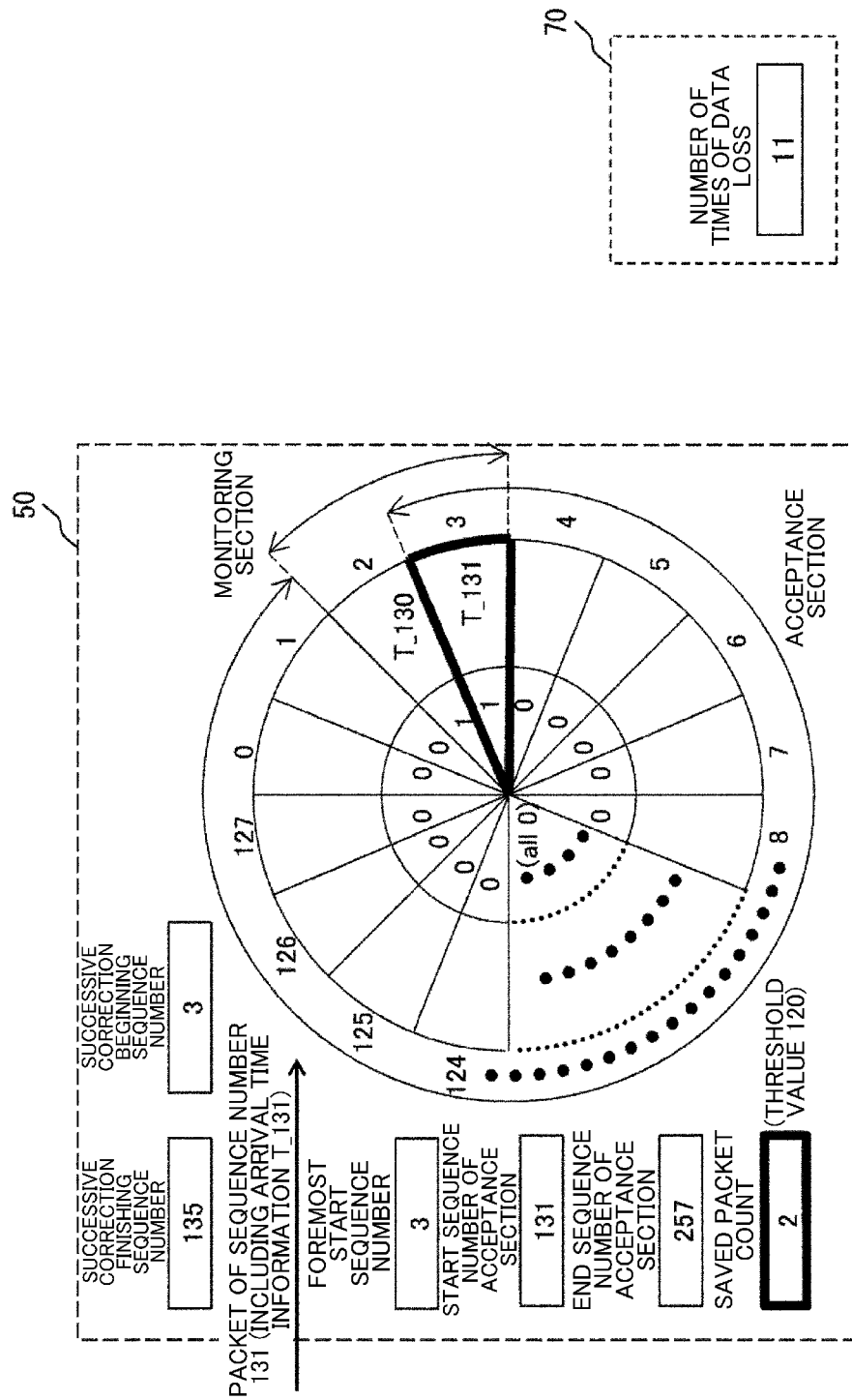
FIG. 47 is a diagram for describing operations of the ring ring buffer according to the second embodiment.

FIG. 47 is a state of the ring buffer after the packet of sequence number=131 in the acceptance section has arrived in FIG. 46, and the arrival time information T_131 thereof is written. The point of holding the successive correction beginning sequence number and the successive correction finishing sequence number, and the point of the number of times of data loss not being corrected, differ from FIG. 22.

Figure 48:
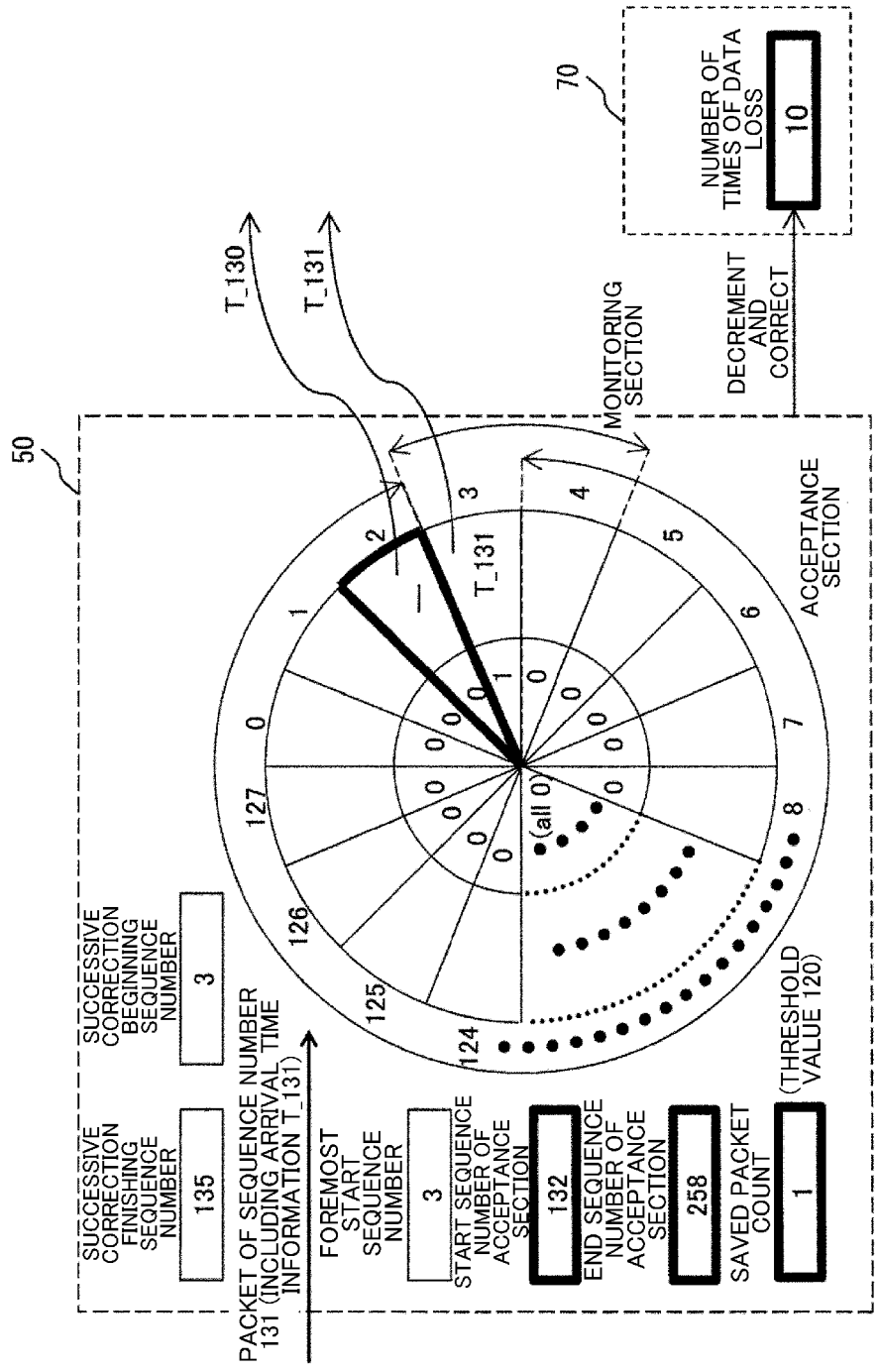
FIG. 48 is a diagram for describing operations of the ring ring buffer according to the second embodiment.

FIG. 48 is a state after performing a read operation, due to all data within the monitoring section (arrival time information T_130, T_131) being present in the state in FIG. 47. The point of performing correction of the number of times of data loss by decrementing, due to correction by subtracting from the number of times of data loss one at a time, each time the start sequence number is moved ahead one at a time until reaching the successive correction finishing sequence number, differs from FIG. 23.

Figure 49:
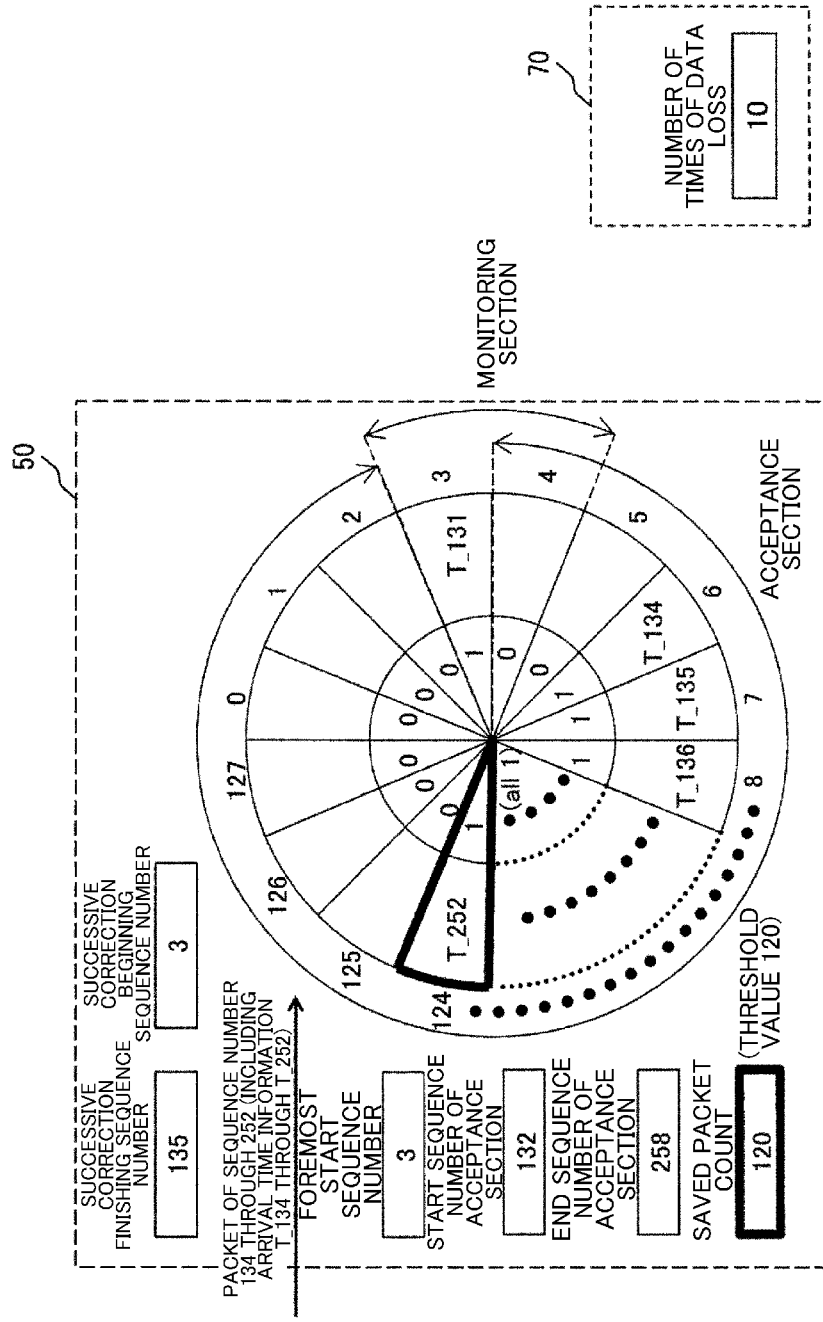
FIG. 49 is a diagram for describing operations of the ring ring buffer according to the second embodiment.

FIG. 49 is a state of the ring buffer after 118 packets of sequence numbers=134 through 252 arrive following the state in FIG. 48, and the arrival time information T_134 through T_252 thereof has been written.

Figure 50:
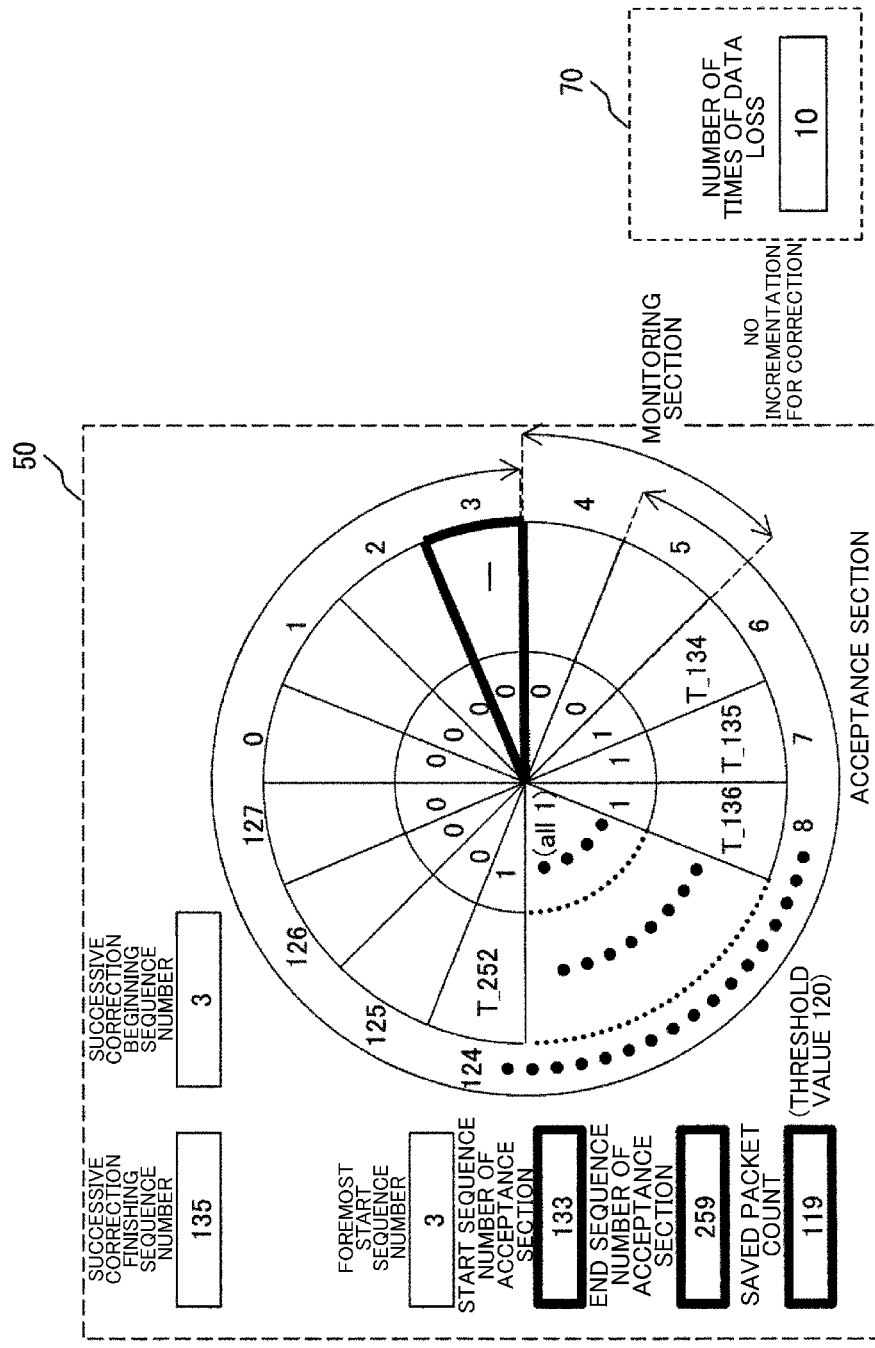
FIG. 50 is a diagram for describing operations of the ring ring buffer according to the second embodiment.

FIG. 50 is a state of the ring buffer in which the saved packet count has reached the threshold value 120 in FIG. 49 and data loss is determined to have occurred, and accordingly the operation of moving the monitoring section and the acceptance section each one ahead has been performed. The arrival flag of T_131 is cleared and the saved packet count decreases by 1 to 119. The point that the amount of incrementing due to determination that data loss has occurred being made and the amount of decrementing for correction cancel each other out, and the number of times of data loss does not change, differs from FIG. 25.

Figure 51:
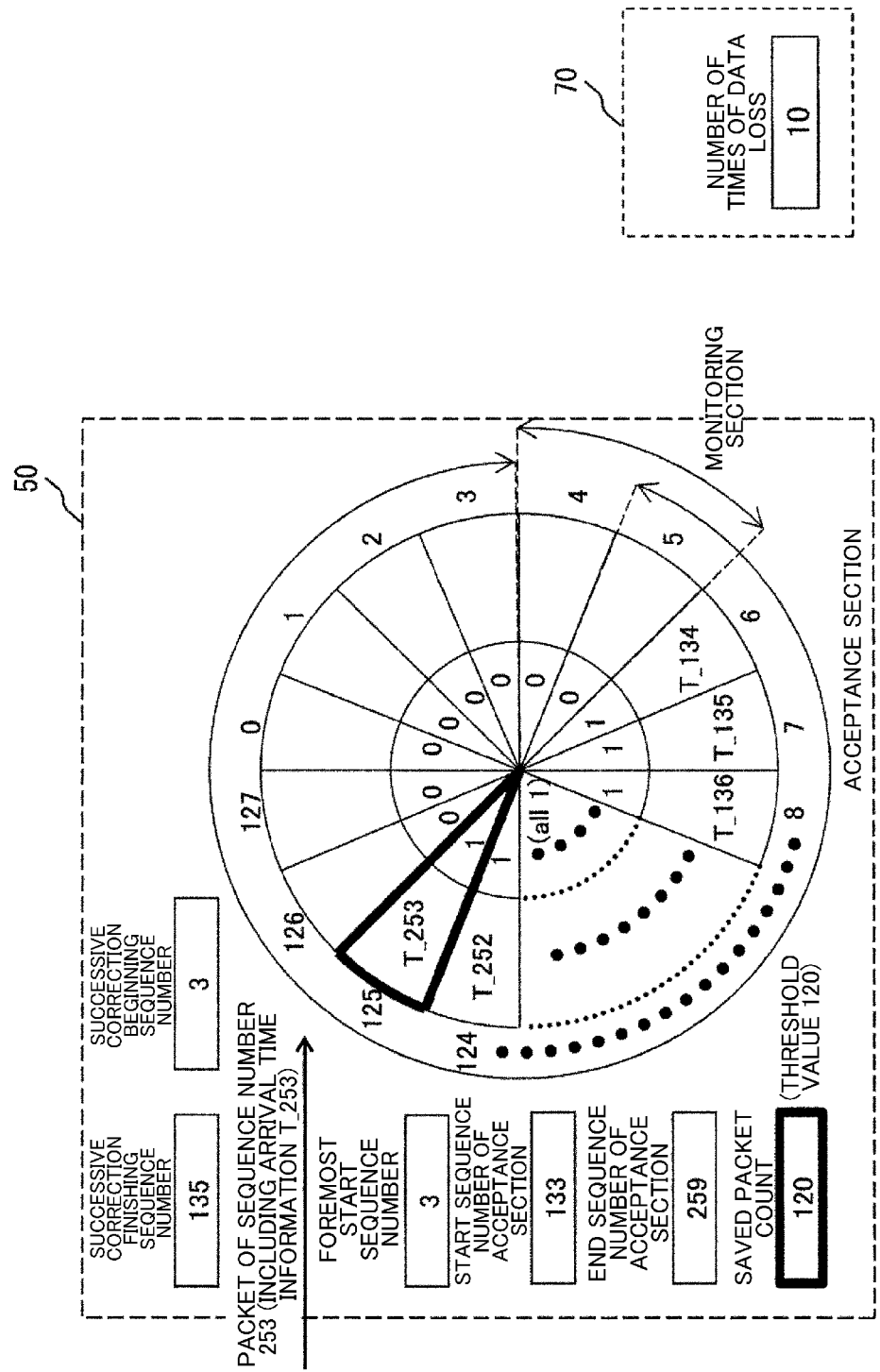
FIG. 51 is a diagram for describing operations of the ring ring buffer according to the second embodiment.

FIG. 51 is a state of the ring buffer after the packet of sequence number=253 arrives following the state in FIG. 50 and the arrival time information T_253 is written.

Figure 52:
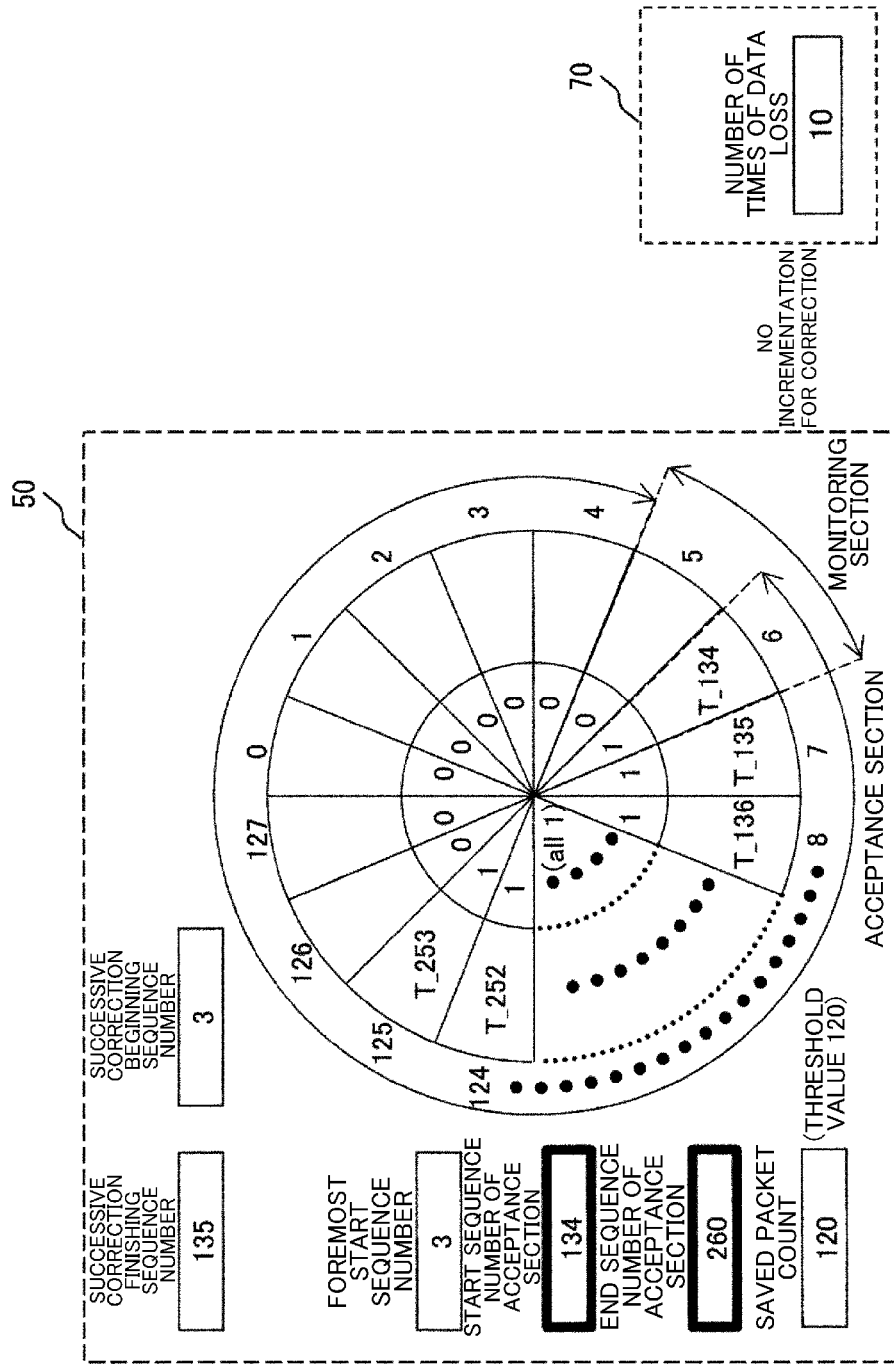
FIG. 52 is a diagram for describing operations of the ring ring buffer according to the second embodiment.

FIG. 52 is a state of the ring buffer in which the saved packet count has reached the threshold value 120 in FIG. 51 and data loss is determined to have occurred, and accordingly the moving of the monitoring section and the acceptance section each one ahead has been performed in the same way as in FIG. 14. The point that the amount of incrementing due to determination that data loss has occurred being made and the amount of decrementing for correction cancel each other out, and the number of times of data loss does not change, differs from FIG. 27.

Figure 53:
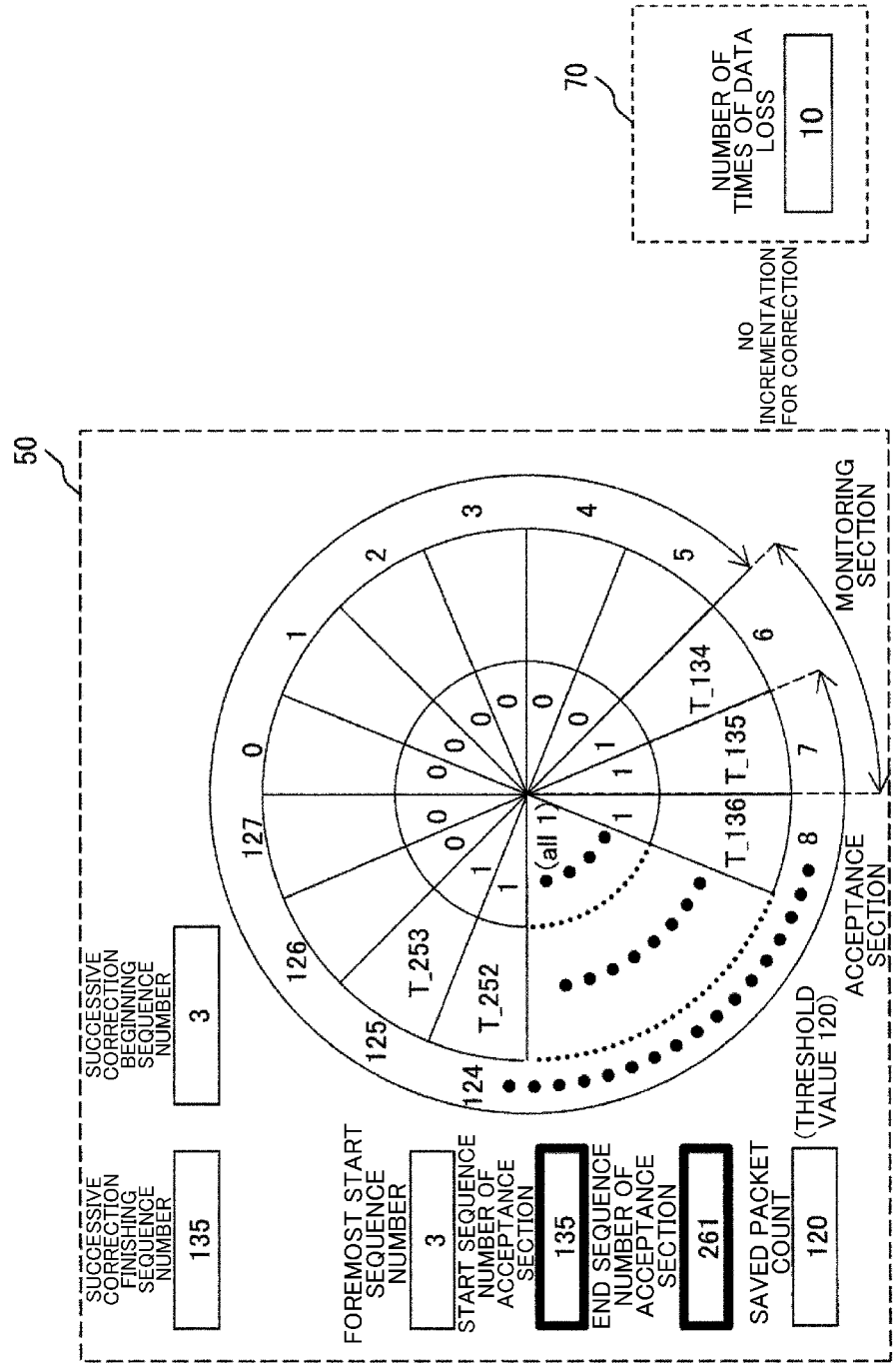
FIG. 53 is a diagram for describing operations of the ring ring buffer according to the second embodiment.

FIG. 53 is a state of the ring buffer in which the saved packet count has reached the threshold value 120 in FIG. 52 and data loss is determined to have occurred, and accordingly moving of the monitoring section and the acceptance section each one ahead has been performed in the same way as in FIG. 14. The point that the amount of incrementing due to determination that data loss has occurred being made and the amount of decrementing for correction cancel each other out, and the number of times of data loss does not change, differs from FIG. 28.

The start sequence number is updated one ahead and becomes the same as the successive correction finishing sequence number "135", and the number of times of data loss becomes the same "10" as in FIG. 28 when correction was performed together. Hereafter, correction of the number of times of data loss is unnecessary.

Figure 54:
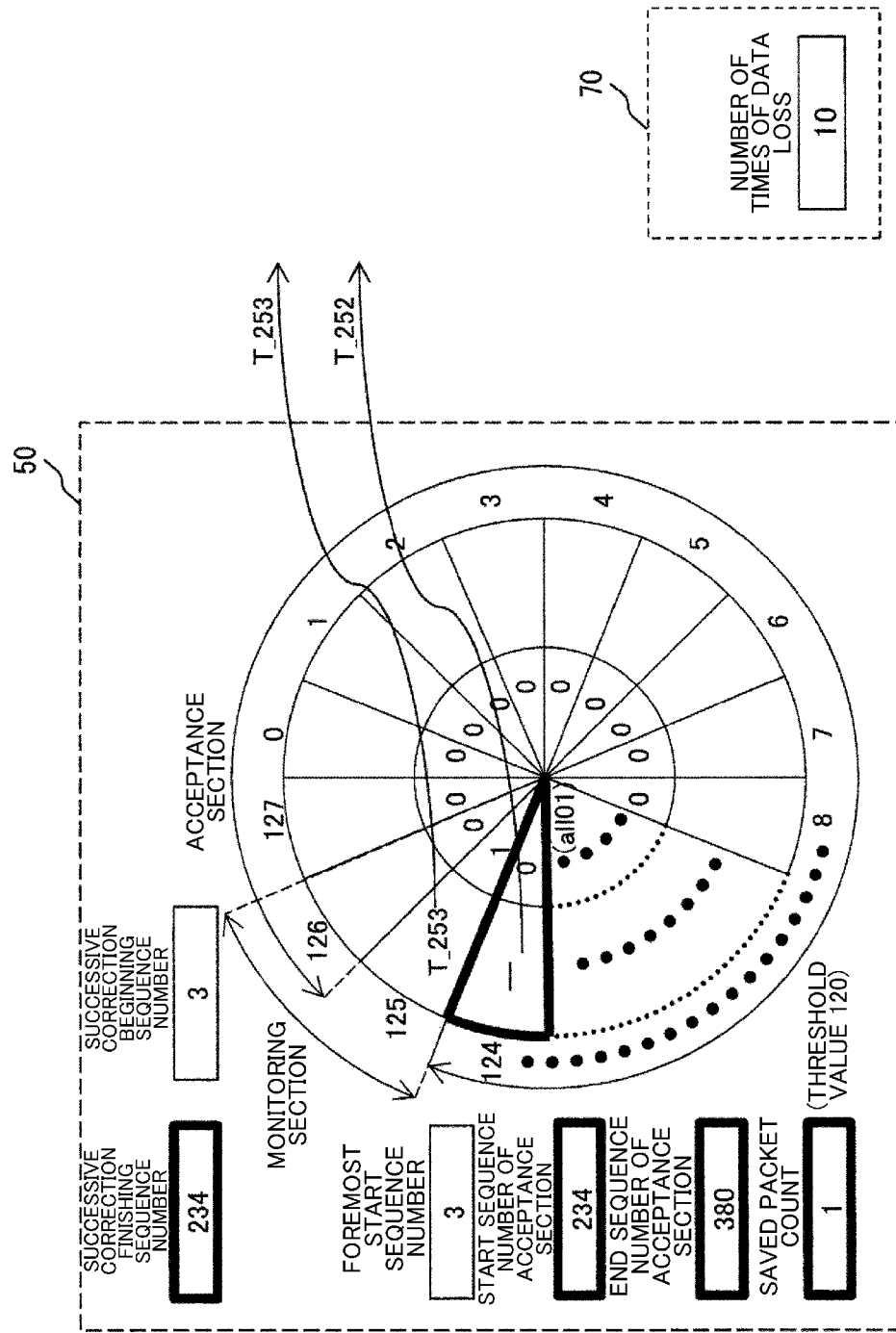
FIG. 54 is a diagram for describing operations of the ring ring buffer according to the second embodiment.

FIG. 54 is a state of the ring buffer after repeated reading due to the arrival time information T_135 through T_253 all being present in the state in FIG. 53.

In FIG. 42 through FIG. 53, out of the total of 252 packets of sequence numbers 2 through 253 thought to have been output from the transmission source, 241 sets of consecutive packets have been read out from the ring buffer and the arrival intervals have been calculated and summarized. Meanwhile, in FIG. 54, the number of times of data loss is ten and the saved packet count is 1. The total thereof is 241+10+1=252, which matches the count of packets thought to have been output from the transmission source. Accordingly, it can be understood that the number of times of data loss is summarized properly by correction.

Figure 55:
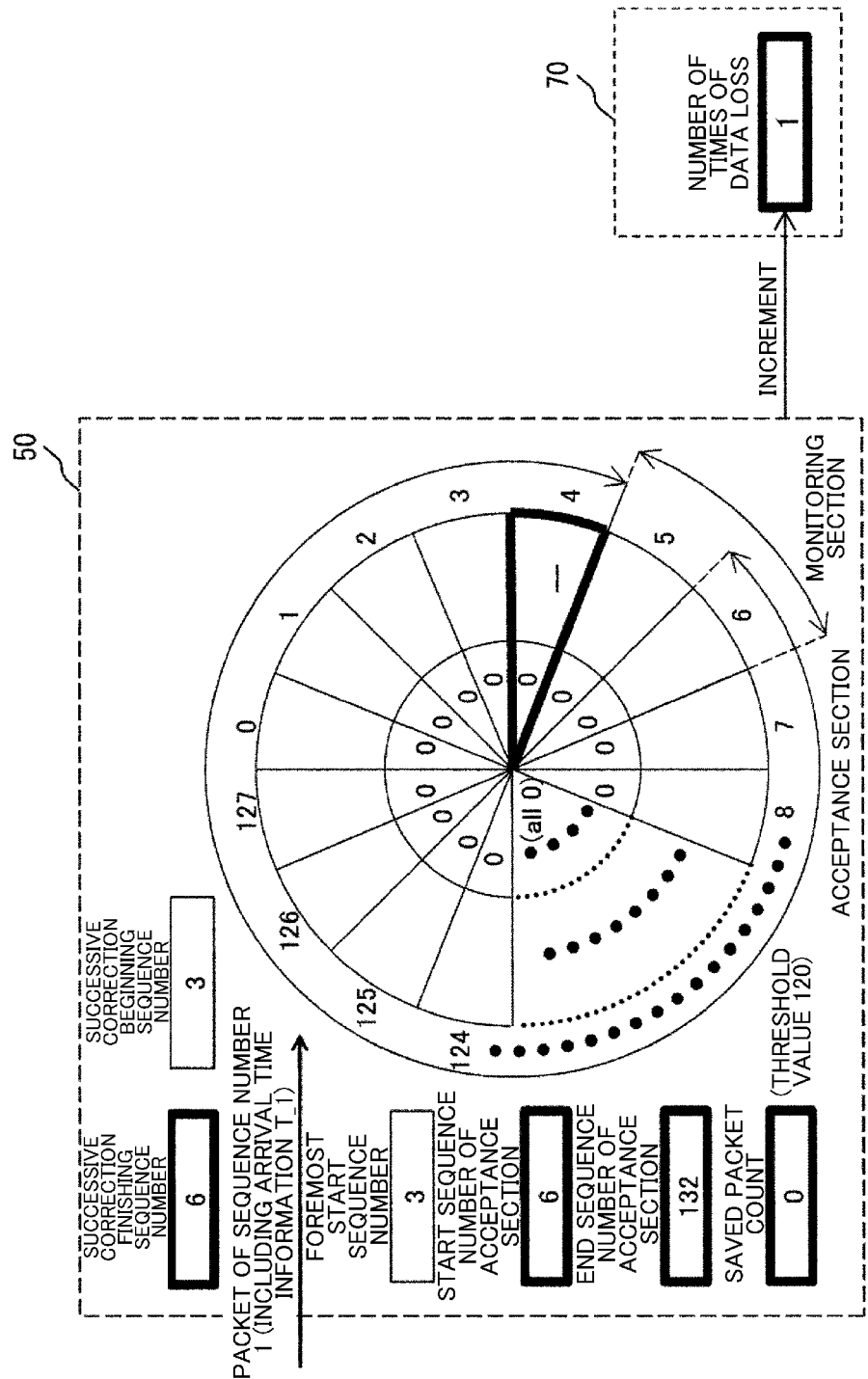
FIG. 55 is a diagram for describing operations of the ring ring buffer according to the second embodiment.

FIG. 55 is a state of the ring buffer after packets arriving in the same way as in FIG. 8 through FIG. 12, following the state in FIG. 41, the packet of sequence number 1 outside of the acceptance section arriving at the end, and operations for when receiving a packet outside of the acceptance section having been performed. The point that the successive correction finishing sequence number becomes "6" as a result of also updating the successive correction finishing sequence number ahead in conjunction with updating the start sequence number of the acceptance section ahead differs from FIG. 30.

Figure 56:
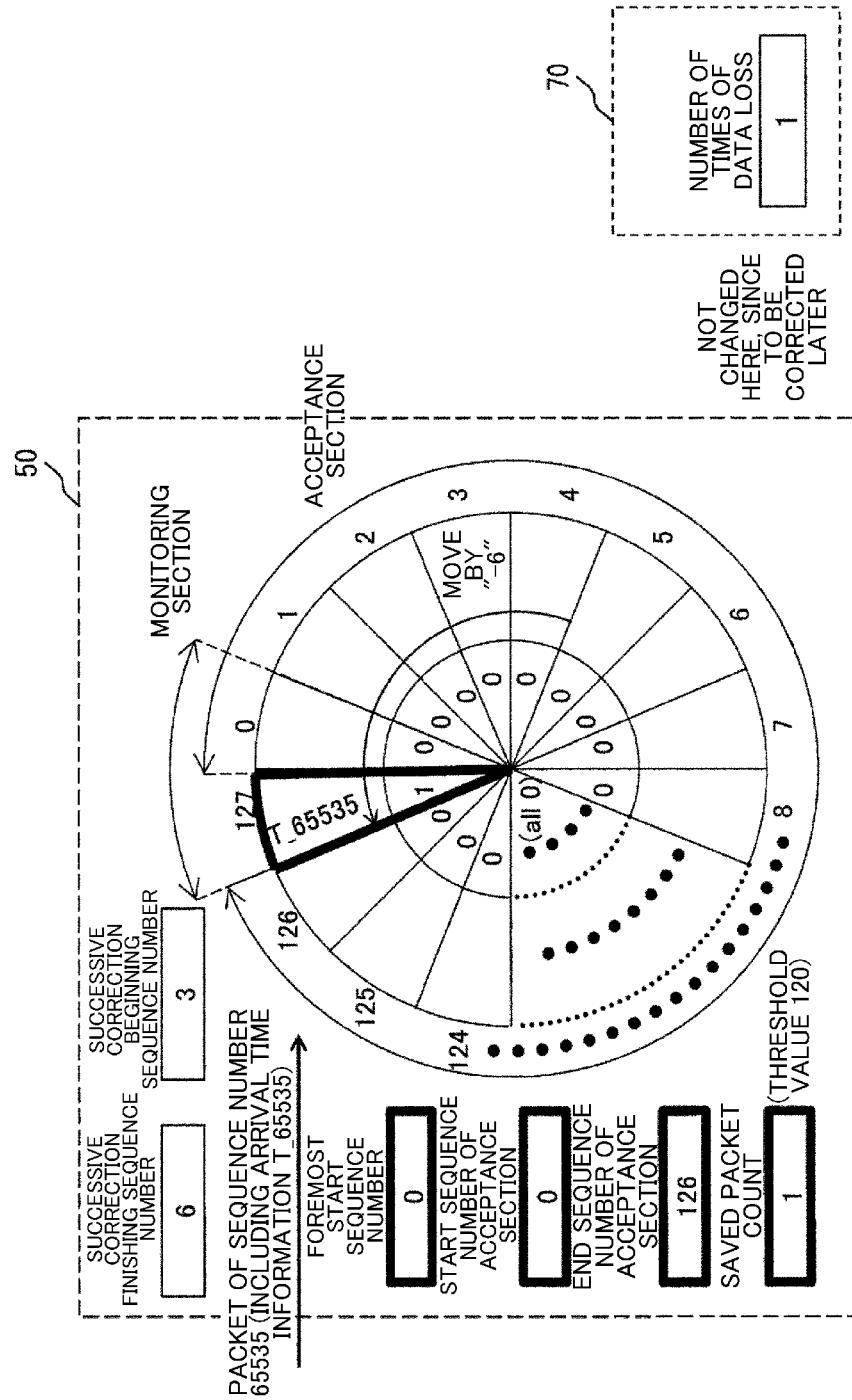
FIG. 56 is a diagram for describing operations of the ring ring buffer according to the second embodiment.

FIG. 56 is a state of the ring buffer after a packet of sequence number 65535 arrives in the state of saved packet count=0 illustrated in FIG. 55, and operations have been performed from the initial state. The start sequence number of the acceptance section has moved backward from "6" to "0", and accordingly, the number of times of data loss is not corrected together, unlike in FIG. 31. Thereafter, correction is performed by subtracting from the number of times of data loss one at a time, each time the start sequence number is moved ahead by one, as long as the start sequence number is between the successive correction beginning sequence number and the successive correction finishing sequence number (successive correction beginning sequence number start sequence number<successive correction finishing sequence number).

The current value of the foremost start sequence number in the state in FIG. 55 before packet reception is "3", and the decided start sequence number is "0", with "0" being a number coming before. Accordingly, the foremost start sequence number in FIG. 56 is "0".

Figure 57:
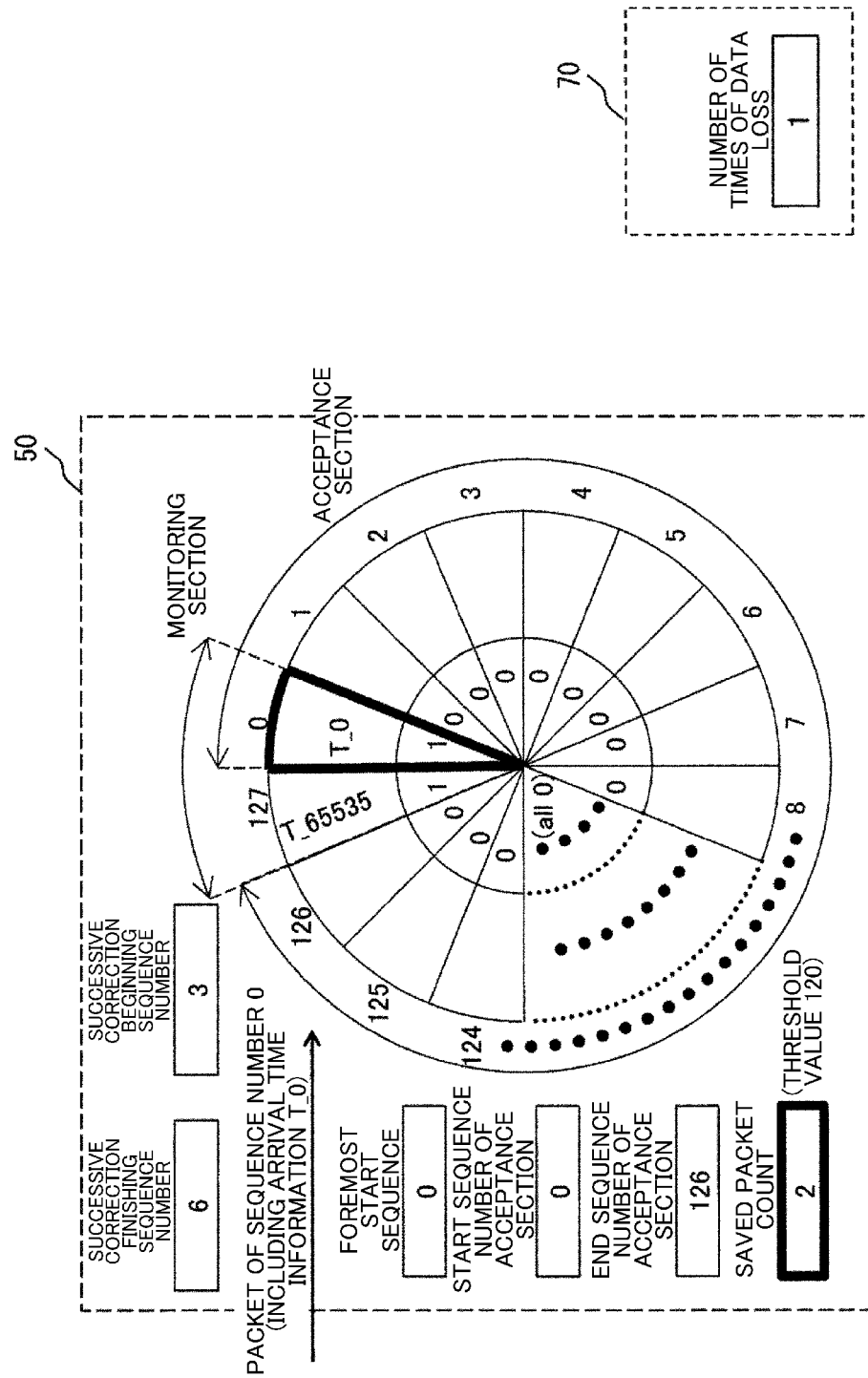
FIG. 57 is a diagram for describing operations of the ring ring buffer according to the second embodiment.

FIG. 57 is a state of the ring buffer after the packet of sequence number=0 in the acceptance section has arrived in the state in FIG. 56, and write operations having been performed.

Figure 58:
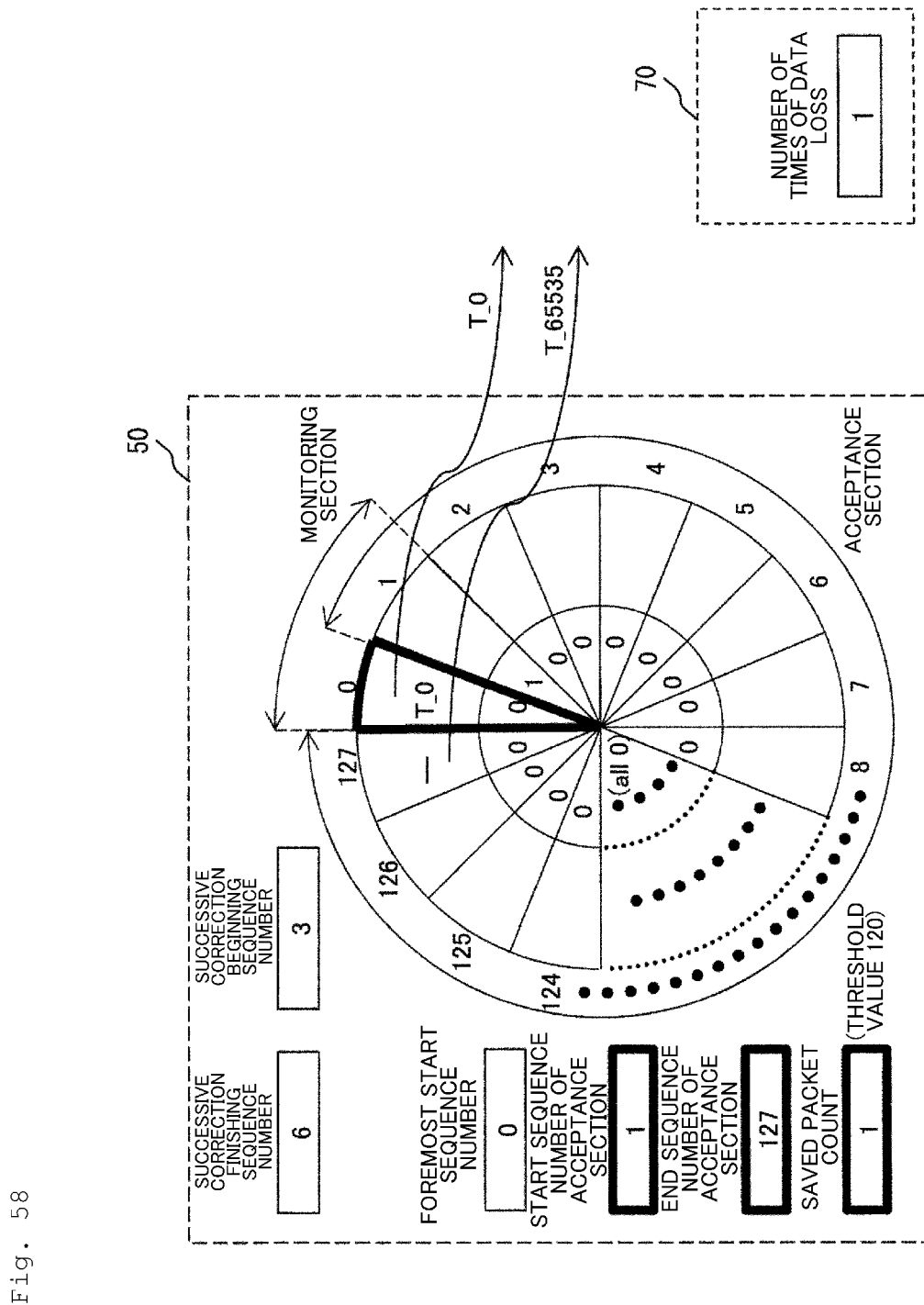
FIG. 58 is a diagram for describing operations of the ring ring buffer according to the second embodiment.

FIG. 58 is a state after performing a read operation, due to all data within the monitoring section (arrival time information T_65535, T_0) being present in the state in FIG. 57. Correction of the number of times of data loss is not performed unless the start sequence number is between the successive correction beginning sequence number and the successive correction finishing sequence number, and accordingly the number of times of data loss does not change, in the same way as in FIG. 33.

Figure 59:
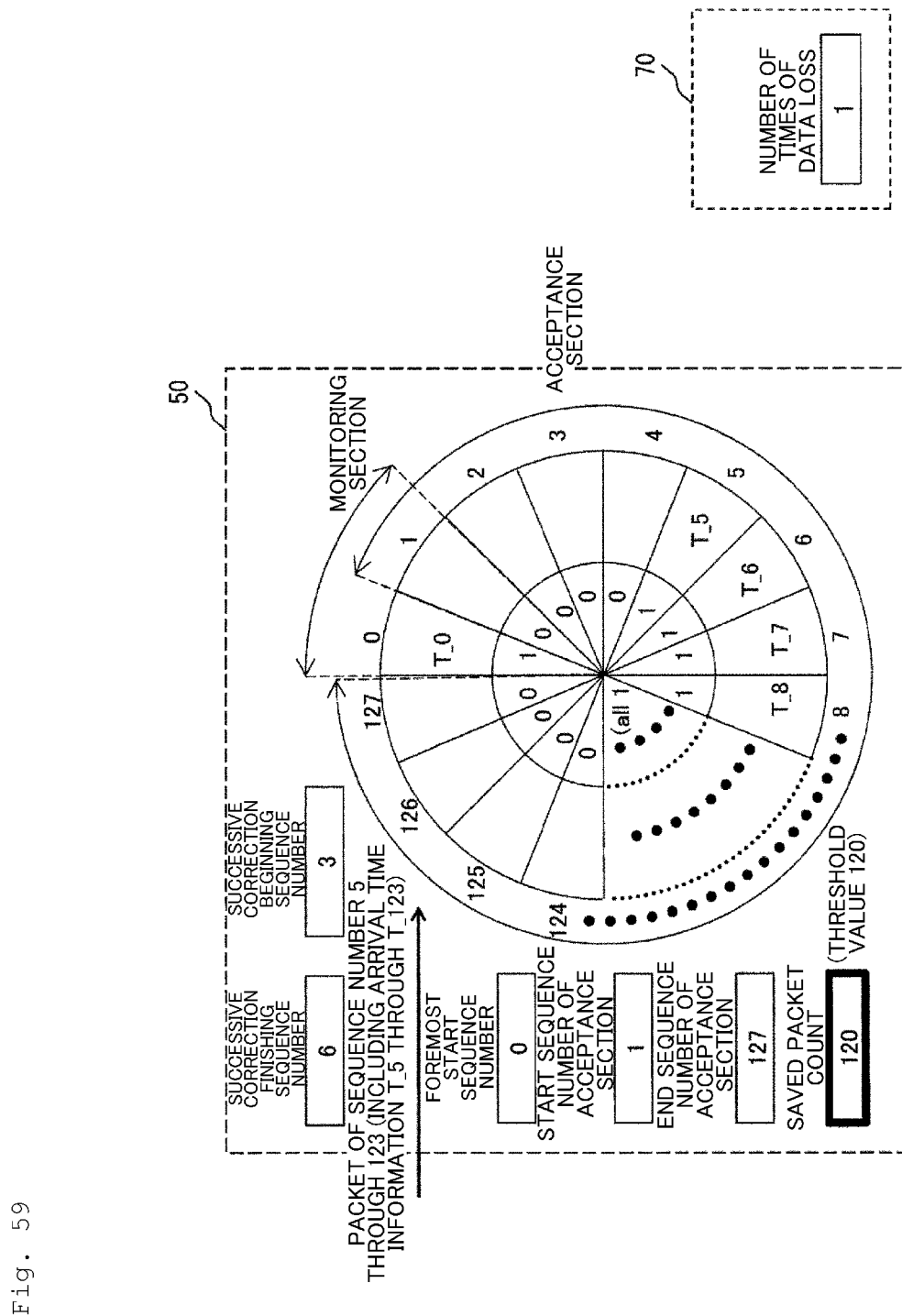
FIG. 59 is a diagram for describing operations of the ring ring buffer according to the second embodiment.

FIG. 59 is a state of the ring buffer after 119 packets of sequence numbers=5 through 123 arriving within the acceptance section following the state in FIG. 58 without the packets of sequence numbers=1 through 4 arriving, and the arrival time information T_5 through T_123 thereof has been written. The saved packet count has increased by 119 to 120, in the same way as in FIG. 34, and has reached the threshold value 120 of the saved packet count. Note that the three packets of sequence numbers 2 through 4 have arrived in the past, and accordingly will not arrive hereafter.

Figure 60:
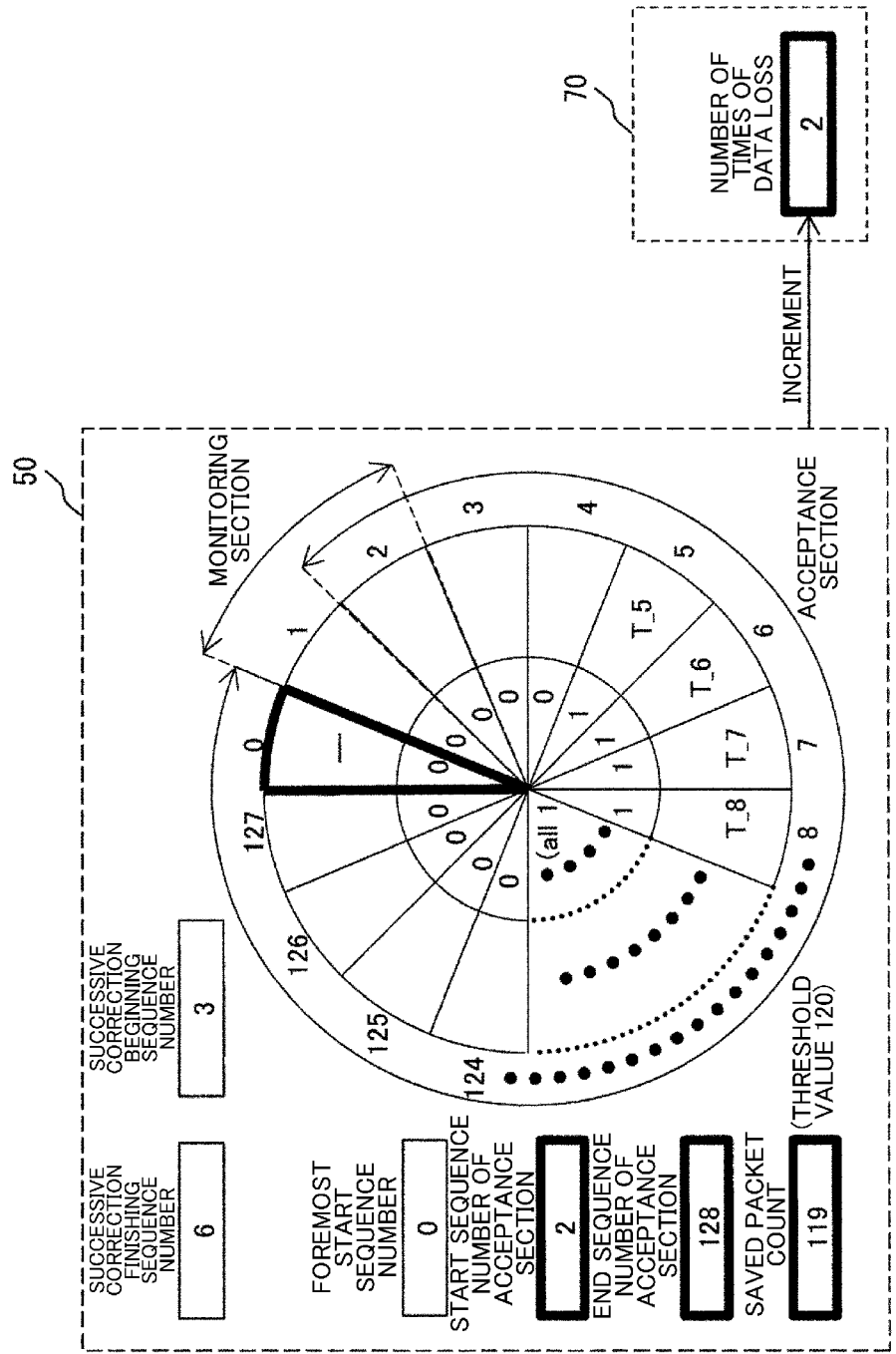
FIG. 60 is a diagram for describing operations of the ring ring buffer according to the second embodiment.

FIG. 60 is a state of the ring buffer in which the saved packet count has reached the threshold value 120 in FIG. 59 and data loss is determined to have occurred, and accordingly the monitoring section and the acceptance section are moved one each ahead. Correction of the number of times of data loss is not performed unless the start sequence number is between the successive correction beginning sequence number and the successive correction finishing sequence number, and accordingly the number of times of data loss is incremented, in the same way as in FIG. 35.

Figure 61:
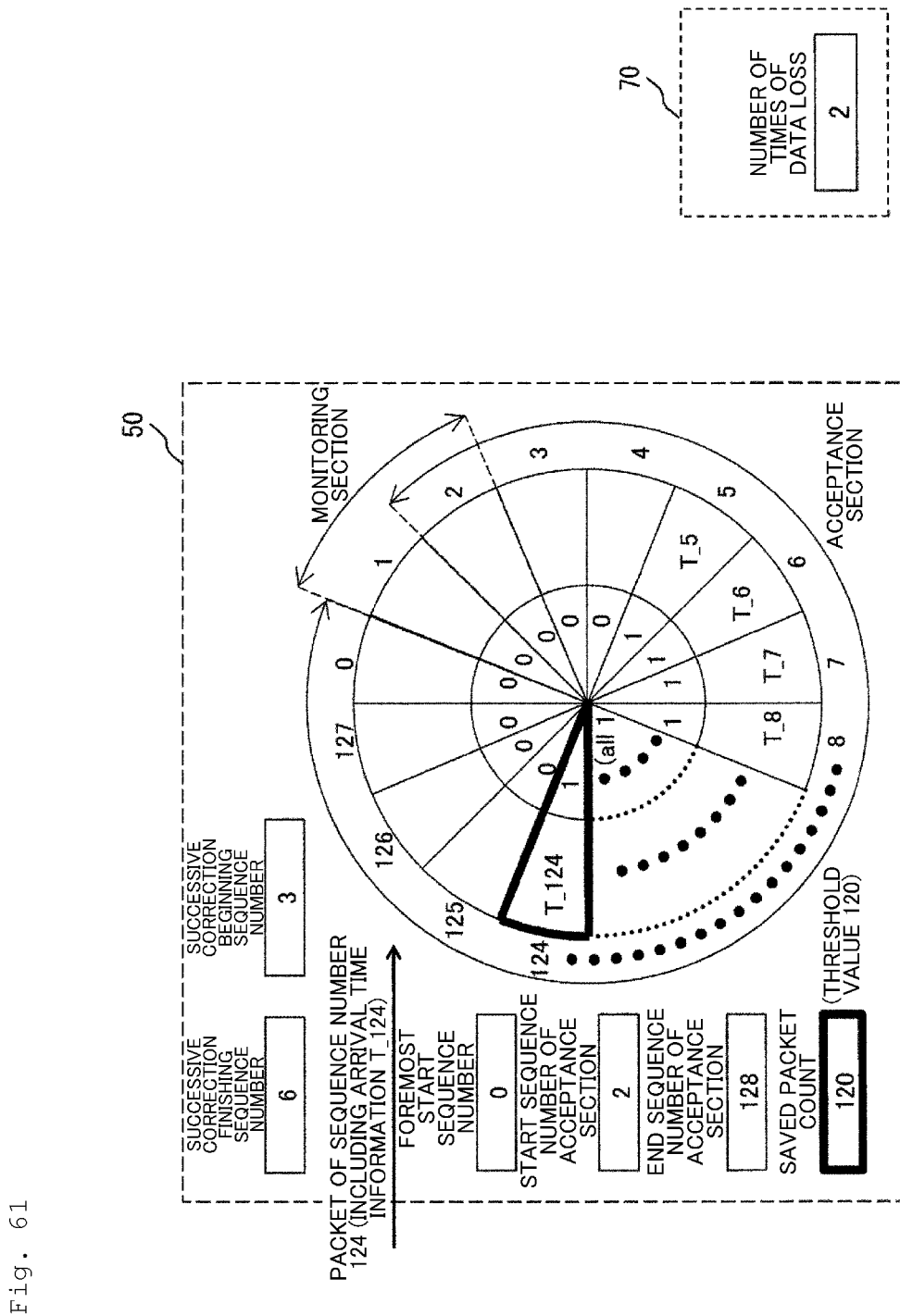
FIG. 61 is a diagram for describing operations of the ring ring buffer according to the second embodiment.

FIG. 61 is a state of the ring buffer after the packet that is sequence number=124 within the acceptance section arrives in the state in FIG. 60, and a write operation is performed.

Figure 62:
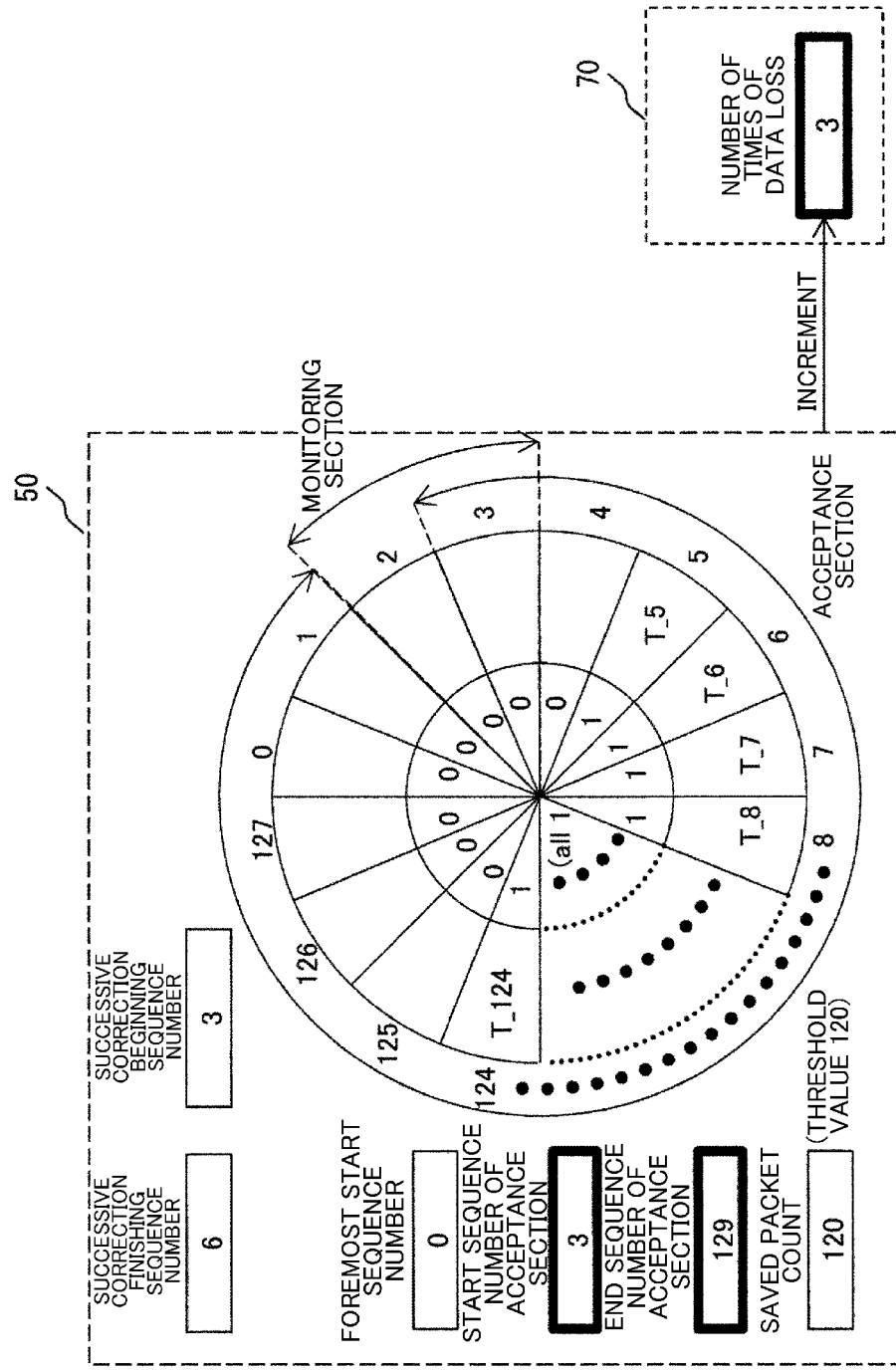
FIG. 62 is a diagram for describing operations of the ring ring buffer according to the second embodiment.

FIG. 62 is a state of the ring buffer after the saved packet count has reached the threshold value 120 in FIG. 61 and data loss is determined to have occurred, and accordingly the monitoring section and the acceptance section have been moved each one ahead.

Correction of the number of times of data loss is not performed unless the start sequence number is between the successive correction beginning sequence number and the successive correction finishing sequence number, and accordingly the number of times of data loss is incremented. Note that due to the start sequence number becoming the same "3" as the successive correction beginning sequence number, thereafter, correction is performed in which one each is subtracted from the number of times of data loss each time moving ahead by one, until the start sequence number is the same as the successive correction finishing sequence number.

Figure 63:
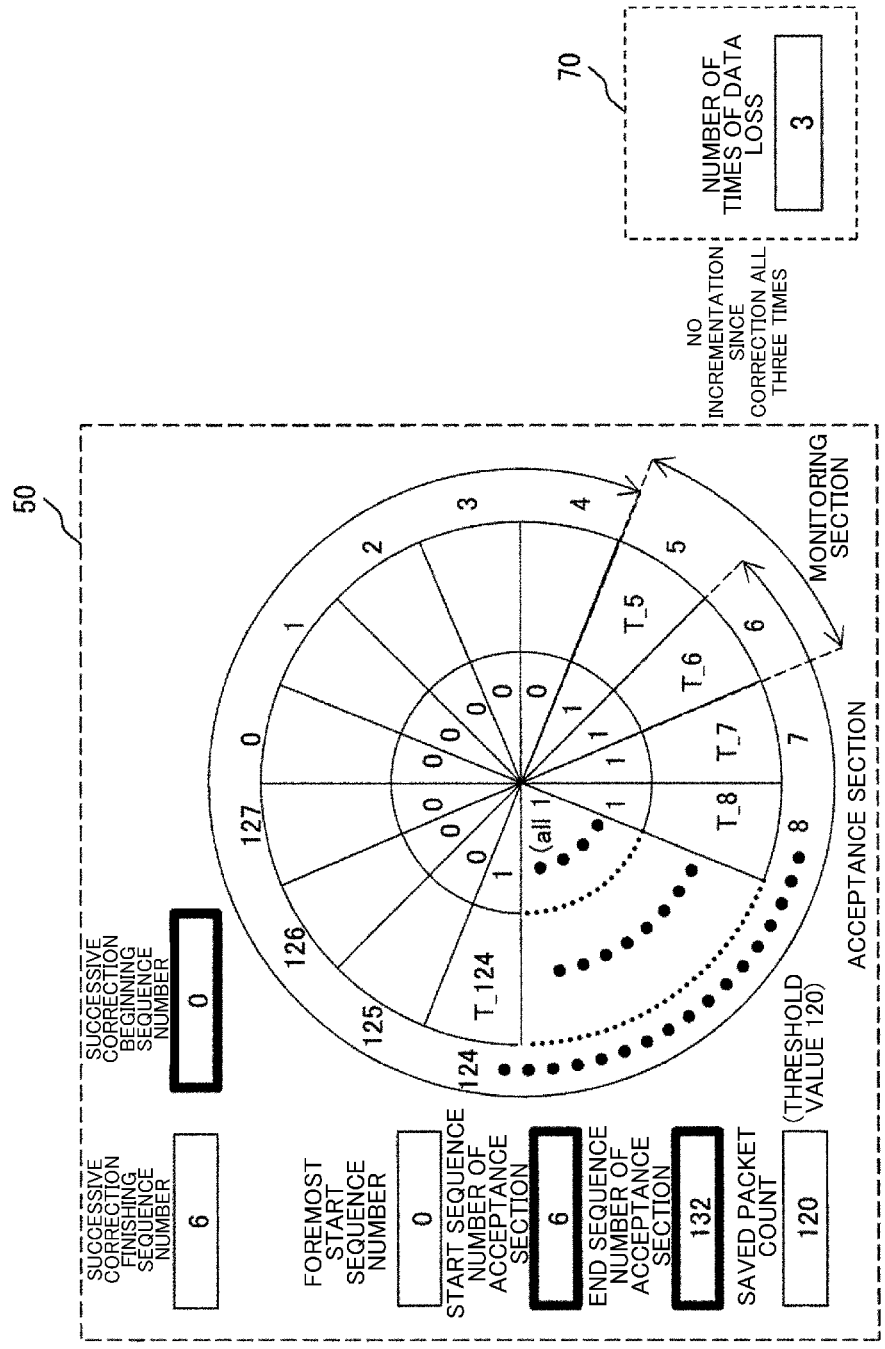
FIG. 63 is a diagram for describing operations of the ring ring buffer according to the second embodiment.

FIG. 63 is a state of the ring buffer after the saved packet count has reached the threshold value 120 in FIG. 62 and data loss is determined to have occurred, and accordingly the operation of moving the monitoring section and the acceptance section each one ahead has been performed three more times. Correction of the number of times of data loss is performed while the start sequence number is between the successive correction beginning sequence number and the successive correction finishing sequence number (successive correction beginning sequence number (3)≤start sequence number<successive correction finishing sequence number (6)). The point that the amount of incrementing due to determination that data loss has occurred being made and the amount of decrementing for correction cancel each other out, and the number of times of data loss does not change, differs from FIG. 37. Also, the start sequence number is now ahead of the successive correction beginning sequence number, and accordingly the successive correction beginning sequence number is updated to the foremost start sequence number.

Now, the start sequence number is updated three ahead and becomes the same as the successive correction finishing sequence number "6", and the number of times of data loss becomes the same "3" as in FIG. 37 when correction was performed together. Hereafter, correction of the number of times of data loss is unnecessary.

Figure 64:
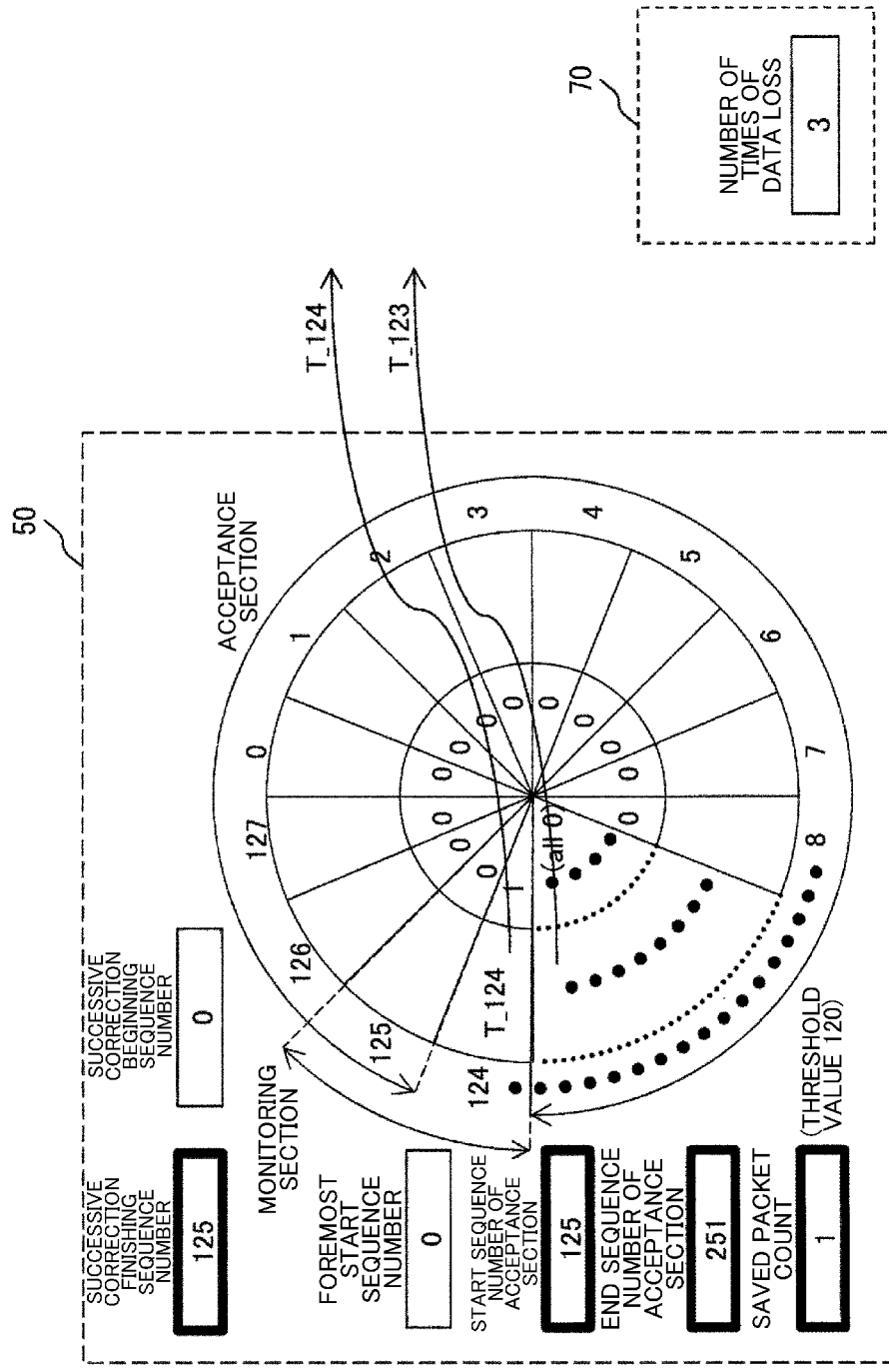
FIG. 64 is a diagram for describing operations of the ring ring buffer according to the second embodiment.

FIG. 64 is a state of the ring buffer after repeatedly reading in the same way as in FIG. 17 due to arrival time information T_135 through T_253 being all present in the state in FIG. 63.

In FIG. 55 through FIG. 63, out of the total of 126 packets of sequence numbers 65535 and 0 through 124 thought to have been output from the transmission source, 122 sets of consecutive packets have been read out from the ring buffer and the arrival intervals have been calculated and summarized. Meanwhile, in FIG. 64 the number of times of data loss is three and the saved packet count is 1. The total thereof is 122+3+1=126, which matches the count of packets thought to have been output from the transmission source. Accordingly, it can be understood that the number of times of data loss is summarized properly by correction.

Effects of Second Embodiment

According to the second embodiment, a configuration is made in which, in a case of moving the start sequence number of the acceptance section backward, instead of performing correction of the number of times of data loss together, correction is performed by subtracting from the number of times of data loss one at a time, each time the start sequence number temporarily moved backward is updated ahead one at a time due to reading data or data loss. Thus, the problem of deviation as to the actual number of times of data loss can be avoided, as compared to a case of performing correction of the number of times of data loss together.

Expansion of Embodiments

Although the present invention has been described above with reference to embodiments, the present invention is not limited to the above embodiments. Various modifications of the configuration and details of the present invention that are understandable by one skilled in the art may be made within the scope of the technical spirit of the present invention.

REFERENCE SIGNS LIST

1 Packet monitoring device
10 PHY unit
20 MAC unit
30 Arrival time information imparting unit
40 Monitoring object extracting unit
50 Packet sequence correction unit
51 Acceptable/non-acceptable judging unit
52 Ring buffer writing unit
53 Ring buffer reading unit
54 Monitoring-section/acceptance-section managing unit
55 Ring buffer
60 Packet interval calculating unit
70 Statistical information storage unit
80 Visualization unit

The invention claimed is:

1. A data sequence correction method, the method comprising:
   temporarily saving data with sequence information imparted thereto in a ring buffer, the ring buffer having a predetermined number of storage regions corresponding to the sequence information, and being provided with a monitoring section made up of one, or two or more consecutive sequence numbers, and an acceptance section in which a start or a second sequence number of the monitoring section is a start sequence number, and the sequence number ahead by a count of storage regions of the ring buffer including the start of the monitoring section is an end sequence number;
   in a case of a sequence number of received data being within the acceptance section, writing the received data to a position of the storage region that corresponds to a value decided on the basis of a remainder from dividing the sequence number of the received data by the count of storage regions of the ring buffer;
   reading out all data within the monitoring section in a case of data being written to all of the monitoring section;
   updating the respective start sequence number and end sequence number of the monitoring section and the acceptance section ahead, within a range of a count of sequence numbers in the monitoring section;
   in a case in which a count of data stored in the ring buffer is zero, writing the received data to a position of the storage region corresponding to a value decided on the basis of a remainder from dividing the sequence number of the received data by the count of storage regions of the ring buffer, taking the received data as a start of the monitoring section, and deciding a respective start sequence number and end sequence number of the monitoring section and the acceptance section in accordance with the start of the monitoring section;
   determining that data loss exceeding a storage limit of the ring buffer has occurred in a case of satisfying a determination condition set in advance, even if one or more positions of the monitoring section is clear, updating the respective start sequence number and end sequence number of the monitoring section and the acceptance section ahead by one, and incrementing the number of times of data loss; and
   in a case in which the received data is not first-time reception data in a state in which the count of data stored in the ring buffer is zero and deciding the monitoring section and the acceptance section with the received data as the start of the monitoring section, correcting the number of times of data loss in accordance with an amount of movement of the monitoring section and the acceptance section before and after deciding the monitoring section and the acceptance section.

2. The data sequence correction method according to claim 1, wherein, in a case in which the received data is not first-time reception data in a state in which the count of data stored in the ring buffer is zero, correction is performed by adding, to the number of times of data loss, the amount of movement of the monitoring section and the acceptance section before and after deciding the monitoring section and the acceptance section.

3. The data sequence correction method according to claim 2,
   wherein, in a case in which the received data is first-time reception data in a state in which the count of data stored in the ring buffer is zero, the start sequence number of the acceptance section that is decided is stored as a foremost start sequence number,
   and wherein, in a case in which the received data is not first-time reception data, the foremost start sequence number is updated to a value out of a current value and the decided start sequence number that is earlier, and correction of the number of times of data loss is performed by subtracting a movement amount due to updating of the foremost start sequence number from the movement amount of the monitoring section and the acceptance section.

4. The data sequence correction method according to claim 1,
   wherein, in a case in which the received data is first-time reception data in a state in which the count of data stored in the ring buffer is zero, the start sequence number of the acceptance section that is decided is stored as a successive correction finishing sequence number,
   wherein, in a state in which the count of data stored in the ring buffer is not zero, the start sequence number is updated to be ahead of the successive correction finishing sequence number by reading data from the ring buffer or by the data loss, and the successive correction finishing sequence number is updated in accordance with updating of the start sequence number,
   wherein, in a case in which the received data is not first-time reception data in a state in which the count of data stored in the ring buffer is zero, and also the start sequence number that is decided is ahead of the successive correction finishing sequence number, correction is performed by adding, to the number of times of the data loss, the movement amount of the monitoring section and the acceptance section before and after deciding the monitoring section and the acceptance section, and the successive correction finishing sequence number is updated to the start sequence number, wherein, in a case in which the received data is not first-time reception data in a state in which the count of data stored in the ring buffer is zero, and also the start sequence number that is decided is earlier than the successive correction finishing sequence number, the number of times of data loss is not changed, and wherein, only in a case in which the start sequence number is earlier than the successive correction finishing sequence number, the number of times of data loss is corrected by decrementing when reading out data all present in the monitoring section and updating the start sequence number one ahead, and the number of times of data loss is not updated when determining that the data loss has occurred and updating the start sequence number one ahead.

5. The data sequence correction method according to claim 4, p1 wherein, in a case in which the received data is first-time reception data in a state in which the count of data stored in the ring buffer is zero, the start sequence number that is decided is stored as a successive correction beginning sequence number, and the start sequence number that is decided is stored as the foremost start sequence number, wherein, in a case in which the received data is not first-time reception data in a state in which the count of data stored in the ring buffer is zero, the successive correction beginning sequence number is updated to the foremost start sequence number, and the foremost start sequence number is updated to a value out of a current value and the decided start sequence number that is earlier, and wherein, in a case in which the start sequence number is earlier than the successive correction beginning sequence number, the number of times of data loss is not corrected even when before the successive correction finishing sequence number.

6. The data sequence correction method according to claim 1, wherein determination is made that the data loss has occurred when one or more of conditions of a case in which a count of arrival time information stored from the start of the monitoring section to the end of the acceptance section has reached a predetermined count, a case in which sequence information of arrival time information of a received packet was not within the acceptance section, and a case in which a predetermined amount of time has elapsed from an arrival time indicated by arrival time information at the start of the monitoring section or nearest to the start, is satisfied.

7. A packet monitoring device, comprising:

an arrival time information imparter configured to impart arrival time information to a received packet containing sequence information in a header;

a monitoring object extractor configured to extract monitoring-object packets on the basis of information in the header of the received packet;

a packet sequence corrector configured to correct the sequence of the monitoring-object packets, on the basis of the sequence information within the headers of the monitoring-object packets, and outputs arrival time information of two packets of which the sequence information is consecutive, determines that packet loss has occurred when two consecutive packets of which the sequence information are not present even when a storage limit of the ring buffer is exceeded, and advances the start position of the ring buffer and counts up the number of times of occurrence of packet loss;

a packet interval calculator configured to find packet intervals from difference in arrival times of two packets of which the sequence information is consecutive;

a statistical information storage configured to store frequency distribution of the packet intervals, and the number of times of occurrence of packet loss; and a visualizer configured to display as a histogram, on the basis of frequency distribution of the packet intervals and the number of times of occurrence of packet loss, stored in the statistical information storage.

8. The packet monitoring device according to claim 7, wherein the packet sequence corrector is further configured to:

temporarily save data with sequence information imparted thereto in a ring buffer, the ring buffer having a predetermined number of storage regions corresponding to the sequence information, and being provided with a monitoring section made up of one, or two or more consecutive sequence numbers, and an acceptance section in which a start or a second sequence number of the monitoring section is a start sequence number, and the sequence number ahead by a count of storage regions of the ring buffer including the start of the monitoring section is an end sequence number;

in a case of a sequence number of received data being within the acceptance section, write the received data to a position of the storage region that corresponds to a value decided on the basis of a remainder from dividing the sequence number of the received data by the count of storage regions of the ring buffer;

read out all data within the monitoring section in a case of data being written to all of the monitoring section;

update the respective start sequence number and end sequence number of the monitoring section and the acceptance section ahead, within a range of a count of sequence numbers in the monitoring section;

in a case in which a count of data stored in the ring buffer is zero, write the received data to a position of the storage region corresponding to a value decided on the basis of a remainder from dividing the sequence number of the received data by the count of storage regions of the ring buffer, take the received data as a start of the monitoring section, and decide a respective start sequence number and end sequence number of the monitoring section and the acceptance section in accordance with the start of the monitoring section;

determine that data loss exceeding a storage limit of the ring buffer has occurred in a case of satisfying a determination condition set in advance, even if one or more positions of the monitoring section is clear, update the respective start sequence number and end sequence number of the monitoring section and the acceptance section ahead by one, and increment the number of times of data loss; and in a case in which the received data is not first-time reception data in a state in which the count of data stored in the ring buffer is zero and deciding the monitoring section and the acceptance section with the received data as the start of the monitoring section, correct the number of times of data loss in accordance with an amount of movement of the monitoring section and the acceptance section before and after deciding the monitoring section and the acceptance section.

9. The packet monitoring device according to claim 8, wherein the a packet sequence corrector is further configured to:

in a case in which the received data is not first-time reception data in a state in which the count of data stored in the ring buffer is zero, correction is performed by adding, to the number of times of data loss, the amount of movement of the monitoring section and the acceptance section before and after deciding the monitoring section and the acceptance section.

10. The packet monitoring device according to claim 9, wherein the a packet sequence corrector is further configured to:

in a case in which the received data is first-time reception data in a state in which the count of data stored in the ring buffer is zero, the start sequence number of the acceptance section that is decided is stored as a foremost start sequence number; and in a case in which the received data is not first-time reception data, the foremost start sequence number is updated to a value out of a current value and the decided start sequence number that is earlier, and correction of the number of times of data loss is performed by subtracting a movement amount due to updating of the foremost start sequence number from the movement amount of the monitoring section and the acceptance section.

11. The packet monitoring device according to claim 8, wherein the a packet sequence corrector is further configured to:

in a case in which the received data is first-time reception data in a state in which the count of data stored in the ring buffer is zero, the start sequence number of the acceptance section that is decided is stored as a successive correction finishing sequence number;

in a state in which the count of data stored in the ring buffer is not zero, the start sequence number is updated to be ahead of the successive correction finishing sequence number by reading data from the ring buffer or by the data loss, and the successive correction finishing sequence number is updated in accordance with updating of the start sequence number;

in a case in which the received data is not first-time reception data in a state in which the count of data stored in the ring buffer is zero, and also the start sequence number that is decided is ahead of the successive correction finishing sequence number, correction is performed by adding, to the number of times of the data loss, the movement amount of the monitoring section and the acceptance section before and after deciding the monitoring section and the acceptance section, and the successive correction finishing sequence number is updated to the start sequence number;

in a case in which the received data is not first-time reception data in a state in which the count of data stored in the ring buffer is zero, and also the start sequence number that is decided is earlier than the successive correction finishing sequence number, the number of times of data loss is not changed; and only in a case in which the start sequence number is earlier than the successive correction finishing sequence number, the number of times of data loss is corrected by decrementing when reading out data all present in the monitoring section and updating the start sequence number one ahead, and the number of times of data loss is not updated when determining that the data loss has occurred and updating the start sequence number one ahead.

12. The packet monitoring device according to claim 11, wherein the a packet sequence corrector is further configured to:

in a case in which the received data is first-time reception data in a state in which the count of data stored in the ring buffer is zero, the start sequence number that is decided is stored as a successive correction beginning sequence number, and the start sequence number that is decided is stored as the foremost start sequence number;

in a case in which the received data is not first-time reception data in a state in which the count of data stored in the ring buffer is zero, the successive correction beginning sequence number is updated to the foremost start sequence number, and the foremost start sequence number is updated to a value out of a current value and the decided start sequence number that is earlier; and in a case in which the start sequence number is earlier than the successive correction beginning sequence number, the number of times of data loss is not corrected even when before the successive correction finishing sequence number.

13. The packet monitoring device according to claim 8, wherein the a packet sequence corrector is further configured to:

wherein determination is made that the data loss has occurred when one or more of conditions of
  a case in which a count of arrival time information stored from the start of the monitoring section to the end of the acceptance section has reached a predetermined count,
  a case in which sequence information of arrival time information of a received packet was not within the acceptance section, and
  a case in which a predetermined amount of time has elapsed from an arrival time indicated by arrival time information at the start of the monitoring section or nearest to the start,
is satisfied.

14. A non-transitory computer-readable storage device storing a data sequence correction program that when executed by one or more processors, cause the one or more processors to execute steps of:

temporarily saving data with sequence information imparted thereto in a ring buffer, the ring buffer having a predetermined number of storage regions corresponding to the sequence information, and being provided with a monitoring section made up of one, or two or more consecutive sequence numbers, and an acceptance section in which a start or a second sequence number of the monitoring section is a start sequence number, and the sequence number ahead by a count of storage regions of the ring buffer including the start of the monitoring section is an end sequence number, in a case of a sequence number of received data being within the acceptance section, writing the received data to a position of the storage region that corresponds to a value decided on the basis of a remainder from dividing the sequence number of the received data by the count of storage regions of the ring buffer, reading out all data within the monitoring section in a case of data being written to all of the monitoring section;

updating the respective start sequence number and end sequence number of the monitoring section and the acceptance section ahead, within a range of a count of sequence numbers in the monitoring section;

in a case in which a count of data stored in the ring buffer is zero, writing the received data to a position of the storage region corresponding to a value decided on the basis of a remainder from dividing the sequence number of the received data by the count of storage regions of the ring buffer, taking the received data as a start of the monitoring section, and deciding a respective start sequence number and end sequence number of the monitoring section and the acceptance section in accordance with the start of the monitoring section;

determining that data loss exceeding a storage limit of the ring buffer has occurred in a case of satisfying a determination condition set in advance, even if one or more positions of the monitoring section is clear, updating the respective start sequence number and end sequence number of the monitoring section and the acceptance section ahead by one, and incrementing the number of times of data loss; and in a case in which the received data is not first-time reception data in a state in which the count of data stored in the ring buffer is zero, correcting the number of times of data loss in accordance with an amount of movement of the monitoring section and the acceptance section before and after deciding the start sequence number.

* * * * *